US011683370B2

(12) United States Patent
Nord et al.

(10) Patent No.: US 11,683,370 B2
(45) Date of Patent: Jun. 20, 2023

(54) TRANSFERRING DATA BETWEEN COMPUTING SYSTEMS

(71) Applicant: Citrix Systems, Inc., Fort Lauderdale, FL (US)

(72) Inventors: Joseph Nord, Lighthouse Point, FL (US); Chris Mayers, Histon (GB)

(*) Notice: Subject to any disclaimer, the term of this patent is extended or adjusted under 35 U.S.C. 154(b) by 154 days.

(21) Appl. No.: 17/213,578

(22) Filed: Mar. 26, 2021

(65) Prior Publication Data

US 2022/0311822 A1 Sep. 29, 2022

(51) Int. Cl.
*H04L 67/1095* (2022.01)
*H04L 9/40* (2022.01)
*H04L 67/306* (2022.01)
*H04L 67/00* (2022.01)

(52) U.S. Cl.
CPC ...... *H04L 67/1095* (2013.01); *H04L 63/0435* (2013.01); *H04L 63/20* (2013.01); *H04L 67/306* (2013.01); *H04L 67/34* (2013.01)

(58) Field of Classification Search
None
See application file for complete search history.

(56) References Cited

U.S. PATENT DOCUMENTS

| 10,142,301 | B1* | 11/2018 | Sharifi Mehr | G06F 21/606 |
| 2010/0333116 | A1* | 12/2010 | Prahlad | G06F 16/1844 |
| | | | | 713/153 |
| 2012/0039469 | A1* | 2/2012 | Mueller | G06Q 20/3823 |
| | | | | 380/252 |
| 2015/0310219 | A1* | 10/2015 | Haager | H04L 9/0894 |
| | | | | 713/165 |
| 2017/0230343 | A1 | 8/2017 | Dowd et al. | |
| 2018/0337782 | A1* | 11/2018 | Wu | H04L 9/0836 |
| 2019/0109820 | A1* | 4/2019 | Clark | H04L 63/0227 |
| 2019/0340376 | A1 | 11/2019 | Fleck et al. | |
| 2020/0104826 | A1* | 4/2020 | Rule | H04W 4/80 |

OTHER PUBLICATIONS

Bicakci et al., "TwinCloud: Secure Cloud Sharing Without Explicit Key Management", Jun. 15, 2016. ArXiv.org, ARXIV ID: 1606.04705, arXiv:1606.04705 [cs.CR] (Year: 2016).*

(Continued)

*Primary Examiner* — Davoud A Zand

(57) ABSTRACT

A backend computing system may receive first data from a first computing system, where the first data may be an encrypted version of second data that has been generated at the first computing system based on a command at the first computing system. The backend computing system may identify a second computing system different than the first computing system based on a status of the second computing system, and may send the first data to the second computing system to enable the second computing system to decrypt the first data and perform a function with respect to the second data. In some embodiments, the first computing system may generate padded data by adding data to the second data, and send the padded data to the backend computing system. In some embodiments, the first computing system may send random data to the backend computing system.

19 Claims, 22 Drawing Sheets

(56) References Cited

OTHER PUBLICATIONS

Liu et al., "Building Generic Scalable Middlebox Services Over Encrypted Protocols", Apr. 1, 2018, IEEE, IEEE INFOCOM 2018—IEEE Conference on Computer Communications (pp. 2195-2203) (Year: 2018).*
International Search Report and Written Opinion dated May 27, 2022, for International Patent Application No. PCT/US2022/018850.
Voydock, et al. "Security Mechanisms in High-Level Network Protocols", ACM Computing Surveys, ACM, New York, NY, US, vol. 15, No. 2, Jun. 1, 1983, pp. 135-171, XP009055256, ISSN: 0360-0300, DOI: 10.1145/356909.356913 p. 135, paragraph 1—p. 137, paragraph 1.1 p. 157, paragraph 5—p. 158.
"Clipboard in Windows 10", Microsoft Support, retrieved from web Mar. 23, 2021, https://support.microsoft.com/en-us/windows/clipboard-in-windows-10-c436501e-985d-1c8d-97ea-fe46ddf338c6.

\* cited by examiner

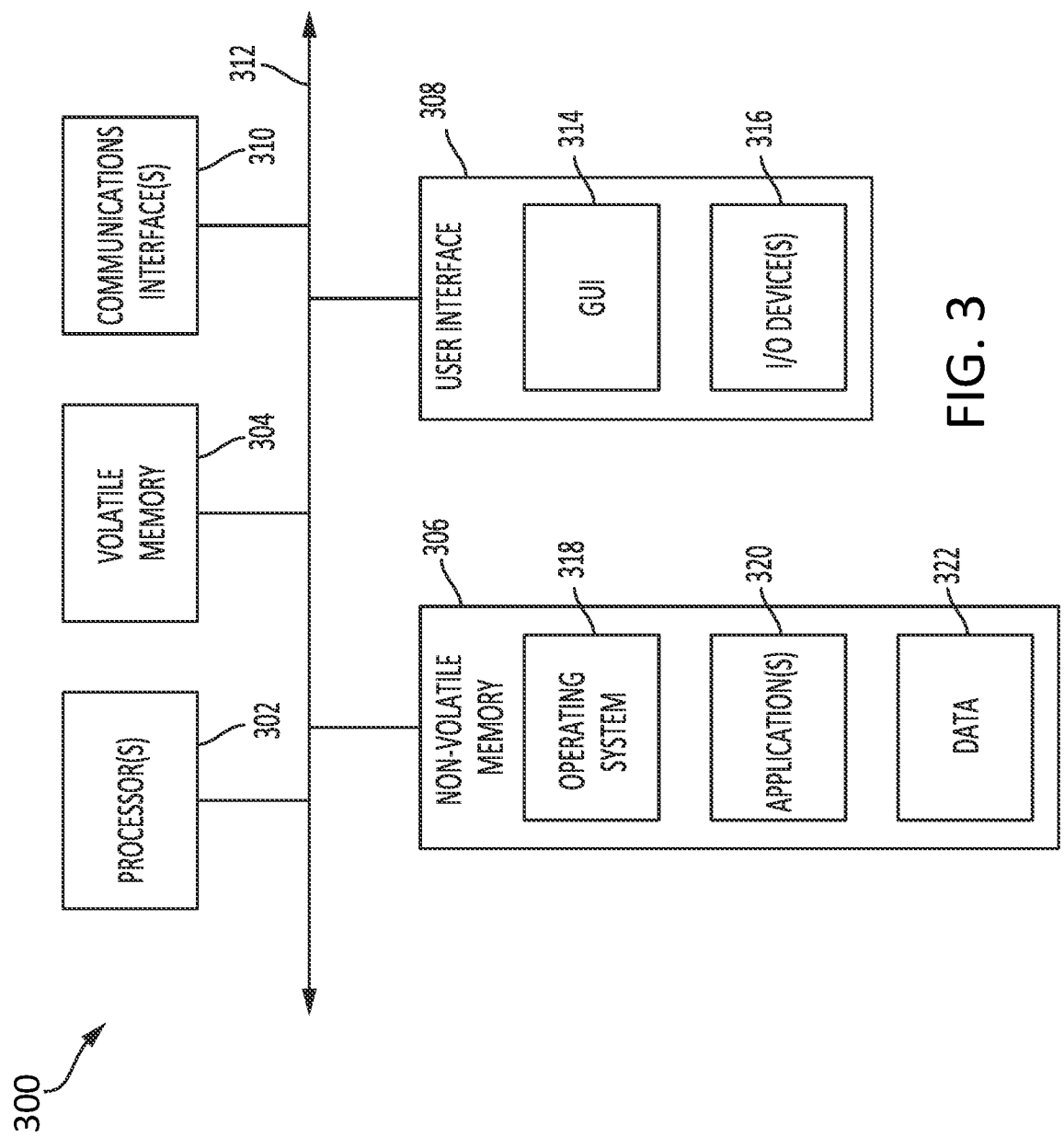

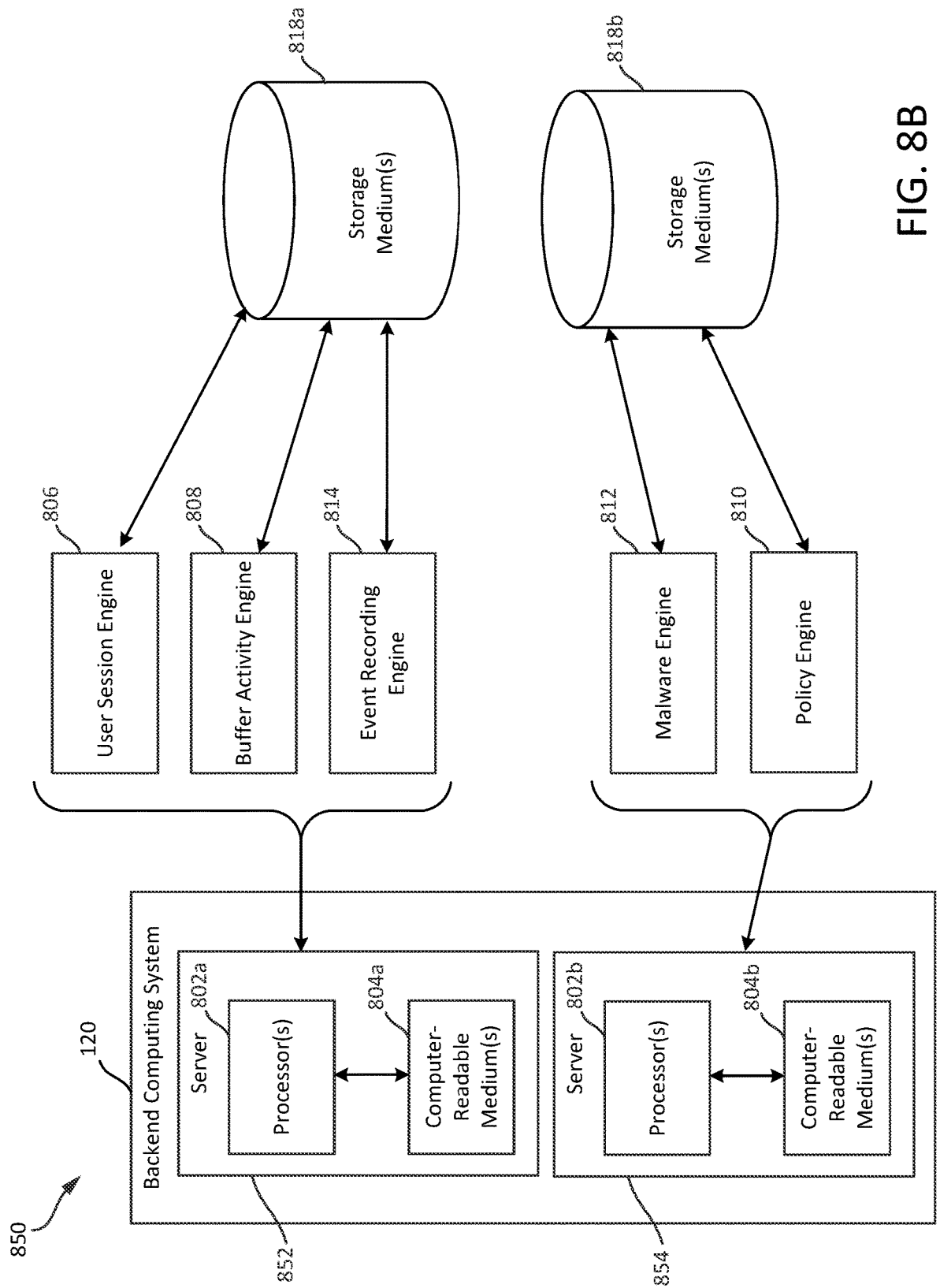

TRANSFERRING DATA BETWEEN COMPUTING SYSTEMS

BACKGROUND

Various systems have been developed that allow client devices to access applications and/or desktops over a network. Certain products offered by Citrix Systems, Inc. of Fort Lauderdale, Fla., including the Virtual Apps and Desktops™ and the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some disclosed embodiments, a method comprises receiving first data from a first computing system, the first data being an encrypted version of second data, the second data having been generated based on a command at the first computing system, the first data being generated by the first computing system by encrypting the second data, identifying a second computing system different than the first computing system based on a status of the second computing system, and sending the first data to the second computing system to enable the second computing system to decrypt the first data and perform a function with respect to the second data.

In some disclosed embodiments, a method comprises receiving, at a first computing system from a client device, a command to copy first data, generating, at the first computing system, padded data by adding second data to the first data, and sending, from the first computing system, encrypted data based on the padded data to a remote server to enable the remote server to send the encrypted data to a second computing system.

In some disclosed embodiments, a method comprises receiving, at a first computing system from a client device, a command to copy first data, sending, from the first computing system, encrypted data based on the first data to a remote server to enable the remote server to send the encrypted data to a second computing system, generating, at the first computing system, second data of random size, and sending, from the first computing system to the remote server, the second data on a periodic basis to obfuscate data traffic between the first computing system and the remote server.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 3 is a block diagram of a computing system that may be used to implement one or more of the components of the computing environment shown in FIG. 2 in accordance with some embodiments;

FIGS. 8A, 8B and 8C show example components of a system for transferring data between computing systems in accordance with some embodiments of the present disclosure;

DETAILED DESCRIPTION

Figure 1:
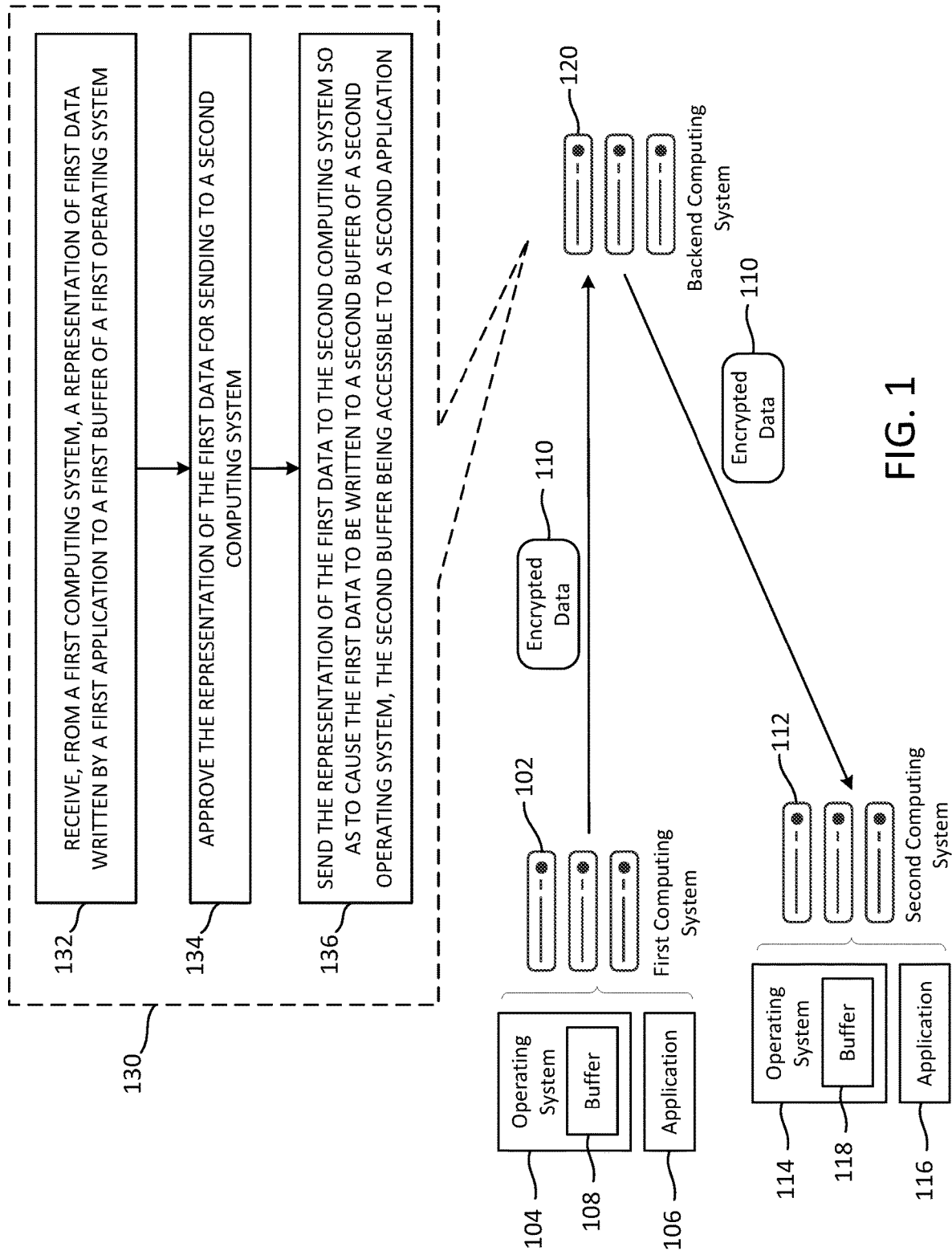
FIG. 1 is a diagram illustrating an example implementation of a system for transferring data between computing systems in accordance with some embodiments of the present disclosure.

For purposes of reading the description of the various embodiments below, the following descriptions of the sections of the specification and their respective contents may be helpful:

Section A provides an introduction to example embodiments of a system for transferring buffer data between computing systems;

Section B describes a network environment which may be useful for practicing embodiments described herein;

Section C describes a computing system which may be useful for practicing embodiments described herein;

Section D describes an example implementation of a resource delivery system which may be useful for practicing embodiments described herein;

Section E describes an example implementations of systems and methods for managing and streamlining access by client devices to a variety of resources;

Section F describes an example architecture of a resource virtualization server;

Section G provides a more detailed description of example embodiments of the system for transferring data between computing systems introduced above in Section A; and Section H describes example implementations of methods, systems/devices, and computer-readable media in accordance with the present disclosure.

A. Introduction to Illustrative Embodiments of a System for Transferring Data Between Computing Systems Resource delivery systems have been developed in which remote computing resources can deliver one or more "virtual" resources, e.g., applications or desktops hosted on the remote computing resources, to client devices. The Virtual Apps and Desktops™ platforms offered by Citrix Systems, Inc., of Fort Lauderdale, Fla., are one example of such a resource delivery system. Example implementations of such a resource delivery system 400 are described below (in Section D) in connection with FIGS. 4A-F. As described with reference to FIG. 4C, in some implementations, a resource delivery controller 412 may broker or otherwise provide a connection 448 between a client device 202 and a remote, shared computing resource 402, where connection 448 may allow a resource delivery agent 404 of the shared computing resource 402 to deliver a virtual resource to a resource access application 424 on the client device 202.

The Citrix Workspace™ platforms offered by Citrix Systems, Inc., of Fort Lauderdale, Fla., are another example of a resource delivery system. Example implementations of such a resource delivery system 500 are described below (in Section E) in connection with FIGS. 5A-B. As described with reference to FIG. 5A, in some implementations, one or more resource management services 502 may manage and streamline access by one or more client devices 202 to one or more resource feeds 504 (via one or more gateway services 506) and/or one or more software-as-a-service (SaaS) applications 508. In some implementations, the resource delivery system 500 may allow a client device 202 to access two or more resources, e.g., applications or desktops, hosted on different servers (e.g., two or more shared computing resources 402) at the same time. For example, in some implementations, the client device 202 may have a first application (e.g., a document editor) open in a first window and a second application (e.g., an accounting application) open in a second window, and those different applications may be provided to the client device 202 via different computing systems that may host different SaaS applications 508. In another example, the client device 202 may have a first virtual desktop open within a first window and a second virtual desktop open within a second window, and those different virtual desktops may be provided to the client device 202 via different computing systems, e.g., different shared computing resources 402.

In such systems, a user may want to use a commonly provided copy-and-paste and/or cut-and-paste functionality, to copy/cut data, e.g., text, a file, an image, etc., from the first application/virtual desktop and paste the copied/cut data to the second application/virtual desktop. Traditionally, such systems may store the data copied from the first application/virtual desktop within a buffer or memory (e.g., a clipboard) at the client device 202, so that it can be pasted at/provided to the second application hosted at the second computing system. In particular, a buffer (other memory) of an operating system of the first application/virtual desktop may be synchronized with the buffer of an operating system executing on the client device 202, so that the data that is added to the buffer of the operating system of the first application/virtual desktop is transferred to the buffer of the operating system executing on the client device 202. Similarly, in such systems, the buffer of the operating system executing on the client device 202 may be synchronized with the buffer of the operating system of the second application/virtual desktop, so that the data that is added to the buffer of the operating system executing on the client device 202 is transferred to the buffer of the operating system of the second application/virtual desktop.

As such, the buffer at the client device 202 may act as an intermediary to enable the copy/cut-and-paste functionality between applications/virtual desktops hosted at different computing systems. Although the applications and/or virtual desktops are running on remote computing systems, they may appear to be running locally at the client device 202 (which may be made possible using the platforms described in Sections D and E below). The user may not know that the applications and/or virtual desktops are running remotely, and might be satisfied when the copy/cut-and-paste functionality works as just described. However, an organization, e.g., the user's employer, may be wary of allowing data, provided via remote computing systems, to be stored at the client device 202, as that may be considered a security risk. In such cases, the organization may block/disable the copy/cut-and-paste functionality, so that data is not stored at the buffer of the client device 202. For example, the system may be programmed to ignore copy commands, received via the client device 202, within the remotely running applications. But taking such a step prevents the user from being able to copy/cut data from one application and pasting it another application, which may result in an unsatisfactory user experience (e.g., increase user frustration, reduce efficiency in the user performing his/her job, etc.).

The inventors have recognized and appreciated the security risks in transferring data from remote computing systems, e.g., shared computing resources 402, to the client device 202, as well as the benefits of enabling the user to copy and paste data between remote computing systems, e.g., between different shared computing resources 402.

Figure 4A:
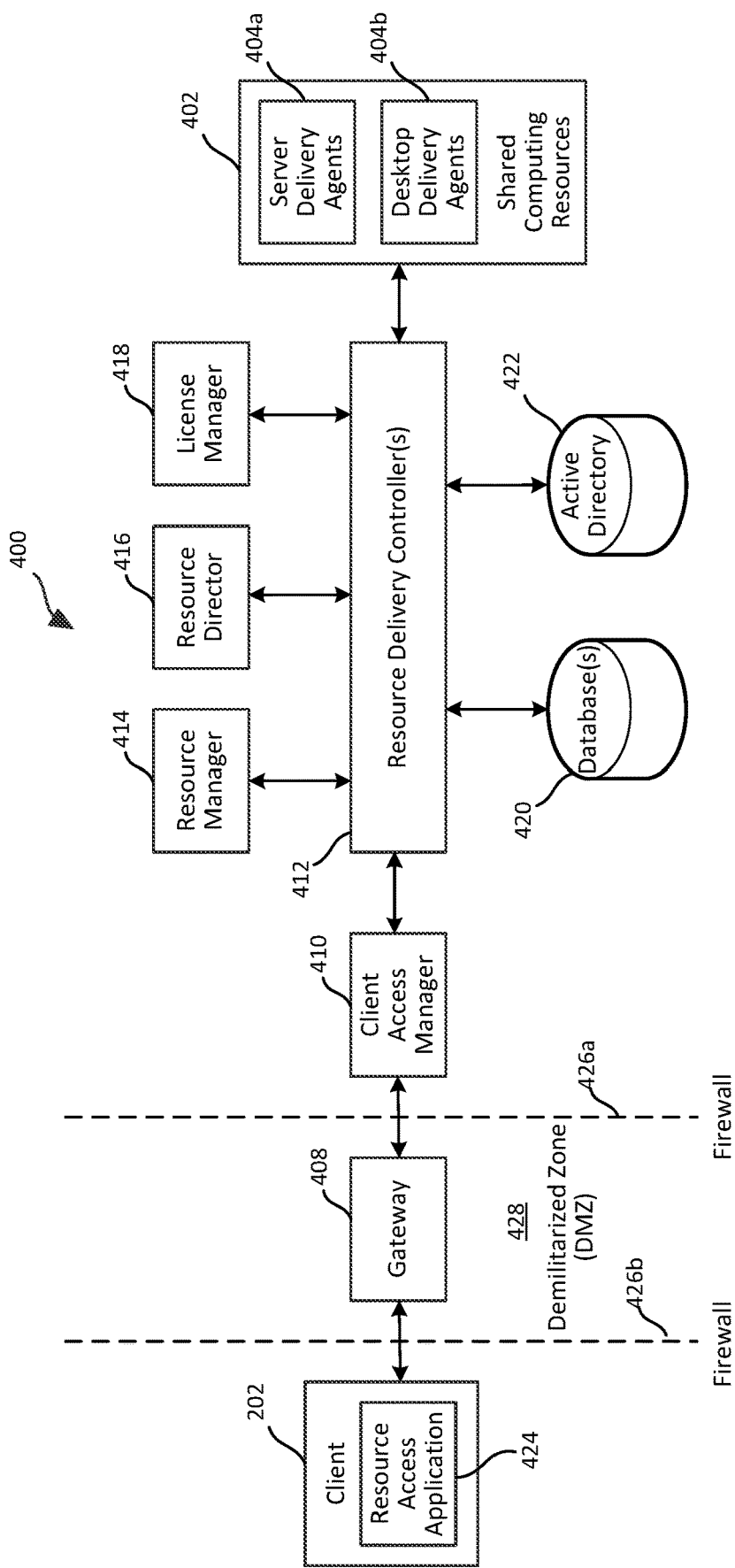
FIG. 4A is a block diagram illustrating components of a resource delivery system which may be useful for practicing embodiments described herein.
Figure 4B:
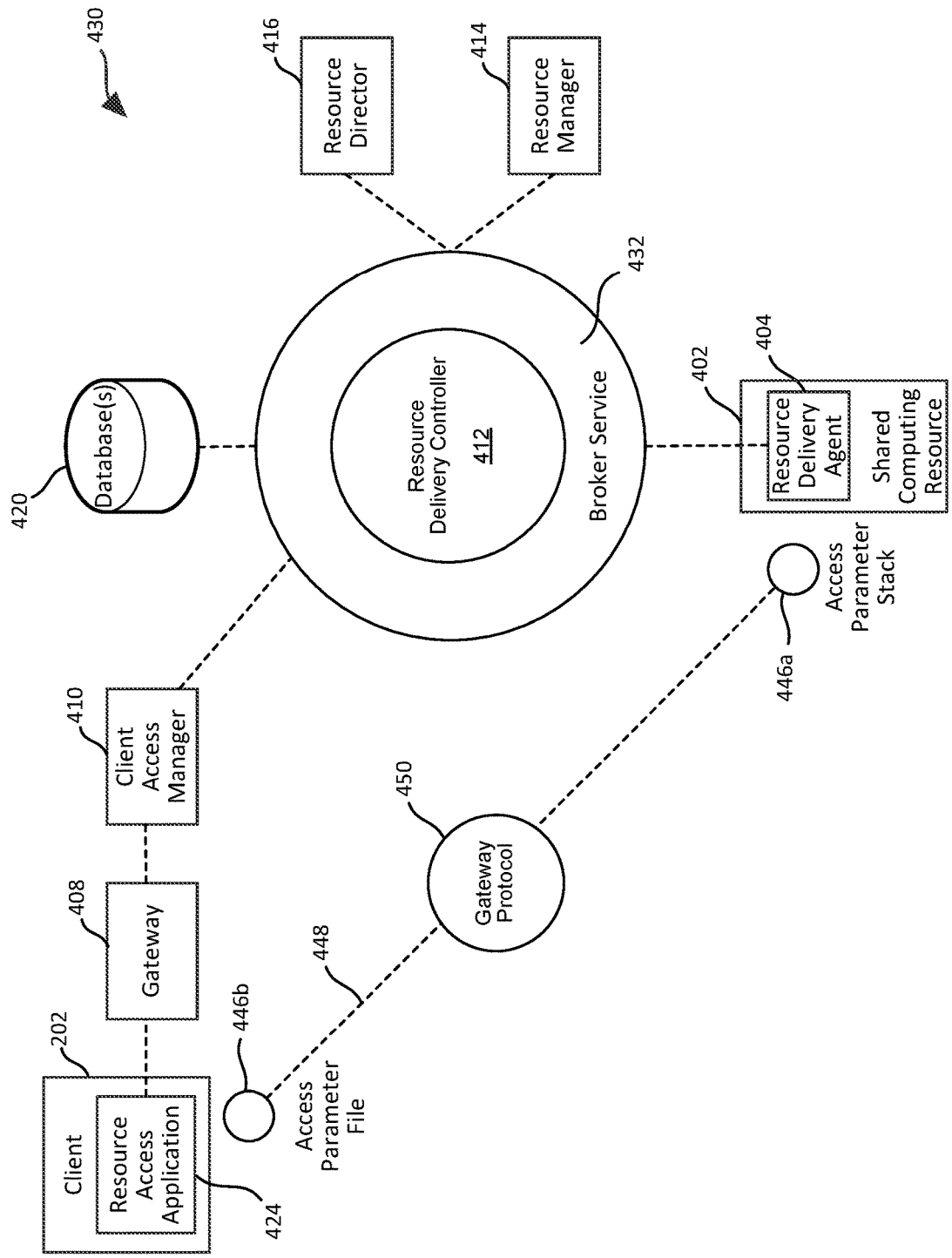
FIG. 4B illustrates an example deployment of a resource delivery system such as that shown in FIG. 4A.

Offered are improved systems and techniques to facilitate data transfers (e.g., copy-and-paste and/or cut-and-paste functionalities) between different computing systems, e.g., different shared computing resources 402, as well as to enable a user to transfer (e.g., copy/cut data) from an application and/or virtual desktop hosted at a first remote computing system and provide (e.g., paste) that data (e.g., the copied/cut data) to another application and/or virtual desktop hosted at a second remote computing system, without storing data at the client device 202 that is being used to access the different applications/virtual desktops. As described in relation to FIG. 1, some implementations include a backend computing system 120 (e.g., including one or more servers, such as a "buffer server" or a "clipboard server") that facilitates sending of data (e.g., copied data) of a first computing system 102/(first) application 106 to a second computing system 112/(second) application 116. In some implementations, the first computing system 102 and the second computing system 112 may correspond to different shared computing resources 402 (e.g., as shown in FIG. 4B), and the (first) application 106 and the (second) application 116 may correspond to different applications and/or virtual desktops that are delivered to a client device 202 using those shared computing resources 402. In some implementations, the backend computing system 120 may use a user session identifier (session ID), e.g., an identifier of a session between the resource access application 522 and the client interface service 514 shown in FIG. 5B, to track which applications and remote computing systems are being accessed at the client device 202.

In some implementations, data that is copied to a (first) buffer 108 (or memory) of a (first) operating system 104 at the first computing system 102 may be encrypted to generate encrypted data 110, and the backend computing system 120 may send the encrypted data 110 to the second computing system 112, which may decrypt the data prior to writing the data to a (second) buffer 118 (or memory) of a (second) operating system 114 at the second computing system 112, so that the data may subsequently be accessed by the (second) application 116, e.g., for a paste operation to the (second) application 116. In some implementations, the data may be encrypted at the first computing system 102 using an application layer encryption protocol. In other implementations, the data may be encrypted using a transport layer encryption protocol. Details on distribution of the encryption keys are described below in relation to FIG. 7 in Section G.

In some implementations, the backend computing system 120 may additionally or alternatively be configured to approve the transfer of data (e.g., the encrypted data 110) to the second computing system 112 based on one or more policies being satisfied and/or based on scanning the data for malicious content. In some implementations, the disclosed systems and techniques may, for example, enable an organization to set one or more policies with respect to the copy/cut-and-paste functionality for data loss prevention. For example, such policies may specify an amount of data that can be copied from one particular application and/or pasted to another particular application, the type of data that can be copied from one particular application and/or pasted to another particular application, the number of times the copy/cut-and-paste functionality can be used within a time period, etc.

Further, in some implementations, the disclosed systems and techniques may additionally or alternatively provide event recording during a user session that may record when an input representing a copy event is received and at which computing system, when an input representing a paste event is received and at which computing system, and other data for the user session.

Still further, in some implementations, the disclosed systems and techniques may additionally or alternatively involve determining a score (e.g., a trust or validity score) for the user of the client device 202, which may be used to enable and/or disable copy/cut-and-paste functionalities for the user, and/or force the client device 202 to disconnect from the remote computing systems. The score may be based on the user's past actions with respect to remote applications and/or virtual desktops, for example, violation of policies during past interactions, attempts to transfer malicious content via the backend computing system 120, etc.

And yet further, in some implementations, the disclosed systems and techniques may additionally or alternatively involve analyzing data traffic at the backend computing system 120 and employing certain defenses to prevent a malicious entity from analyzing or otherwise accessing that data traffic.

As used herein, the terms "copy-and-paste" and "cut-and-paste" refer to functionalities that enable items/data, e.g., text, images, files, etc., to be transferred from one location, e.g., an open application, a desktop location, a browser window, etc., to another location which may be within the same application/operating system or within another application/operating system. Further, as used herein, the terms "copy" and "copied" refer to any operation in which a copy of an item/data is made, whether or not the original version of the copied item/data remains at the location from which it was copied. Accordingly, an item/data that is "cut" from an application, e.g., by using a "CTRL+X" command, clicking a "cut" command, etc., in Microsoft Windows, would be considered to have been copied to a buffer of an operating system (sometimes referred to as a "clipboard") even though such an operation serves to remove the item from the application. A Windows "CTRL+C" command or clicking a "copy" command is another example of a command that can cause an item/data to be copied from an application to a buffer in some implementations. And still further, as used herein, the term "pasted" refers to any operation in which an item/data, previously copied to a buffer of an operating system, is transferred to another location, e.g., an open application, a desktop location, a browser window, etc. A Windows "CTRL+V" command or clicking a "paste" command are examples of commands that can cause an item/data to be so transferred.

FIG. 1 shows an example routine 130 that may be performed by one or more components of the backend computing system 120. In the illustrated example, a client device 202 (not shown in FIG. 1) may access the (first) application 106 (e.g., a remotely hosted application, a "virtualized" application, etc.) that may be hosted at/provided by the first computing system 102. As shown, the first computing system 102 may include the (first) operating system 104 and the (first) buffer 108 (e.g., a clipboard). The client device 202 may, at the same time, access the (second) application 116 (e.g., a remotely hosted application, a "virtualized" application, etc.) that may be hosted at/provided by the second computing system 112. The second computing system 112 may include the (second) operating system 114 and the (second) buffer 118 (e.g., a clipboard). The client device 202 may, for example, be provided with simultaneous access to both the (first) application 106 and the (second) application 116 using the platforms described in Sections D and E below.

Referring to FIG. 1, in some implementations, an input received at the first computing system 102 to copy/cut an item/data from a location (e.g., within a displayed window of (first) application 106) may cause the (first) buffer 108 of the (first) operating system 104 to store the copied item/data. The input may be provided by the user via the client device 202. As noted above, in some implementations, the first computing system 102 may encrypt the data/item stored in the (first) buffer 108 to generate the encrypted data 110, and may send that encrypted data 110 to the backend computing system 120. Further, as also noted above, in some implementations, the backend computing system 120 may then send the encrypted data 110 to the second computing system 112, and the second computing system 112 may decrypt the encrypted data 110 to recover the original data/item that was stored in the (first) buffer 108. The second computing system 112 may then store the recovered original data/item in the (second) buffer 118 of the (second) operating system 114 where it may be accessed by the (second) application 116. In other implementations, the data/item copied to the (first) buffer 108 may not be encrypted prior to being transferred from the (first) buffer 108 to the backend computing system 120, and/or may not be encrypted when it is transferred from the backend computing system 120 to the (second) buffer 118.

In some implementations, an input received at the second computing system 112 to paste an item/data at a location (e.g., within a window of the (second) application 116) may cause retrieval of the copied item/data from the (second) buffer 118. In some implementations, the backend computing system 120 may send the encrypted data 110 to the second computing system 112 when a paste input is received at the second computing system 112. In other implementations, the backend computing system 120 may send the encrypted data 110 to the second computing system 112 prior to the second computing system 112 receiving a paste input, so that the copied item/data 110 is already available at the (second) buffer 118 when such a paste input is received.

Referring now to the example routine 130, the backend computing system 120 may (at a step 132) receive, from the first computing system 102, a representation of first data written by the (first) application 106 to the (first) buffer 108 (or memory) of the (first) operating system 104. In some implementations, such a representation may correspond to the encrypted data 110 shown in FIG. 1. In other implementations, e.g., where the data/item copied to the (first) buffer 108 (or memory) is not encrypted prior to being sent to the backend computing system 120, the representation may simply be the first data itself. The first data may, for example, have been written to the (first) buffer 108 (or memory) in response to an input received via the client device 202 at the (first) application 106, where the input represents a copy command. As one example, the (first) application 106 may be Microsoft Word, and a paragraph of text may have been copied from a Microsoft Word document to the (first) buffer 108. As another example, the (first) application 106 may be a file manager for a virtual desktop hosted at the first computing system 102, and a file may have been copied from the file manager to the (first) buffer 108 (or memory). In some implementations, the representation of the first data may include "padding" data in addition to the first data, to obfuscate the data being sent from the (first) computing system 102.

Again, as previously noted, in some implementations, the first data may be encrypted at the first computing system 102, and the backend computing system 120, at the step 132, may receive encrypted first data 110. For example, in some implementations, the first computing system 102 may encrypt the first data using a private key of the first computing system 102 to generate the encrypted data 110.

At a step 134, the backend computing system 120 may approve the first data for sending to the second computing system 112. In some implementations, the backend computing system 120 may approve or otherwise authorize the first data based on one or more policies defined by policy data stored at the backend computing system 120. The policy data may, for example, indicate policies related to (1) an amount of data that can be copied from the (first) application 106 and/or the first computing system 102, and/or that can be pasted at the (second) application 116 and/or the second computing system 112; (2) a type of data that can be copied from the (first) application 106 and/or the first computing system 102, and/or that can be pasted at the (second) application 116 and/or the second computing system 112; (3) a number of times a copy functionality can be performed at the (first) application 106 and/or the first computing system 102 within a time period and/or a user session; (4) a number of times a paste functionality can be performed at the (second) application 116 and/or the second computing system 112; and the like.

In some implementations, the backend computing system 120 may scan the representation of the first data for malware, virus, or other malicious content. In implementations in which the representation of the first data includes the encrypted data 110, the backend computing system 120 may include one or more servers or other components, possibly segregated from other components of the backend computing system 120, that are provided with a key (e.g., a public key corresponding to the private key of the first computing system 102) that can be used to decrypt the encrypted data 110 to recover the first data to allow those server(s) or other components to effectively perform such a scan. Even without such a key, in some implementations, the backend computing system 120 may be able to determine whether to approve the transfer of the encrypted data 110 based on one or more characteristics of the encrypted data 110, such as its size/quantity. For example, in some implementations, the backend computing system 120 may recognize transfers of encrypted data, e.g., representing twelve or fewer characters, as potentially corresponding to sensitive information, such as copied passwords, copied credit card numbers, or the like. Details on how the backend computing system 120 may determine that the encrypted data includes sensitive information are described below in relation to FIG. 14 in Section G.

The backend computing system 120 may use a virus scanning software or other mechanisms to scan the first data for malicious content. If the backend computing system 120 determines that the first data does not include malicious content, then the backend computing system 120 may approve the representation of the first data (e.g., the encrypted data 110 or the first data itself) for sending to the second computing system 112. If, on the other hand, the backend computing system 120 determines that the first data does include malicious content, then the backend computing system 120 may not approve the representation of the first data (e.g., the encrypted data 110 or the first data itself), for sending to the second computing system 112. The backend computing system 120 may also perform other steps, such as notifying the user, via the client device 202, that the copied data included malicious content, disabling copy/cut-and-paste functionalities for the user session at the client device 202, causing a forced disconnect of the client device 202 from the resource delivery platforms (e.g., systems 400 and 500), etc.

At a step 136, the backend computing system 120 may send the representation of the first data (e.g., the encrypted data 110 or the first data itself) to the second computing system 112 so as to cause the (second) operating system 114 to write the first data to the (second) buffer 118 (or memory), thus making the first data accessible to the (second) application 116. In implementations in which the representation of the first data includes the encrypted data 110, the second computing system 112 may decrypt the representation of the first data using a key (e.g., a public key corresponding to the private key of the first computing system 102) to recover the first data prior to writing it to the (second) buffer 118 (or memory). In some implementations, the backend computing system 120 may send the representation of the first data to the second computing system 112 after the representation of the first data has been approved for sending per the step 134. In other implementations, the backend computing system 120 may send the representation of the first data to the second computing system 112 after detecting that a paste command has been received at the second computing system 112.

After the first data has been written to the (second) buffer 118 (or memory), the (second) application 116 may retrieve the first data from the (second) buffer 118 (or memory) to paste it at a location indicated by the paste command. The user may provide an input (e.g., keyboard input, mouse click, etc.) representing a paste command via the client device 202 within a window displaying the (second) application 116 (which, as described above, may be a virtual application provided by the (second) computing system 112. As one example, the (second) application 116 may be a web browser, and in response to a paste command at the web browser, the first data (e.g., text) written at the (second) buffer 118 (or memory) may be pasted in the web browser. As another example, the (second) application 116 may be a file manager for a virtual desktop hosted at the second computing system 112, and in response to a paste command at the file manager, the first data (e.g., a file) written at the (second) buffer 118 (or memory) may be pasted/made available at the file manager.

In this manner, the first data is not stored at the client device 202 or sent via the client device 202 from the first computing system 102 to the second computing system 112. Such transferring of data, without the client device 202, may support an organization's desire to not allow a user's device access to certain data that is provided via remote/virtual applications and systems. For example, an organization want to prevent a user's personal device, being used to access the remote desktop and virtual applications, from having access to organization data provided via the remote desktop and virtual applications. Furthermore, using the backend computing system 120 to enable the user to copy data from one remote computing system to another remote computing system, allows implementation of certain policies and security measures as described below in detail. And still further, encrypting the first data prior to transferring it to the backend computing system 120 may increase the security of the system and/or enable some or all of the backend computing system 120 to be implemented using a computing environment that is less secure that would otherwise be desirable.

Additional details and example implementations of embodiments of the present disclosure are set forth below in Sections F and G, following a description of example systems and network environments in which such embodiments may be deployed.

B. Network Environment

Figure 2:
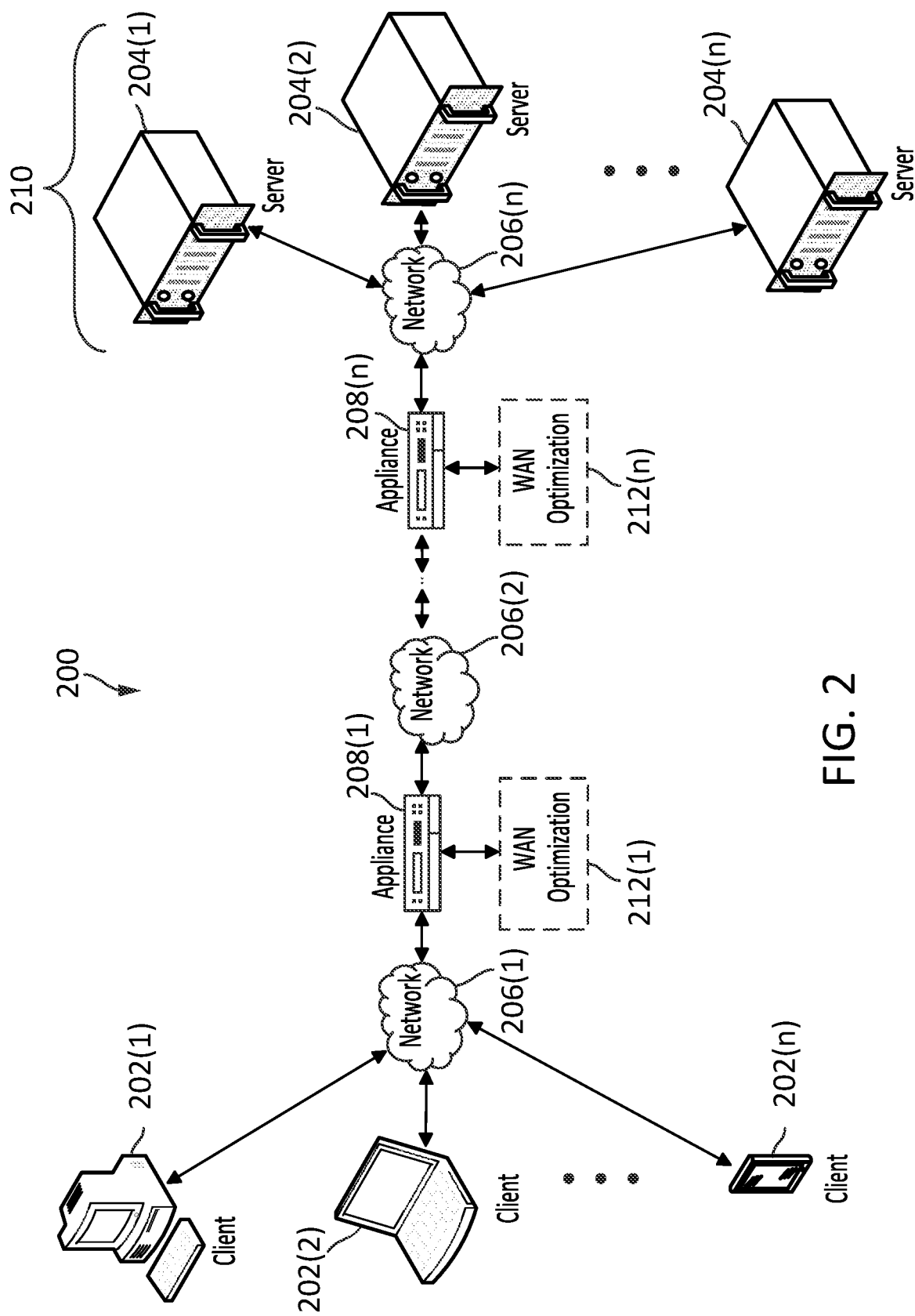
FIG. 2 is a diagram of a network environment in which some embodiments of the systems and techniques disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a an active directory server; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+an organization.

C. Computing Environment

FIG. 3 illustrates an example of a computing system 300 that may be used to implement one or more of the respective components (e.g., the clients 202, the servers 204, and the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Virtualized Applications and/or Desktops to Client Devices FIG. 4A is a block diagram illustrating key components of a resource delivery system 400 that may enable a client device 202 to remotely access one or more virtual applications or desktops running on one or more shared computing resources 402. The shared computing resources 402 may include physical machines and/or virtual (e.g., hypervisor driven) machines, and may be located at a data center, within a cloud computing environment, or elsewhere. As described in more detail below, such shared computing resources 402 may implement one or more resource delivery agents 404, including one or more server delivery agents 404a and/or one or more desktop delivery agents 404b. The Virtual Delivery Agents (VDAs) of the Citrix Virtual Apps and Desktops™ system offered by Citrix Systems, Inc., of Fort Lauderdale, Fla., are example implementations of the resource delivery agents 404. In some implementations, the resource delivery system 400 may give an information technology (IT) department of an organization control of virtual machines, applications, licensing, and security while providing "anywhere access" for any device. As described below, the resource delivery system 400 may enable end users to run applications and/or desktops independently of the operating system and interface of the end user's device. Further, the resource delivery system 400 may enable administrators to manage the network and control access from selected devices or from all devices, as well as to manage an entire network from a single data center.

The resource delivery system 400 shown in FIG. 4A may, for example, correspond to an implementation of a Citrix Virtual Apps and Desktops™ system offered by Citrix Systems, Inc., of Fort Lauderdale, Fla. Such systems employ a unified architecture called FlexCast Management Architecture (FMA). Among other things, FMA provides the ability to run multiple versions of Citrix Virtual Apps or Citrix Virtual Desktops™ as well as integrated provisioning.

As shown in FIG. 4A, in addition to the shared computing resources 402, the resource delivery system 400 may include a gateway 408, a client access manager 410, one or more resource delivery controllers 412, a resource manager 414, a resource director 416, a license manager 418, one or more databases 420, and an Active Directory (AD) 422 or other directory service.

The resource delivery controller(s) 412 may be the central management component of the resource delivery system 400. In some implementations, the resource delivery controller(s) 412 may be installed on at least one server in a data center of an organization. The Delivery Controller of the Citrix Virtual Apps and Desktops™ system offered by Citrix Systems, Inc., of Fort Lauderdale, Fla., is one example implementation of the resource delivery controller(s) 412. For reliability and availability, respective resource delivery controllers 412 may be installed on multiple servers. The resource delivery controller(s) 412 may communicate with the shared computing resources 402 to distribute applications and/or desktops, authenticate and manage user access, broker connections between client devices 202 and resource delivery agents 404 running on respective shared computing resources 402, optimize use connections, and/or load-balance use connections. As described in more detail below, a broker service 432 (shown in FIGS. 4B-4D) of the resource delivery controller(s) 412 may interact with the database(s) 420 to track which users are logged on and where, what session resources the users have, and if users need to reconnect to existing applications. In some implementations, the broker service 432 may execute PowerShell commands and communicate with broker agents 456 (shown in FIG. 4D) of the resource delivery agents 404 over transmission control protocol (TCP) port "80." A monitor service 460 (shown in FIG. 4D) may also be provided by the resource delivery controller(s) 412 to collect historical data concerning the operation of the resource delivery controller(s) 412 and write such data to the database(s) 420. In some implementations, such a monitor service 460 may use TCP port "80" or "443."

The resource delivery controller(s) 412 may manage the state of desktops, starting and stopping them based on demand and administrative configuration. In some implementations, the resource delivery controller(s) 412 may also enable the adjustment of user profiles (stored within the database(s) 420) to manage user personalization settings in virtualized or physical Windows environments.

In some implementations, the database(s) 420 may include at least one Microsoft Structured Query Language (SQL) Server database in which configuration and session information may be stored. As noted above, the database(s) 420 may store the data collected and managed by the services that make up the resource delivery controller(s) 412. In some implementations, the database(s) 420 may be provided within a data center of an organization and may have a persistent connection to the resource delivery controller(s) 412. Although not illustrated in FIG. 4A, it should be appreciated that the resource delivery system 400 may also include respective databases associated with the resource manager 414, the resource director 416, and the license manager 418 to store data collected and/or used by those components.

The resource delivery agents 404 may be installed on physical or virtual machines that are made available to deliver applications or desktops to users. The resource delivery agents 404 may enable such machines to register with the resource delivery controller(s) 412. The registration of a machine with the resource delivery controller(s) 412 may cause that machine and the resources it is hosting to be made available to users. The resource delivery agents 404 may establish and manage the connections between the machines on which they are installed and client devices 202. The resource delivery agents 404 may also verify that a license is available for the user and/or session, and may apply policies that are configured for the session.

The resource delivery agents 404 may communicate session information to the broker service 432 (shown in FIGS. 4B-4D) of the resource delivery controller(s) 412 through the broker agents 456 (shown in FIG. 4D) in the resource delivery agents 404. Such broker agents 456 may host multiple plugins and collect real-time data. In some implementations, the broker agents 456 may communicate with the resource delivery controller(s) 412 over TCP port "80." In some implementations, the resource delivery agents 404 may operate with Single-session and/or Multi-session Windows operating systems. The resource delivery agents 404 for Multi-session Windows operating systems may allow multiple users to connect to the server at one time. The resource delivery agents 404 for Single-session Windows operating systems, on the other hand, may allow only one user to connect to the desktop at a time. In some implementations, one or more the resource delivery agents 404 may alternatively operate with a Linux operating system.

When users connect from outside one or more corporate firewalls, e.g., firewalls 426a and 426b shown in FIG. 4A, the gateway 408 may be used to secure such connections with Transport Layer Security (TLS). The gateway 408 may, for example, be a Secure Socket Layer (SLL) Virtual Private Network (VPN) appliance that is deployed in a demilitarized zone (DMZ) 428. The gateway 408 may thus provide a single secure point of access through the corporate firewall 426.

The client access manager 410 of the resource delivery system 400 may authenticate users and manage stores of desktops and/or applications that are available for users to access. In some implementations, the client access manager 410 may provide an application "storefront" for an enterprise, which may provide users with self-service access to the desktops and/or applications that the enterprise opts to make available to them. In some implementations, the client access manager 410 may also keep track of users' application subscriptions, shortcut names, and other data. Tracking such data may, for example, help ensure that users have a consistent experience across multiple devices.

As shown in FIG. 4A, a resource access application 424 may be installed on client devices 202 or other endpoints (such as virtual desktops). Such resource access applications 424 may provide users with quick, secure, self-service access to documents, applications, and/or desktops. The resource access application 424 may, for example, provide on-demand access to Windows, web, and/or Software as a Service (SaaS) applications. The Citrix Workspace™ app, offered by Citrix Systems, Inc., of Fort Lauderdale, Fla., is one example implementation of such a client-based version of the resource access application 424. In some implementations, the resource access application 424 may alternatively operate on a web server (not shown in FIG. 4A) and may be accessed using a web browser (also not shown in FIG. 4A) installed on the client device 202. In some embodiments, for example, the resource access application 424 may be provided as a hypertext markup language 5 (HTML-5) service and may be accessed using an HTML-5-compatible web browser. The Citrix Workspace™ app for HTML-5, offered by Citrix Systems, Inc., of Fort Lauderdale, Fla., is one example implementation of such a web-based version of the resource access application 424.

In some embodiments, the resource access application 424 may intercept network communications from a network stack used by the one or more applications. For example, the resource access application 424 may intercept a network communication at any point in a network stack and redirect the network communication to a destination desired, managed, and/or controlled by the resource access application 424, for example, to intercept and redirect a transport layer connection to an IP address and port controlled and/or managed by resource access application 424. The resource access application 424 may thus, in some embodiments, transparently intercept any protocol layer below the transport layer, such as the network layer, and any protocol layer above the transport layer, such as the session, presentation, or application layers. The resource access application 424 may, for example, interface with the transport layer to secure, optimize, accelerate, route, and/or load-balance any communications provided via any protocol carried by the transport layer.

In some embodiments, the resource access application 424 may be implemented as an Independent Computing Architecture (ICA) client developed by Citrix Systems, Inc. The resource access application 424 may perform acceleration, streaming, monitoring, and/or other operations. For example, the resource access application 424 may accelerate streaming an application from a shared computing resource 402 running a resource delivery agent 404 to the client device 202. The resource access application 424 may also perform endpoint detection/scanning and/or collect endpoint information about the client 202. For example, the resource access application 424 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The resource manager 414 shown in FIG. 4A, may provide a console from which the configuration and management of applications and desktops that are to be made available to users may be controlled. The Studio component of the Citrix Virtual Apps and Desktops™ system offered by Citrix Systems, Inc., of Fort Lauderdale, Fla., is one example implementation of the resource manager 414. In some implementations, the resource manager 414 may eliminate the need for separate management consoles for managing delivery of applications and desktops. In some embodiments, the resource manager 414 may provide one or more wizards to guide system administrators through environment setup, creating workloads to host applications and desktops, and assigning applications and desktops to users. In some implementations, the resource manager 414 may also be used to allocate and track licenses for the resource delivery system 400. In some embodiments, the resource manager 414 may get the information it displays from the broker service 432 of the resource delivery controller(s) 412, e.g., communicating over TCP port "80."

The resource director 416 may, for example, be a web-based tool that enables IT support and help desk teams to monitor an environment, troubleshoot issues before they become system-critical, and perform support tasks for end users. The Director component of the Citrix Virtual Apps and Desktops™ system offered by Citrix Systems, Inc., of Fort Lauderdale, Fla., is one example implementation of the resource director 416. In some implementations, a single deployment of the resource director 416 may be used to connect to and monitor multiple resource delivery systems 400, such as that shown in FIG. 4A. Examples of information that may be displayed by the resource director 416 include (A) real-time session data from the broker service 432 of the resource delivery controller(s) 412, which may include data the broker service 432 gets from the broker agent 456 in the resource delivery agents 404, and (B) historical data about the resource delivery system 422 that may be received, for example, from the monitor service 460 in the resource delivery controller(s) 412. In some implementations, the resource director 416 may use performance and heuristics data captured by the gateway 408 (described below) to build analytics from the data and then presents such analytics to system administrators. Further, in some implementations, the resource director 416 may allow system administrators to view and interact with a user's sessions, e.g., using Windows Remote Assistance.

The license manager 418, as its name implies, may enable the management of licenses within the resource delivery system 400. In some implementations, the license manager 418 may communicate with the resource delivery controller(s) 412 to manage licensing for a user's session and with the resource manager 414 to allocate license files.

As noted above, in some implementations, the shared computing resources 402 shown in FIG. 4A may include one or more virtual machines. These can be virtual machines that are used to host applications and/or desktops, as well as virtual machines that are used to host the other components of the resource delivery system 400. In some implementations, a hypervisor may be installed on a host computer to run the hypervisor and hosting virtual machines.

Although not depicted in FIG. 4A, in some implementations, the resource delivery system 400 may additionally include a performance monitoring service or agent. In some embodiments, one or more dedicated servers (or a dedicated service in a cloud-based environment) may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., as a part of the resource access application 424), one or more servers 204, or one or more other system component(s). In general, the monitoring agents may execute transparently (e.g., in the background) to any application and/or user of the device. In some embodiments, such a monitoring agent may be implemented as components of Citrix Analytics™ by Citrix Systems, Inc., of Fort Lauderdale, Fla.

The monitoring agents may, for example, monitor, measure, collect, and/or analyze data on a frequency (e.g., a predetermined frequency), based upon an occurrence of given event(s), or in real time during operation of the resource delivery system 400. The monitoring agents may, for example, monitor resource consumption and/or performance of hardware, software, and/or communications resources of the clients 202, the gateway 408 (and/or any other components in the DMZ 428), and/or the resource delivery controller(s) 412, the shared computing resources 402, the resource delivery agents 404, or any other components shown in FIG. 4A. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the resource delivery system 400. For example, based upon one or more monitored performance conditions or metrics, the resource delivery system 400 may be dynamically adjusted, for example periodically or in real-time, to optimize application delivery by the resource delivery agents 404 to the clients 202 based upon network environment performance and conditions FIG. 4B illustrates an example deployment 430 of a resource delivery system 400, such as that shown in FIG. 4A. Such a deployment may be referred to as a "Site." A Site may be made up of machines with dedicated roles that allow for scalability, high availability, and failover, and may provide a solution that is secure by design. As discussed above, such a Site may include servers and/or desktop machines installed with resource delivery agents 404, and one or more resource delivery controller(s) 412, which may manage access to such servers/machines. FIG. 4B illustrates one such resource delivery agent 404, and one such resource delivery controller 412. As shown in FIG. 4B, the resource delivery controller 412 may include a broker service 432. The resource delivery agent 404 may enable users to connect to desktops and/or applications. It may be installed on server or desktop machines in a datacenter for most delivery methods, but it may also be installed on physical personal computers (PCs) for Remote PC Access. In some implementations, the resource delivery controller 412 may be made up of independent Windows services that may manage resources, applications, and/or desktops, and may optimize and balance user connections.

In some embodiments, client devices 202 may not directly access the resource delivery controller 412. Instead, the resource delivery agent 404 and the client access manager 410 may serve as intermediaries between client devices 202 and the resource delivery controller 412. When users log on using the client access manager 410, their credentials may pass through to the broker service 432 on the resource delivery controller 412. The broker service 432 may then obtain profiles and available resources based on the policies set for them.

Figure 4C:
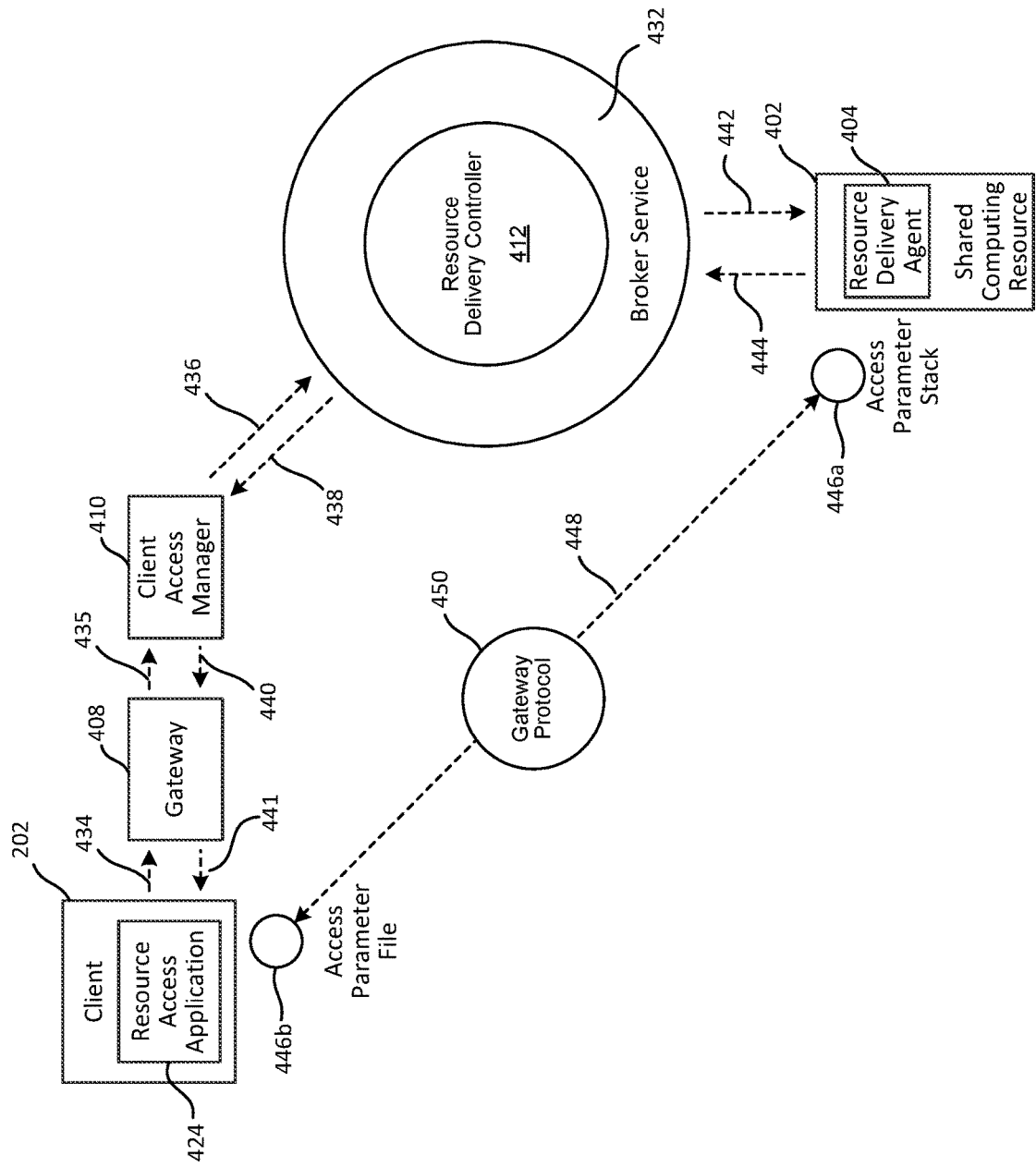
FIG. 4C illustrates an example process for handling user connections within the deployment shown in FIG. 4B.

FIG. 4C illustrates an example process for handling user connections within the deployment 430 shown in FIG. 4B. As indicated by arrows 434 and 435, to start a session, a user may cause the client device 202 to connect (via the gateway 408) to the client access manager 410. Such a connection may, for example, be established using the resource access application 424. As noted above, the resource access application 424 may either be installed on the client device 202 or accessible from a web server via a web browser on the client device 202.

As indicated by arrow 436, the user's credentials may then move through this pathway to access the broker service 432 of resource delivery controller 412. In some implementations, such communications may be encrypted to protect the security of such credentials. The broker service 432 may determine which desktops and/or applications the user is allowed to access. After the credentials have been verified, information about available applications and/or desktops may be sent back to the client device 202 through the pathway between the client access manager 410 and the resource access application 424, as indicated by arrows 438, 440, and 441. The user of the client device 202 may thus be provided with a list of available applications and/or desktops. When the user selects an application or desktop from this list, an indication of the selected resource goes back down the previously described pathway to the resource delivery controller 412. The resource delivery controller 412 may then select an appropriate resource delivery agent 404 to host the selected applications or desktop.

As indicated by arrow 442, the resource delivery controller 412 may send a message to the selected resource delivery agent 404 with the user's credentials, and may then send pertinent data about the user and the connection to the resource delivery agent 404. The resource delivery agent 404 may then accept the connection and, as indicated by arrows 444, 438, 440, and 441, may send a set of access parameters (stored in an access parameter stack 446a) back through the same pathways to the resource access application 424. In particular, the set of access parameters may be collected by the client access manager 410 and then sent to the resource access application 424 where they may be stored as an access parameter file 446b. In some implementations, the access parameter file 446b may be created as part of a protocol conversation between the client access manager 410 and the resource access application 424. In other implementations, the client access manager 410 may convert the access parameters to the file 446b, and that file 446b may then be downloaded to the client device 202. In some implementations, the access parameters may remain encrypted throughout this process.

The access parameter file 446b that is then stored on the client device 202 may be used to establish a direct connection 448 between the client device 202 and the access parameter stack 446a running on the resource delivery agent 404. As illustrated, the connection 448 between the client device 202 and the resource delivery agent 404 may use a gateway protocol 450. In some implementations, the gateway protocol 450 may include a feature that enables the client device 202 to immediately reconnect to the resource delivery agent 404 if the connection 448 is lost, rather than having to relaunch through the management infrastructure (including the client access manager 410, the resource delivery controller 412, etc.).

After the client device 202 connects to the resource delivery agent 404, the resource delivery agent 404 may notify the resource delivery controller 412 that the user is logged on. The resource delivery controller 412 may then send this information to the database(s) 420 (shown in FIGS. 4A, 4B and 4D) and the monitor service 460 (shown in FIG. 4D) of the delivery controller 412 may also start logging data in the database(s) 420.

Figure 4D:
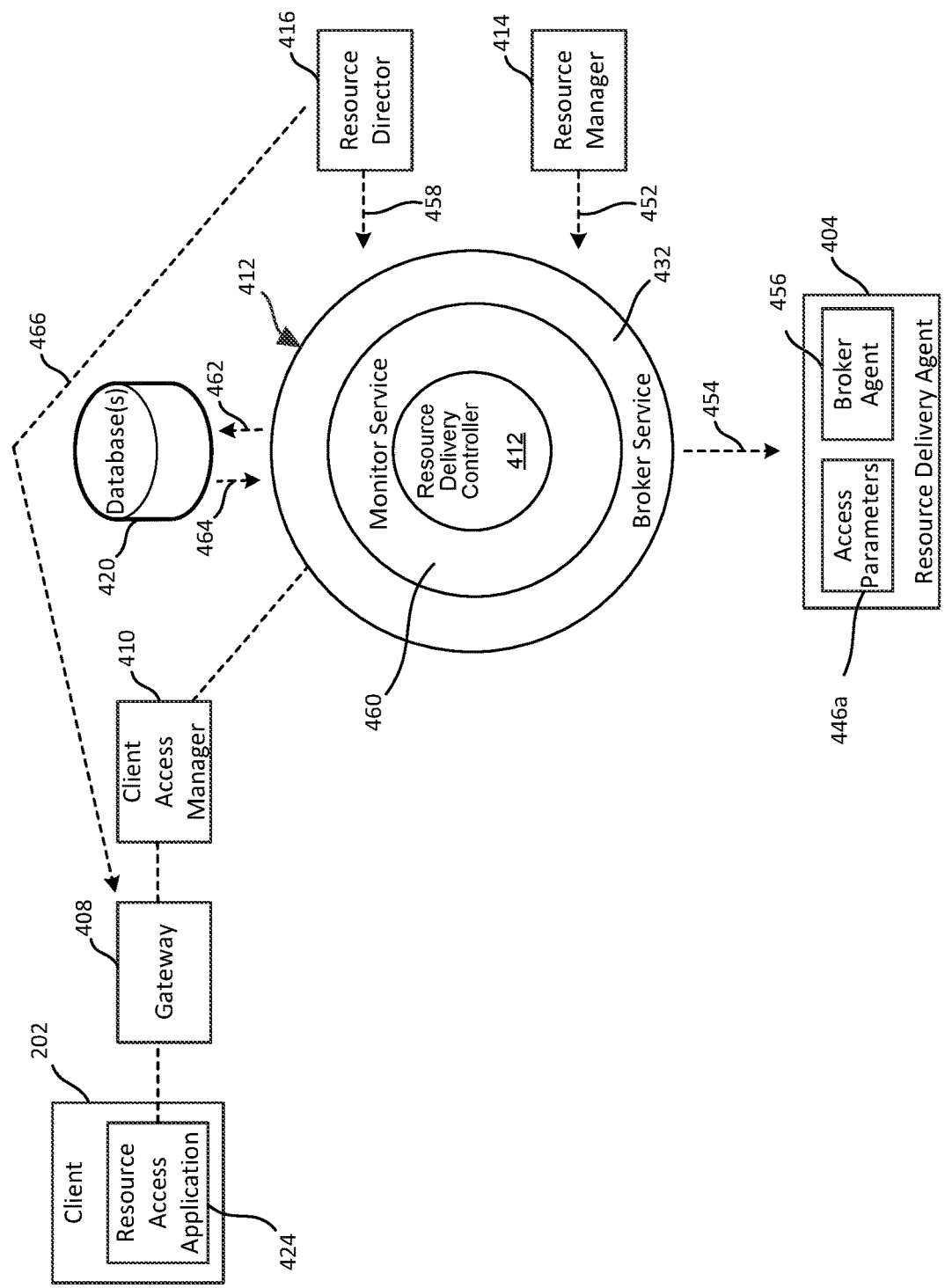
FIG. 4D shows examples of paths through which the resource manager and the resource director shown in FIG. 4B may access stored data.

Such sessions between client devices 202 and resource delivery agents 404 produce data that system administrators can access through the resource manager 414 and/or the resource director 416. FIG. 4D shows examples of paths through which the resource manager 414 and the resource director 416 may access such data in some embodiments. As indicated by the arrows 452 and 454, administrators may use the resource manager 414 to access real-time data from the broker agent 456 of a resource delivery agent 404 (via the broker service 432 of the resource delivery controller 412). The resource director 416 may access the same data, as indicated by arrows 458 and 454, plus any historical data the monitor service 460 of the resource delivery controller 412 stores in the database(s) 420, as indicated by arrows 458, 462 and 464. Further, as indicated by arrow 466, the resource director 416 may also access data from the gateway 408 for help desk support and troubleshooting.

Within the resource delivery controller 412, the broker service 432 may report session data for every session on the machine providing real-time data. The monitor service 460 may also track the real-time data and store it as historical data in the database(s) 420. In some implementations, the resource manager 414 may communicate with the broker service 432 and may access real-time data. The resource director 416 may communicate with the broker service 432 to access the database(s) 420.

An example process for enabling the delivery of applications and/or desktops will now be described. First, the machines that are to deliver applications and/or desktops may be set up with "Machine Catalogs." Then, "Delivery Groups" may be created that specify the applications and/or desktops that are to be made available (using machines in the Machine Catalogs), and which users can access them. In some implementations, "Application Groups" may also be created to manage collections of applications.

Machine Catalogs are collections of virtual or physical machines that can be managed as a single entity. These machines, and the application and/or virtual desktops on them, are the resources that may be made available to users. All the machines in a Machine Catalog may have the same operating system and the same resource delivery agent 404 installed. They may also have the same applications and/or virtual desktops.

In some implementations, a master image may be created and used to create identical virtual machines in the catalog. For virtual machines, the provisioning method may be specified for the machines in that catalog. Valid machine types may, for example, include "Multi-session OS," "Single-session OS," and "Remote PC access." A Multi-session OS machine is a virtual or physical machine with a multi-session operating system. Such a machine may be used to deliver published applications (also known as server-based hosted applications) and published desktops (also known as server-hosted desktops). These machines may allow multiple users to connect to them at one time. A Single-session OS machine is a virtual or physical machine with a single-session operating system. Such a machine may be used to deliver Virtual Desktop Infrastructure (VDI) desktops (desktops running single-session OSs that can optionally be personalized), virtual machine (VM)-hosted apps (applications from single-session OSs), and hosted physical desktops. Only one user at a time can connect to each of these desktops. A Remote PC access machine may enable remote users to access their physical office PCs from any device running the resource access application 424.

Delivery Groups may specify which users can access which applications and/or desktops on which machines. Delivery Groups may include machines from the Machine Catalogs, and Active Directory users who have access to the Site. In some implementations, users may be assigned to Delivery Groups by their Active Directory group, because Active Directory groups and Delivery Groups are ways to group users with similar requirements.

Delivery Groups may contain machines from more than one Machine Catalog, and Machine Catalogs may contribute machines to more than one Delivery Group. In at least some implementations, however, individual machines can only belong to one Delivery Group at a time.

The specific resources that users in the Delivery Group can access may be defined. For example, to deliver different applications to different users, all of the applications may be installed on the master image for one Machine Catalog and enough machines may be created in that catalog to distribute among several Delivery Groups. Delivery Groups may then be configured to deliver a different subset of applications that are installed on the machines.

Application Groups may provide application management and resource control advantages over using more Delivery Groups. Using a "tag restriction" feature, existing machines may be used for more than one "publishing" task, saving the costs of deployment and managing additional machines. A tag restriction can be thought of as subdividing (or partitioning) the machines in a Delivery Group. Application Groups may also be helpful when isolating and troubleshooting a subset of machines in a Delivery Group.

"Tags" may be strings that identify items such as machines, applications, desktops, Delivery Groups, Application Groups, and policies. After creating a tag and adding it to an item, certain operations may be tailored to apply to only items that have a specified tag.

In some implementations, tags may be used to tailor search displays is the resource manager 414. For example, to display only applications that have been optimized for evaluation, a tag named "evaluate" may be created and may then be added (applied) to those applications. A search performed by the resource manager 414 may then be filtered with the tag "evaluate".

In some implementations, tags may be used to "publish" applications from an Application Group or specific desktops from a Delivery Group, considering only a subset of the machines in selected Delivery Groups. Using an Application Group or desktops with a tag restriction may be helpful when isolating and troubleshooting a subset of machines in a Delivery Group.

In some implementations, tags may be used to schedule periodic restarts for a subset of machines in a Delivery Group. Using a tag restriction for machines may, for example, enable the use of new PowerShell cmdlets to configure multiple restart schedules for subsets of machines in a Delivery Group.

In some implementations, tags may be used to tailor the application (assignment) of particular policies to a subset of machines in Delivery Groups, Delivery Group types, or organizational units (OUs) of a Site that have (or do not have) a specified tag. For example, if a particular policy is to be applied only to the more powerful workstations, a tag named "high power" may be applied to those machines and the policy may be set to apply to only machines to which the high power tag has been applied. Tags may additionally or alternatively be applied to particular Delivery Groups and one or more policies may be set to apply only the Delivery Groups to which such tags have been applied.

In some embodiments, the resource manager 414 may be used to create or edit a tag restriction for a desktop in a shared Delivery Group or an Application Group. In some implementations, creating such a tag restriction may involve several steps. First, a tag may be created and then added (applied) to one or more machines. Second a group may be created or edited to include the tag restriction, thus restricting launches to machines with the applied tag. A tag restriction may extend the machine selection process of the broker service 432. In particular, the broker service 432 may select a machine from an associated Delivery Group subject to access policy, configured user lists, zone preference, and launch readiness, plus the tag restriction (if present). For applications, the broker service 432 may fall back to other Delivery Groups in priority order, applying the same machine selection rules for each considered Delivery Group.

Figure 4E:
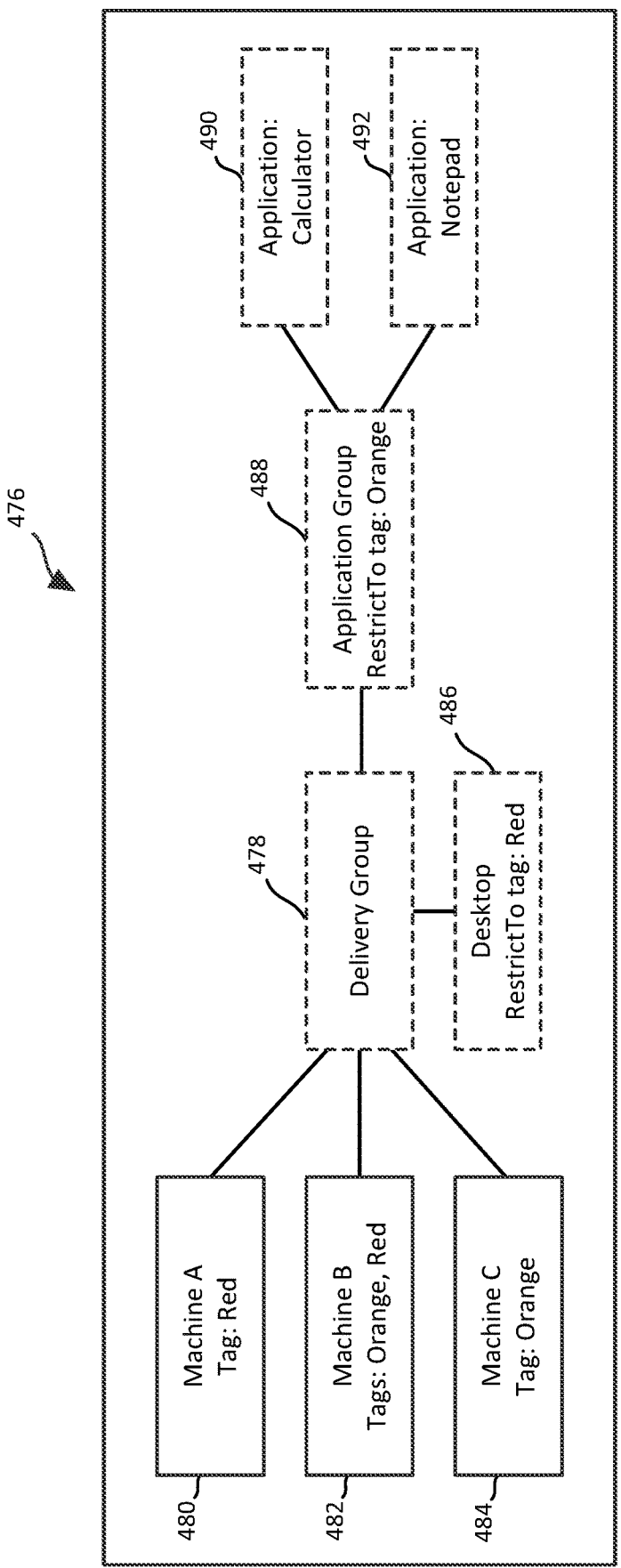
FIG. 4E illustrates a simple layout of a resource delivery system in which tag restrictions may be used to limit which machines will be considered for certain desktop and application launches.

FIG. 4E illustrates a simple layout in which tag restrictions may be used to limit which machines will be considered for certain desktop and application launches. In the illustrated example, a site 476 has one shared Delivery Group 478 configured with three machines 480, 482, 484 and one published desktop 486, and one Application Group 488 configured with two applications 490, 492. As shown, tags may be added to the three machines 480, 482, 484. A tag restriction named "Red" has been applied to the published desktop 486 in the shared Delivery Group 478, so that the published desktop 486 can be launched only on machines in that Delivery Group 478 that have the tag "Red," i.e., the machines 480 and 482. A tag restriction named "Orange" has been applied to the Application Group 488, so that its applications 490, 492 (Calculator and Notepad) can be launched only on machines in the Delivery Group 478 that have the tag "Orange," i.e., the machines 482 and 484. Since the machine 482 has both tags (Red and Orange), it can be considered for launching the applications 490, 492 and the desktop 486.

In some implementations, tags may be created, added (applied), edited, and/or deleted from selected items using the resource manager 414. Tag restrictions may, for example, be configured when creating or editing desktops in Delivery Groups and/or when creating or editing Application Groups.

As noted above, the resource delivery system 400 described in connection with FIGS. 4A-4E may provide virtualization solutions that give administrators control of virtual machines, applications, and security while providing anywhere access for any device. As was also noted above, the resource delivery system 400 may also enable end users to access applications and desktops independently of the operating systems and interfaces of the client devices 202 such end users are operating.

Figure 4F:
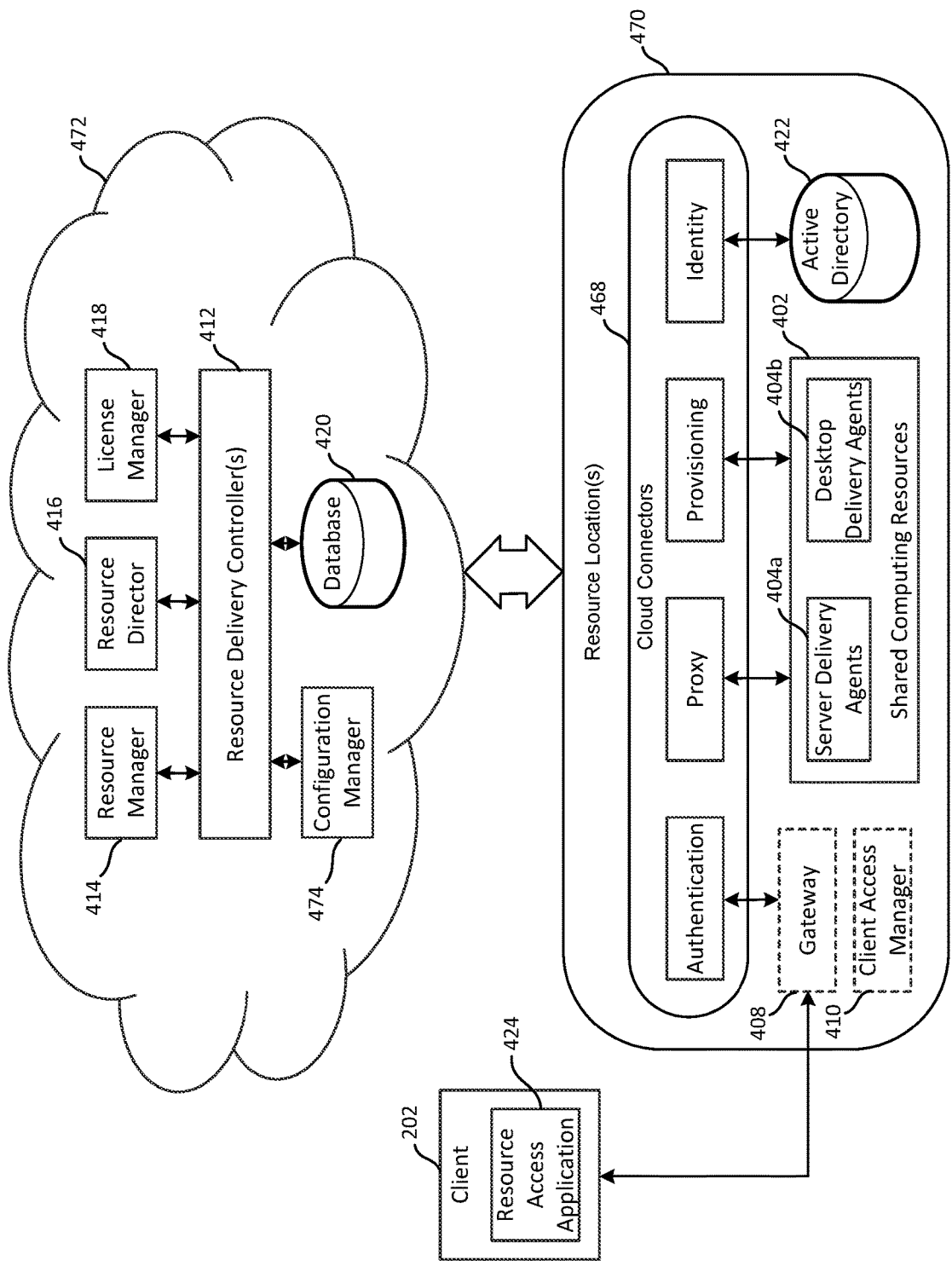
FIG. 4F is a block diagram of a resource delivery system similar to the shown in FIG. 4A but in which several elements are provided as a service within a cloud-based computing environment.

In some implementations, one or more components of the resource delivery system 400 may be provided as a service within a cloud-based computing environment. FIG. 4F illustrates an example of such an implementation. As shown in FIG. 4F, one or more cloud connectors 468 may enable various resources at one or more locations 470 outside of a cloud computing environment 472 to interface with various components within the cloud computing environment 472. As illustrated, resource location(s) 470 may include the machines and other resources that deliver applications and/or desktops to client devices 202. The resource location 470 may optionally include the gateway 408 and/or client access manager 410 previously described. In the illustrated example, the resource delivery controller(s) 412, the resource manager 414, the resource director 416, the license manager 418, and the database(s) 420 are all provided within the cloud computing environment 472. Further, as shown in FIG. 4F, a configuration manager 474 may additionally be hosted within the cloud computing environment 472 in some implementations. Examples of management functions that may be performed by the configuration manager 474 are described below. In some implementations, the cloud computing environment 472 may correspond to a public cloud computing infrastructure, such as AZURE CLOUD provided by Microsoft Corporation of Redmond, Wash., or AMAZON WEB SERVICES provided by Amazon.com, Inc., of Seattle, Wash.

In addition to serving as a channel for communication between the cloud computing environment 472 and the resource location(s) 470, the cloud connectors 468 may enable cloud management without requiring any complex networking or infrastructure configuration such as virtual private networks (VPNs) or Internet Protocol Security (IPsec) tunnels.

As noted above, the resource delivery controller(s) 412 may serve as the central control layer component in a deployment. The resource delivery controller(s) 412 may communicate through the cloud connectors 468 in each resource location 470 to distribute applications and/or desktops, authenticate and manage user access, broker connections between users and their virtual desktops and/or applications, optimize use connections, and/or load-balance use connections. In some implementations, the resource delivery controller(s) 412 may additionally track which users are logged on and where, which session resources the users have, and if users need to reconnect to existing applications.

The resource delivery controller(s) 412 may further manage the state of desktops, starting and stopping them based on demand and administrative configuration, in some implementations.

The configuration manager 474 in the cloud computing environment 472 may (A) enable administrators to specify which services are to be made available to users via the resource access application, (B) customize the uniform resource locator (URL) that the resource access application 424 is to use to access the available resources, (C) customize the appearance of the user interface provided by the resource access application, such as logos, color, and preferences, (D) specify how users are to authenticate to the system, such as using the Active Directory 422, and/or (E) specify external connectivity for the resource locations 470.

As noted above, a resource location 470 may include at least one cloud connector 468 that serves as the communications channel between the components in the cloud computing environment 472 and the components in the resource location 470. In the resource location 470, the cloud connector(s) may act as a proxy for the resource delivery controller(s) 412 in the cloud computing environment 472.

As noted above, the physical or virtual machines that deliver applications and/or desktops may include resource delivery agents 404a, 404b. The resource delivery agents 404 may register with at least one cloud connector 468. After registration, connections may be brokered from those resources to users. The resource delivery agents 404 may further establish and manage the connection between the machine and the client device 202, and apply policies that are configured for the session. The resource delivery agents 404 may communicate session information to the cloud connector 468 through the broker agent 456 (shown in FIG. 4D) in the resource delivery agent 404. As noted above, in some implementations, such a broker agent 456 may host multiple plugins and collect real-time data.

A host connection may be established that enables communication between components in the cloud computing environment 472 and the resource delivery agents 404 on the shared computing resources 402. Specifications for such host connections may include (A) the address and credentials to access the host, (B) the tool that is to be used to create VMs, (C) the storage method to use, (D) the machines to use for storage, and/or (E) which network the VMs will use.

Figure 5A:
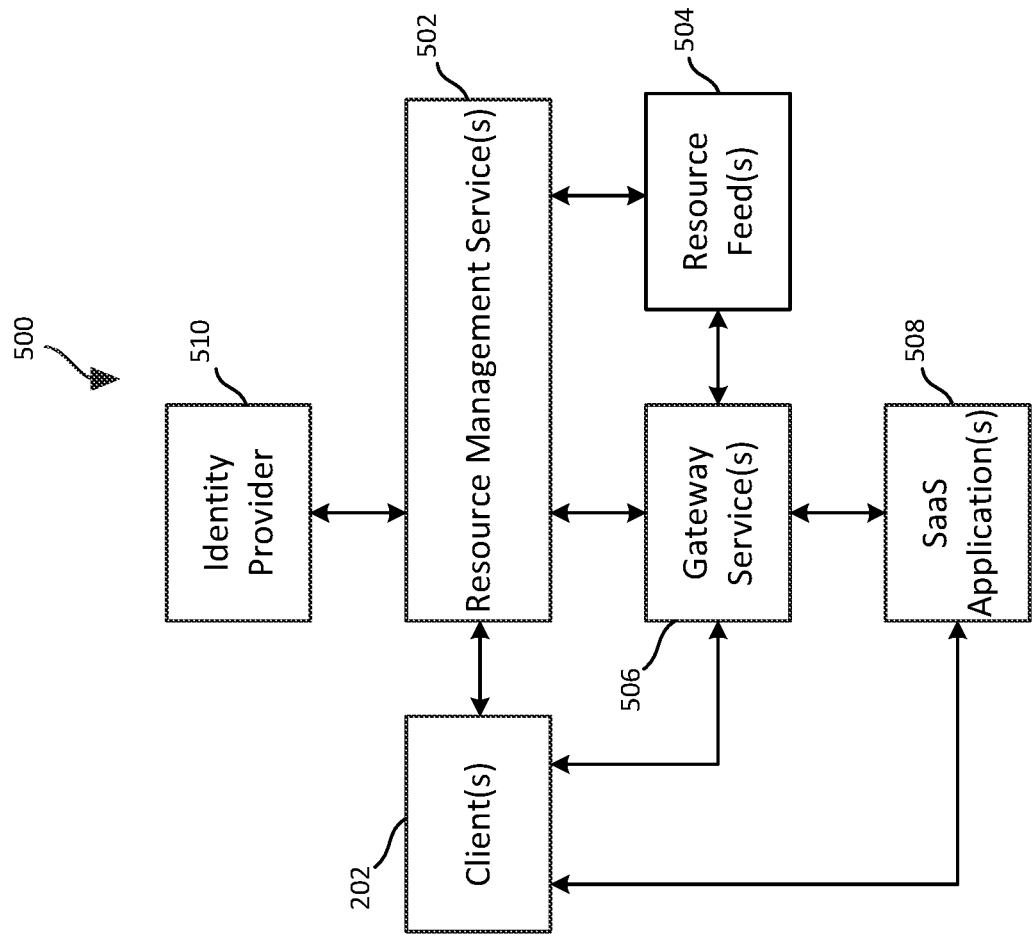
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
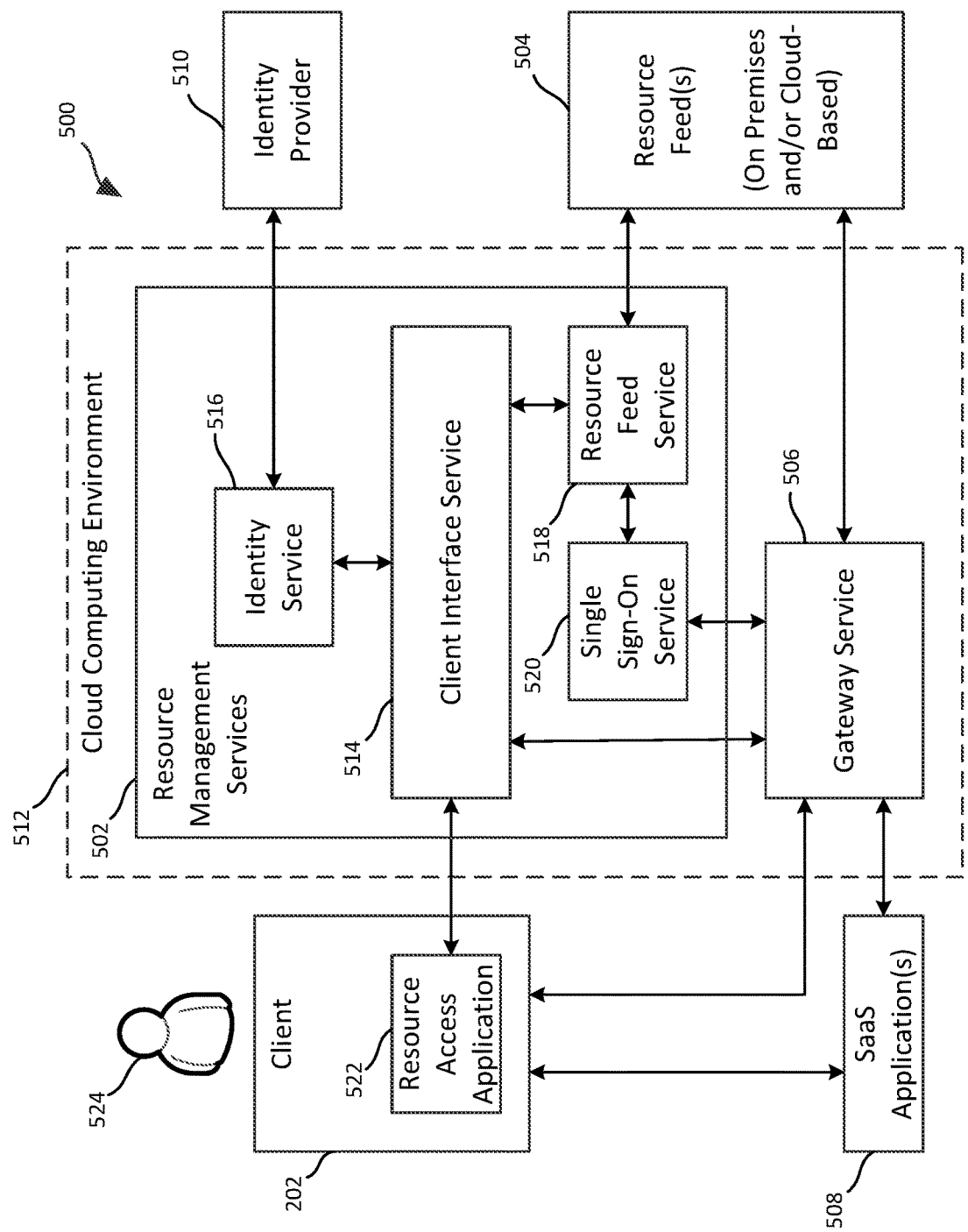
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

F. Example Architecture of a Resource Virtualization Server

Figure 6:
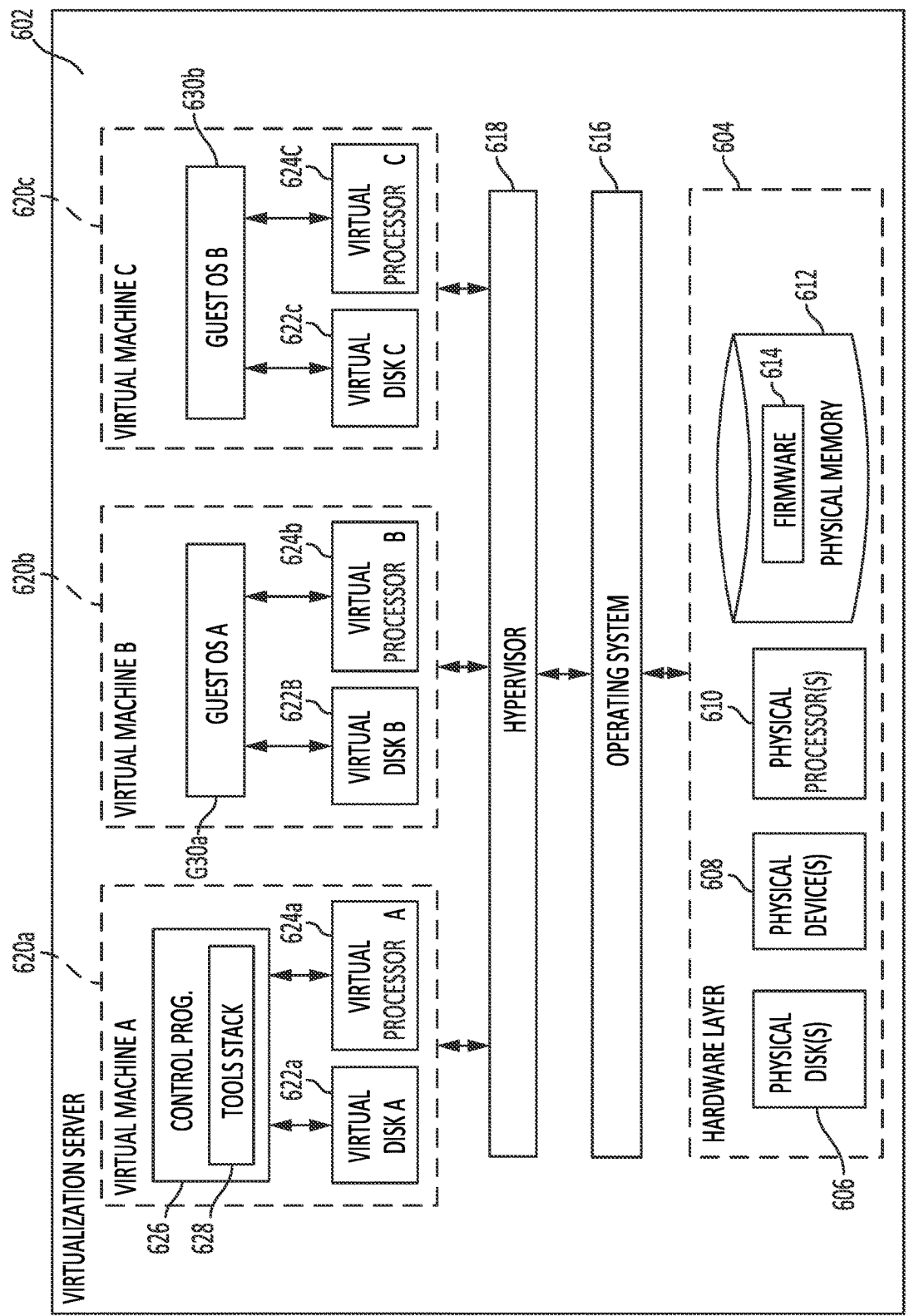
FIG. 6 depicts an example virtualized (hypervisor) system architecture that may be used in accordance with one or more embodiments described herein.

FIG. 6 shows an example architecture of an illustrative resource virtualization server 602. As shown, the resource virtualization server 602 may be configured to provide virtual desktops and/or virtual applications to one or more client access devices, such as the clients 202. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Instances of the operating system may be physical (e.g., one operating system per physical device) or virtual (e.g., many instances of an OS running on a single physical device). The applications may be executed on a local device, or executed on a remotely located device (e.g., remoted).

The virtualization server 602 illustrated in FIG. 6 may be deployed as and/or implemented by one or more of the servers 204 described above, the servers that make up a virtualization server system, or by other known computing devices. Included in the virtualization server 602 is a hardware layer 604 that may include one or more physical disks 606, one or more physical devices 608, one or more physical processors 610, and one or more physical memories 612. In some embodiments, firmware 614 may be stored within a memory element in physical memory 612 and be executed by one or more of the physical processors 610. The virtualization server 602 may further include an operating system 616 that may be stored in a memory element in physical memory 612 and executed by one or more of physical processors 610. Still further, a hypervisor 618 may be stored in a memory element in the physical memory 612 and be executed by one or more of the physical processors 610. Presence of the operating system 616 may be optional such as in a case where the hypervisor 618 is a Type 1 hypervisor; that is, a bare-metal hypervisor installed directly on the hardware layer 604. In some implementations, the hypervisor 618 may be a Type 2 hypervisor, which executes on a host operating system, such as the OS 616, which may provide virtualization services such as I/O device support and memory management.

Executing on one or more of the physical processors 610 may be one or more virtual machines 620*a*-*c* (generally 620). The virtual machines 620 may have respective virtual disks 622*a*-*c* and virtual processors 624*a*-*c*. In some embodiments, a first virtual machine 620*a* may execute, using the virtual processor 624*a*, a control program 626 that includes a tools stack 628. The control program 626 may be referred to as a control virtual machine, Domain 0, Dom0, or other virtual machine used for system administration and/or control. In some embodiments, one or more of the virtual machines 620*b*-*c* may execute, using a virtual processor 624*b*-*c*, a guest operating system 630*a*-*b* (generally 630).

The physical devices 608 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 602. The physical memory 612 in hardware layer 604 may include any type of memory. The physical memory 612 may store data, and in some embodiments may store one or more programs, or set of executable instructions. FIG. 6 illustrates an embodiment where firmware 614 is stored within physical memory 612 of virtualization server 602. Programs or executable instructions stored in physical memory 612 may be executed by the one or more of the processors 610 of the virtualization server 602.

The virtualization server 602 may also include hypervisor 618. In some embodiments, the hypervisor 618 may be a program executed by processors 610 on the virtualization server 602 to create and manage any number of virtual machines 620. The hypervisor 618 may be referred to as a virtual machine monitor, or platform virtualization software. In some embodiments, the hypervisor 618 may be any combination of executable instructions and hardware that monitors virtual machines 620 executing on a computing machine. The hypervisor 618 may be a Type 2 hypervisor, where the hypervisor executes within operating system 616 executing on virtualization server 602. The virtual machines may then execute at a layer above hypervisor 618. In some embodiments, the Type 2 hypervisor may execute within the context of a user's operating system such that the Type 2 hypervisor interacts with the user's operating system. In other embodiments, one or more virtualization servers 602 in a virtualization environment may instead include a Type 1 hypervisor (not shown). A Type 1 hypervisor may execute on the virtualization server 602 by directly accessing the hardware and resources within hardware layer 604. That is, while the Type 2 hypervisor 618 accesses system resources through host operating system 616, as shown, a Type 1 hypervisor may directly access all system resources without host operating system 616. A Type 1 hypervisor may execute directly on one or more physical processors 610 of the virtualization server 602, and may include program data stored in the physical memory 612.

The hypervisor 618, in some embodiments, may provide virtual resources to the guest operating systems 630 or control programs 626 executing on virtual machines 620 in any manner that simulates the operating systems 630 or control programs 626 having direct access to system resources. System resources may include, but are not limited to, the physical devices 608, the physical disks 606, the physical processors 610, physical memory 612, and any other component included in the hardware layer 604 of the virtualization server 602. The hypervisor 618 may be used to emulate virtual hardware, partition physical hardware, virtualize physical hardware, and/or execute virtual machines that provide access to computing environments. In still other embodiments, the hypervisor 618 may control processor scheduling and memory partitioning for the virtual machine 620 executing on the virtualization server 602. Examples of hypervisor 618 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, the virtualization server 602 may execute a hypervisor 618 that creates a virtual machine platform on which the guest operating systems 630 may execute. In these embodiments, the virtualization server 602 may be referred to as a host server. An example of such a virtualization server is Citrix Hypervisor® provided by Citrix Systems, Inc., of Fort Lauderdale, Fla.

The hypervisor 618 may create one or more virtual machines 620*b-c* (generally 620) in which guest operating systems 630 execute. In some embodiments, the hypervisor 618 may load a virtual machine image to create a virtual machine 620. The virtual machine image may refer to a collection of data, states, instructions, etc. that make up an instance of a virtual machine. In other embodiments, the hypervisor 618 may execute guest operating system 630 within the virtual machine 620. In still other embodiments, the virtual machine 620 may execute the guest operating system 630.

In addition to creating the virtual machines 620, the hypervisor 618 may control the execution of at least one virtual machine 620. In other embodiments, the hypervisor 618 may present at least one virtual machine 620 with an abstraction of at least one hardware resource provided by the virtualization server 602 (e.g., any hardware resource available within hardware layer 604). In other embodiments, the hypervisor 618 may control the manner in which the virtual machines 620 access physical processors 610 available in the virtualization server 602. Controlling access to the physical processors 610 may include determining whether the virtual machine 620 should have access to the processor 610, and how physical processor capabilities are presented to the virtual machine 620.

As shown in FIG. 6, the virtualization server 602 may host or execute one or more virtual machines 620. A virtual machine 620 may be a set of executable instructions and/or user data that, when executed by processor 610, may imitate the operation of a physical computer such that the virtual machine 620 may execute programs and processes much like a physical computing device. While FIG. 6 illustrates an embodiment where the virtualization server 602 hosts three virtual machines 620, in other embodiments the virtualization server 602 may host any number of virtual machines 620. The hypervisor 618, in some embodiments, may provide the virtual machines 620 with unique virtual views of the physical hardware, including the memory 612, the processor 610, and other system resources 606, 608 available to the respective virtual machines 620. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 618 may create one or more unsecure virtual machines 620 and one or more secure virtual machines 620. The unsecure virtual machines 620 may be prevented from accessing resources, hardware, memory locations, and programs that the secure virtual machines 620 may be permitted to access. In other embodiments, the hypervisor 618 may provide the virtual machines 620 with substantially similar virtual views of the physical hardware, memory, processor, and other system resources available to the virtual machines 620.

The virtual machines 620 may include respective virtual disks 622*a-c* (generally 622) and virtual processors 624*a-c* (generally 624.) The virtual disk 622, in some embodiments, may be a virtualized view of one or more physical disks 606 of the virtualization server 602, or a portion of one or more physical disks 606 of the virtualization server 602. The virtualized view of the physical disks 606 may be generated, provided, and managed by the hypervisor 618. In some embodiments, the hypervisor 618 may provide the virtual machines 620 with unique views of the physical disks 606. Thus, in these embodiments, a particular virtual disk 622 included in a respective virtual machine 620 may be unique when compared with other virtual disks 622.

The virtual processor 624 may be a virtualized view of one or more physical processors 610 of the virtualization server 602. In some embodiments, the virtualized view of physical processors 610 may be generated, provided, and managed by the hypervisor 618. In some embodiments, the virtual processor 624 may have substantially all of the same characteristics of at least one physical processor 610. In other embodiments, the virtual processor 610 may provide a modified view of the physical processors 610 such that at least some of the characteristics of the virtual processor 624 are different from the characteristics of the corresponding physical processor 610.

Figure 7:
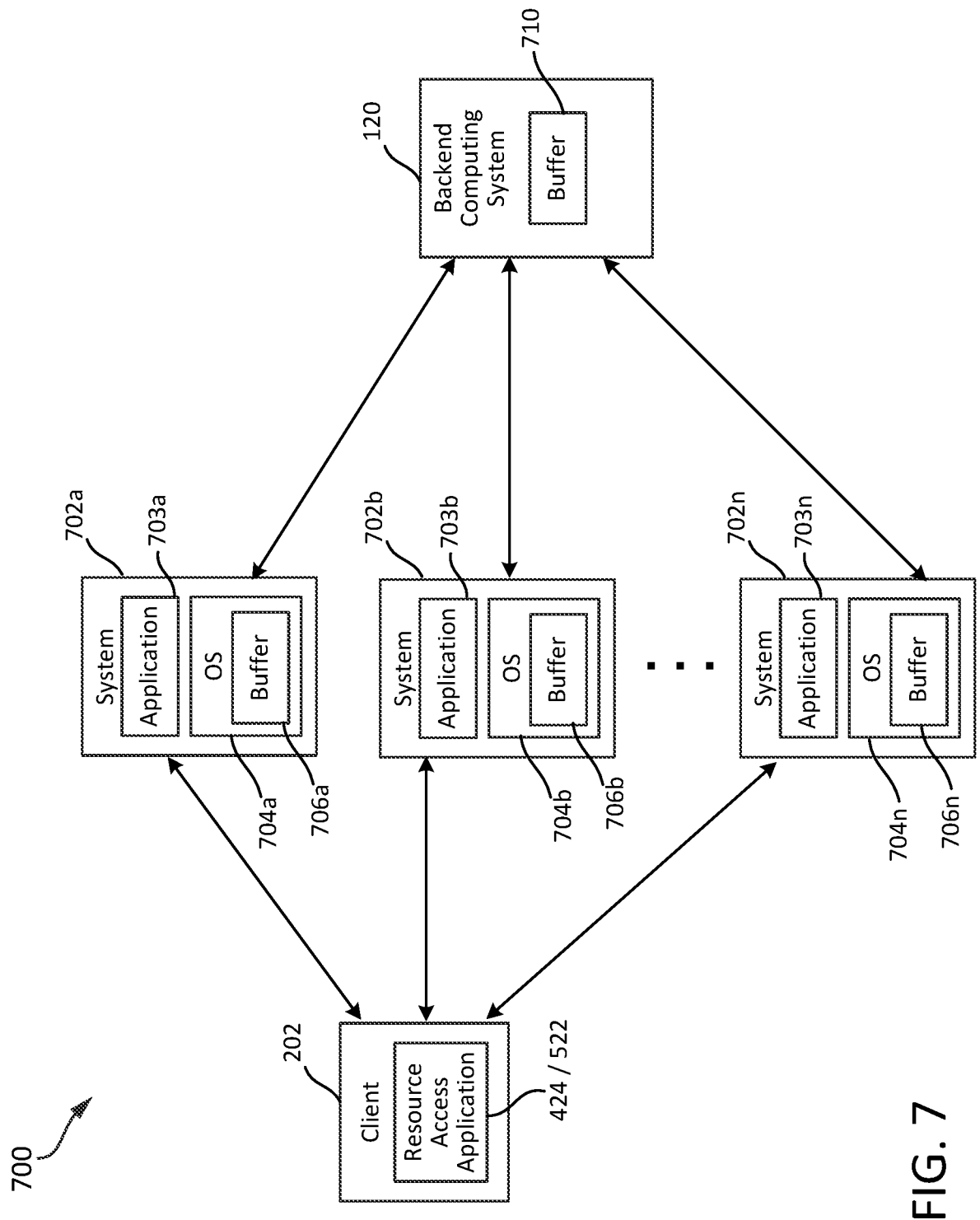
FIG. 7 shows an example system for transferring data between computing systems in accordance with one or more embodiments described herein.

G. Detailed Description of Example Embodiments of the System for Transferring Data Between Computing Systems Introduced in Section A FIG. 7 shows an example system 700 for transferring data (e.g., buffer data) between remote computing systems (e.g., systems 702a, 702b . . . 702n) accessed via the client device 202, without transferring the data to the client device 202. As shown, in some implementations, the client device 202 may include the resource access application 424 described above in relation to FIGS. 4A-F (in Section D) and/or the resource access application 522 described above in relation to FIGS. 5A-B (in Section E). As described above in Sections A, D and E, using the resource access application 424/522, the client device 202 may access multiple remotely hosted resources, such as, applications, desktops, files, etc., at the same time. Shown in FIG. 7 are multiple systems 702 that may host one or more applications 703 and may deliver virtualized versions of those applications 703 to the client device 202. Each of the systems 702 may include an operating system 704 and a buffer 706 (e.g., a clipboard) to store copied data and/or pasted data for the respective operating systems 704. In some implementations, each of the systems 702 may include one or more servers 204 (examples of which are described above in connection with FIGS. 2 and 3) or other computing systems. The systems 702a and 702b may, for example, correspond to the first computing system 102 and the second computing system 112, respectively, described above in relation to FIG. 1. Similarly, the application 703a and the application 703b may, for example, correspond to the (first) application 106 and the (second) application 116, respectively, described above in relation to FIG. 1. As such, it should be understood that, in some implementations, the systems 702a and 702b may be implemented as respective shared computing resources 402 configured to deliver one or more virtual applications and/or desktops to the client device 202, as described above in connection with FIGS. 4A-F.

Also shown in FIG. 7 is the backend computing system 120 (introduced in connection with FIG. 1), which may be used to facilitate copy/cut-and-paste functionalities between the systems 702 and/or the applications 703. As shown, in some implementations, the backend computing system 120 may include a memory or a buffer 710 (e.g., a clipboard) to store data received from one or more of the systems 702, so as to facilitate the transfer of that data to one or more of the other systems 702. The buffer 710 may be provided by the operating system 704 to enable short-term storage and transfer of data within and between applications 703. The buffer 710 may be a temporary and unnamed memory space, and its contents may reside in the RAM of the system 702. The operating system 704 that supports a clipboard/buffer 710 may provide an application programming interface (API) by which the application 703 may specify cut, copy and paste operations. When data is copied or cut, the buffer 710 may store enough information to enable a sensible result no matter where the data is pasted.

In some implementations, there may be one backend computing system 120 that is configured to facilitate copy/cut-and-paste functionalities for multiple users of multiple different organizations. In such implementations, the functionality of the backend computing system 120 may, for example, be provided as cloud-based service. In other implementations, there may be multiple separate backend computing systems 120. For example, in some implementations, a first backend computing system 120 may facilitate copy/cut-and-paste functionalities for users of a first organization, and a second backend computing system 120 may facilitate copy/cut-and-paste functionalities for users of a second organization, thus limiting exposure of the data between organizations.

In some implementations, trust between the systems 702 may be established for a user session based on the user logging in or otherwise authenticating to the platforms described above in Sections D and E. For example, the broker service 432 (shown in FIGS. 4B-D) may be responsible for establishing trust between the systems 702 based on existing registration and security mechanisms within the system 400, including but not limited to using machine creation services (MSC), provisioning services (PVS), FMA trust, identity disks with key pairs, etc.

Figure 8A:
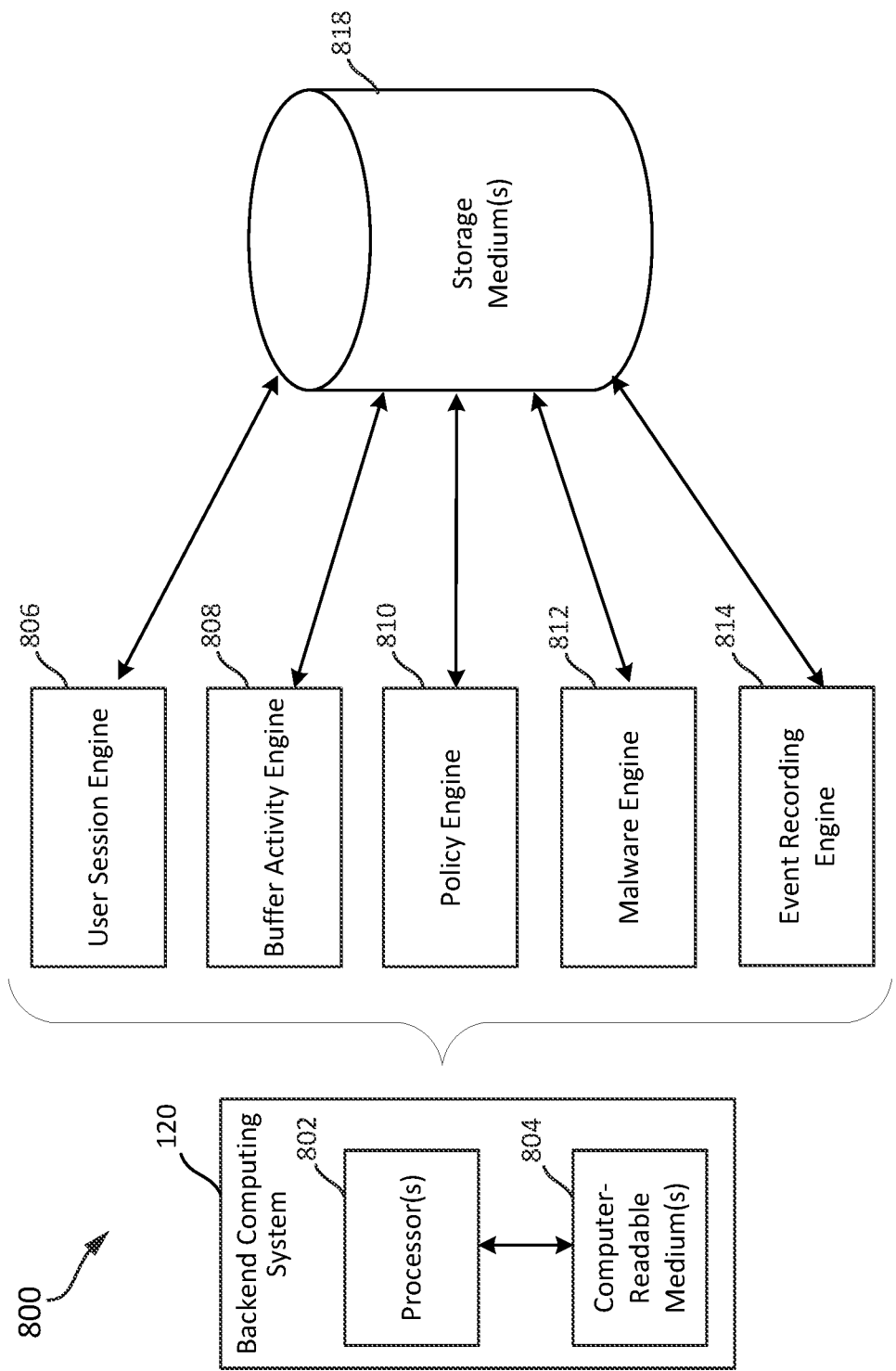
Figure 8C:
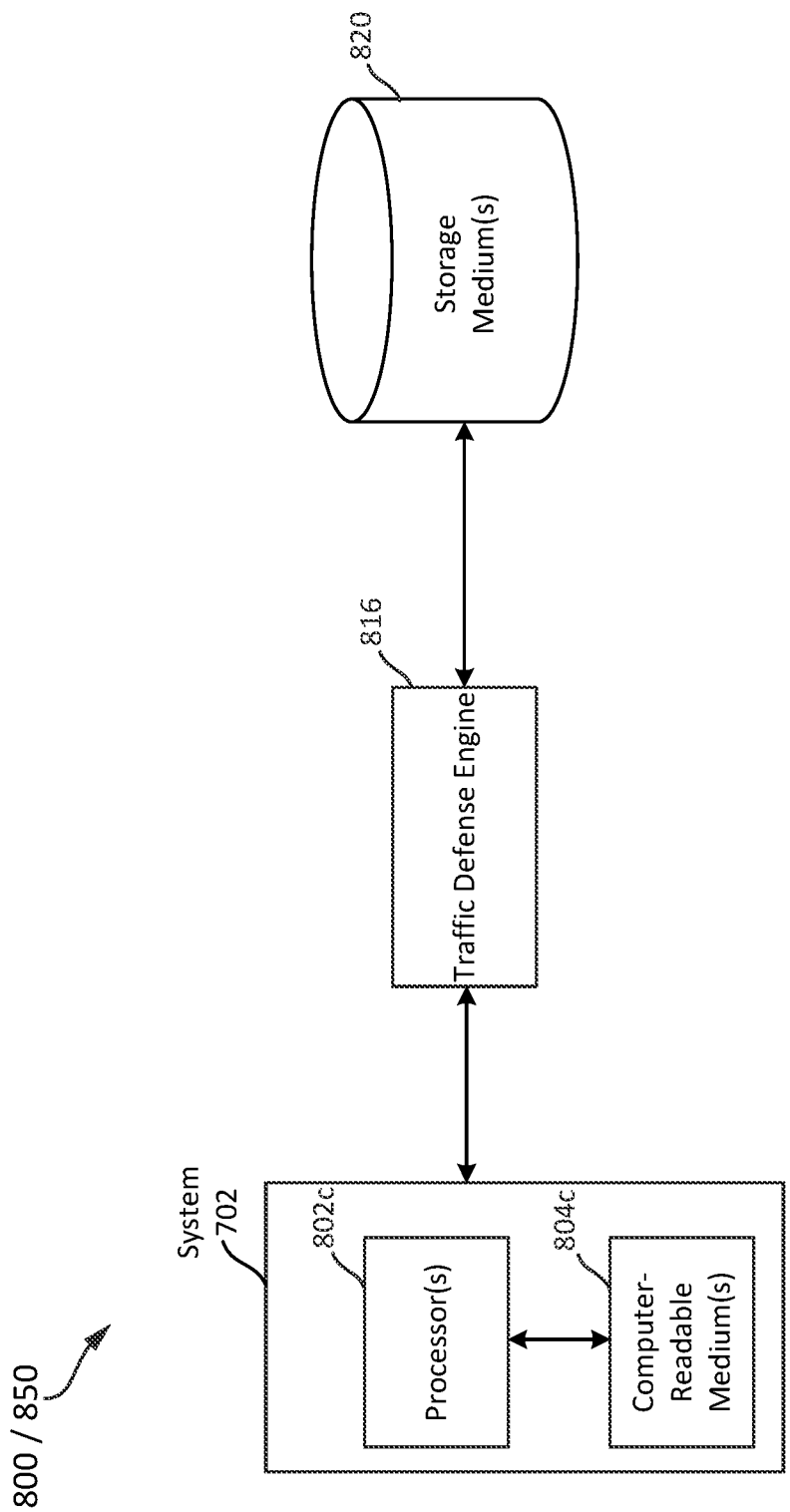

FIGS. 8A and 8B show example components of a system 800 and a system 850, respectively, for facilitating the transfer of buffer data between the systems 702 (shown in FIG. 7) and that may be used to implement at least some of the functionality described above in Section A. As shown, in each of the systems 800, 850, the backend computing system 120 may include one or more processors 802, one or more computer-readable mediums 804 that are encoded with instructions to be executed by the processor(s) 802, and one or more storage mediums 818. In some implementations, such instructions may cause the processor(s) 802 to implement one or more, or possibly all, of the functional engines shown in FIGS. 8A and 8B. As shown, those functional engines may include a user session engine 806, a buffer activity engine 808, a policy engine 810, a malware engine 812, and an event recording engine 814. FIG. 8C shows an example component of the system 702, which may be part of the systems 800 and 850. The system 702, in some implementations, may include a traffic defense engine 816. As shown, the system 702 one or more processors 802c, one or more computer-readable mediums 804c that are encoded with instructions to be executed by the processor(s) 802c, and one or more storage mediums 820. In some implementations, such instructions may cause the processor(s) 802c to implement the traffic defense engine shown in FIG. 8C.

The processor(s) 802 and computer-readable medium(s) 804, and the respective functional engines 806-816 embodied by those components, may be disposed at any of a number of locations within a computing network that includes the backend computing system 120. The storage medium(s) 818 may likewise be deployed at any of a number of locations within such a computing network in distributed architecture or fashion. In some implementations, one or more of the functional engines 806-816 and/or the storage medium(s) 818 may additionally or alternatively be deployed within one or more components of a resource delivery system, such as the resource delivery system 400 described above in connection with FIGS. 4A-F. For example, in some implementations, one or more of the functional engines 806-816 and/or the storage medium(s) 818 may be located within the gateway 408 and/or the resource delivery controller 412 described in connection with FIGS. 4A-F, and/or within one or more other system components that operate in conjunction with those elements. In some implementations, one or more of the functional engines 806-816 and/or the storage medium(s) 818 may additionally or alternatively be disposed within one or more components of a resource delivery system, such as the resource delivery system 500 described above in connection with FIGS. 5A-B. For example, in some implementations, one or more of the functional engines 806-816 and/or the storage medium(s) 818 may be located within the gateway service(s) 506 and/or the resource management service(s) 502 described in connection with FIGS. 5A-B, and/or within one or more other system components that operate in conjunction with those elements.

In some implementations, the backend computing system 120 may include multiple servers, such as a server 852 and a server 854, as shown in FIG. 8B. The respective servers 852 and 854 may include one or more processors 802a, 802b and computer readable mediums 804a, 804b, and may store data in separate storage mediums 818a, 818b. In some implementations, the engines 806-816 may be distributed amongst the multiple servers of the backend computing system 120. As shown in FIG. 8B, for example, in some implementations, the user session engine 806, the buffer activity engine 808 and the event recording engine 814 may be implemented at the server 852 of the backend computing system 120, and the policy engine 810, and the malware engine 812 may be implemented at the server 854 of the backend computing system 120. In such an embodiment, the server 852 may not know the contents of the copied data, e.g., when the copied data is encrypted by the system 702 prior to sending it (e.g., as encrypted data 110) to the backend computing system 120. As described in more detail below, in some implementations, the server 854 may have the ability to decrypt the encrypted data 110 and perform certain security measures and steps with respect to the copied data, as described in detail below.

In some implementations, one or more of the engines, shown in FIG. 8A, may be implemented within a service provided at the backend computing system 120, while one or more of the other engines may be implemented within a separate service provided at the backend computing system 120. For example, a first service may implement the user session engine 806, the buffer activity engine 808 and the event recording engine 814, while a second service (which may be configured to perform certain security measures) may implement the policy engine 810 and the malware engine 812. In some implementations, the services may be implemented at separate different servers, for example, the first service may be implemented at the server 852 (shown in FIG. 8B) and the second service may be implemented at the server 854. In other implementations, the two services may be implemented at the same server. The second service, configured to perform certain security measures, may be able to decrypt the encrypted copied data, to evaluate the copied data to approve sending of the copied data to other systems 702 based on, for example, one or more policies being satisfied, and/or scanning of the copied data for malware.

To enable decryption, by the backend computing system 120 (e.g., the second service or the server 854) and the second system 702b, of the encrypted copied data sent by the system 702a, the system 700 may employ a mechanism for establishing an encryption key that is shared by/known to a group consisting of several components of the system 700. In some implementations, an encryption key may be sent by the system 702a to the backend computing system 120 and the system 702b. In other implementations, an encryption key may be sent by the resource access application 424/522 at the client device 202 (or by another component shown in FIGS. 4A-4D), and may be sent to the systems 702 and the backend computing system 120 based on the broker service 432 (shown in FIGS. 4A-4D) establishing a trusted relationship/connection between the client device 202 and the systems 702. In other implementations, an encryption key may be agreed upon, by exchanging cryptographic messages, by the systems 702 and the backend computing system 120.

In establishing an encryption key for a group of components, in some implementations, the key may be a symmetric key, and in other implementations, the key may be an asymmetric key. The lifetime of the encryption key (how long is the key is valid) may be determined by the system 702. In other implementations, the lifetime of the encryption key may be determined by the resource access application 424/522 based on a user session being active at the client device 202 to access the systems 702.

In some implementations, the encryption key for the group of members/components may be established based on the following parameters: a maximum number of members allowed in the group (e.g., less than 10 components); control over which components are in the group (e.g., external control exercised by the resource delivery system 400/500 described above); member trust level (e.g., universal where all components trust each other based on a trusted relationship/connection established by the resource delivery system 400/500); member communication path (e.g., hub and spoke setup, where all components may communicate via a specified entity but cannot communicate directly with each other); member communications (e.g., unconstrained where communications may occur at any time); maximum lifetime of the encryption key (e.g., one week); maximum data sensitivity (e.g., moderate); maximum data volume per encryption key session (e.g., 10 MB); cryptographic processing (e.g., unconstrained enabling use of various key sizes, no resource limit); and cryptographic assurance (e.g., cryptomodule and algorithms); key confinement (e.g., within the operating system 704).

In an example routine the resource delivery system 400/500 may distribute a key(s) (e.g., by sending the key(s) or sending cryptographic messages) to the systems 702 to enable the systems 702 to encrypt data prior to sending to the backend computing system 120 and to decrypt data received from the backend computing system 120. In some implementations, the key(s) may be also be distributed to the backend computing system 120, for example, to the server 854 (or the second service) so that the key(s) are not visible/accessible by the server 852 (or the first service), and the server 854 (or the second service) is able to decrypt the copied data to perform security measures. The resource delivery system 400/500 may determine that the application 703a and the application 703b are to be operated under control of the client device 202. In some implementations, this determination may be based on the user initiating a user session at the client device 202 and opening the applications 703a and 703b. In other implementations, this determination may be based on which systems 702 (resources) are enabled to provide virtualized applications 703 according to the resource delivery system 400/500 as described above in Sections D and E. In such implementations, the key(s) may be distributed to the systems 702 prior to the user establishing a session at the client device 202.

In some implementations, the system 702 may use the encryption key to encrypt the copied data at an application level. For example, the system 702a may encrypt the data written to the buffer 706a, and send the encrypted data to the backend computing system 120/the server 852 and/or the server 854 for processing as described below in detail. The system 702b may decrypt data received from the backend computing system 120. Additionally, the server 854 (or the second service) may decrypt the data received from the system 702a.

In some implementations, the system 702 may use the encryption key to encrypt the copied data at a transport layer (e.g., TLS encryption). For example, the system 702a may prepare a message including the data written to the buffer 706a, and the system 702a may encrypt the message prior to sending it to the backend computing system 120.

In some implementations, a Multicast Security (MSEC) key management protocol may be used to support application layer and transport layer encryption, and to facilitate secure one-to-many, many-to-many or one-to-one communications.

In some implementations, a Group Domain of Interpretation (GDOI) protocol may be used to support encryption. In this group key management model, the GDOI protocol participants may be a Group Controller/Key Server (GCKS) and a group member (GM). A group member may contact (register with) a GCKS to join the group. During the registration, mutual authentication and authorization may be achieved, after which the GCKS distributes current group policy and encryption keying material to the group member over an authenticated and encrypted session. The GCKS may also initiate contact (rekeys) with group members to provide updates to group policy.

In some implementations, a Constrained Application Protocol (CoAP) may be used to support encryption. CoAP is a specialized web transfer protocol, for constrained devices and constrained networks, based on Representational State Transfer (REST).

In some implementations, a Messaging Layer Security (MLS) protocol may be used to support encryption. One of the MLS protocols may involve tree structures that enable asynchronous group keying with forward secrecy and post-compromise security.

In some implementations, a Simple Group Keying Protocol (SGKP) may be used to distribute encryption keys to the systems 702 and the server 854 (or the second service) by the resource delivery system 400/500.

In some implementations, the client device 202 may be used to authorize the buffer data transfer from the system 702a to the system 702b, without the client device 202 receiving or otherwise retrieving the buffer data. In some implementations, for example, a combination of symmetric key encryption and asymmetric key encryption may be used to perform such authorization by the client device 202. In such implementations, the system 702a may encrypt the copied data with a symmetric key generated by the system 702a, and the system 702a may encrypt the symmetric key of the system 702a with a public key (part of an asymmetric key pair) of the client device 202. In order to write the data in the buffer 706b at the system 702b, the client device 202 may authorize the system 702b to decrypt the data received by the system 702b from the backend computing system 120. For example, the system 702b may display a dialog box (or other output) at the client device 202, prior to writing the data at the buffer 706b and after receiving the data from the backend computing system 120 for writing in the buffer 706b. The dialog box may request authorization from the user to write the data in the buffer 706b (e.g., make the data available in the clipboard at the system 702b), and in response to receiving the authorization from the user via the client device 202, the system 702b may write the data in the buffer 706b. In another implementation, the data may be authorized by the client device 202 without the user's involvement. In this case, the authorization may be performed by the client device 202, via the resource access application 424/522, by re-encrypting the encryption key of the system 702a with a public key (part of an asymmetric key pair) of the system 702a or the system 702b. The re-encryption of the key may indicate to the system 702b that the client device 202 is authorizing writing of the data in the buffer. Thus, although the client device 202 does not channel or "see" any buffer data, the client device 202 may participate in authorizing transfer of buffer data to the system 702b, as long as it trusts both of the system 702a and the system 702b. This form of encrypting may be referred to as "self" encrypting, and may maintain the ability for data to be decrypted by the backend computing system 120 and/or another server for security purposes (e.g., checking compliance with policies, scanning for malicious content, etc.).

Figure 9:
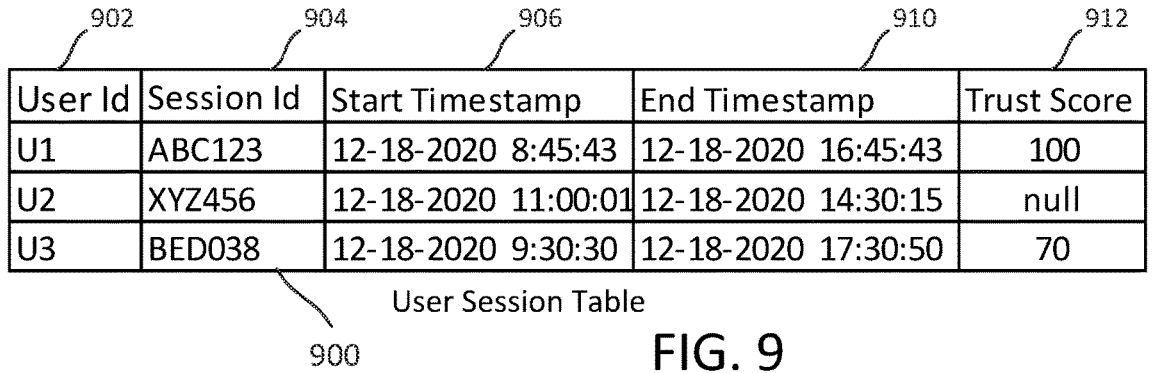
FIG. 9 shows an example user session table that may be used in connection with some embodiments of the systems shown in FIGS. 7, 8A and 8B.
Figure 10:
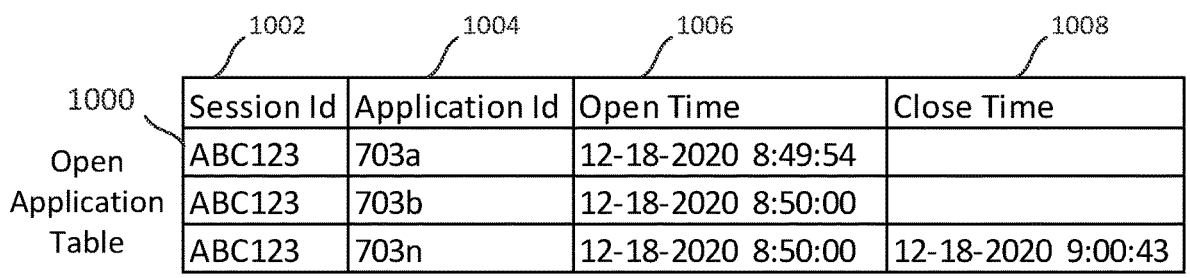
FIG. 10 shows an example open application table that may be used in connection with some embodiments of the systems shown in FIGS. 7, 8A and 8B.
Figure 11:
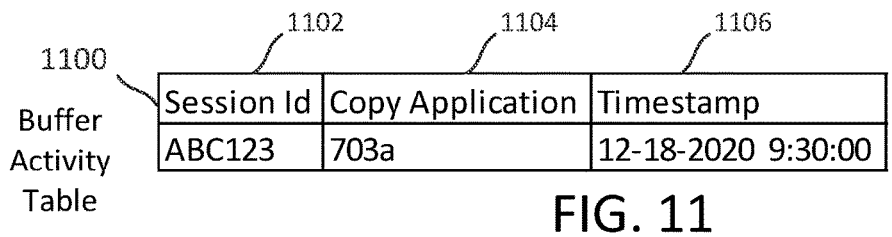
FIG. 11 shows an example buffer activity table that may be used in connection with some embodiments of the systems shown in FIGS. 7, 8A and 8B.
Figure 12:
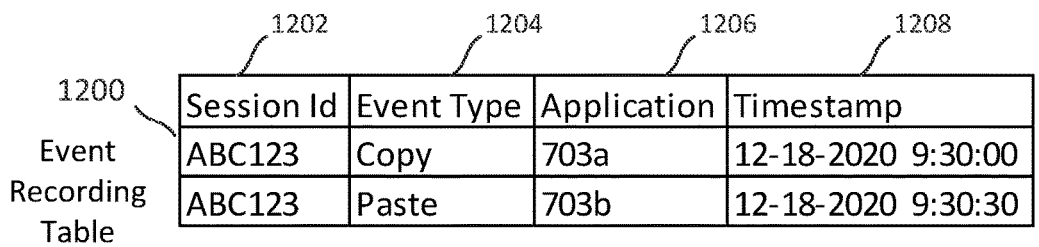
FIG. 12 shows an example event recording table that may be used in connection with some embodiments of the systems shown in FIGS. 7, 8A and 8B.

As illustrated in FIGS. 8A and 8B, one or more of the engines 806-814 may read and/or write data to the storage medium(s) 818 while performing their respective functions. Examples of tables 900, 1000, 1100, and 1200 that may be stored in the storage medium(s) 818 are shown in FIGS. 9-12. In particular, FIG. 9 shows an example of a "user session" table 900, FIG. 10 shows an example of an "open application" table 1000, FIG. 11 shows an example of a "buffer activity" table 1100, and FIG. 12 shows an example of a "event recording" table 1200.

At a high level, the user session engine 806 (shown in FIGS. 8A and 8B) may track user sessions initiated by different users at the client devices 202, and may record data concerning such events in the user session table 900 (shown in FIG. 9). In some implementations, the user session engine 806 may determine a score (e.g., trust score) for the user and record the score in the user session table 900. As illustrated in FIG. 9, the user session engine 806 may record, in the user session table 900, a user identifier 902 identifying a user of a user session, a session identifier 904 identifying a user session for the user, a start timestamp 906 indicating when the user session was initiated, an end timestamp 910 indicating when the user session was ended, and a trust score 912 for the user. The user session engine 806 may also track which applications 703 are open during each of the user session, and may record data concerning such events in the open application table 1000 (shown in FIG. 10). The user session engine 806 may record, as illustrated in FIG. 10 in the open application table 1000, a session identifier 1002, an application identifier 1004 identifying an application open during the user session for the session identifier, an open time 1006 indicating when the application was opened, and a close time 1008 indicating when the application was closed (if the close time 1008 is null or empty, then the user session engine 806 may determine that the application is still open).

The buffer activity engine 808 (shown in FIGS. 8A and 8B) may receive data from the system 702 including data from application 703 (e.g., copied at the application 703 and written to the buffer 706), may store the received data in the buffer 710 of the backend computing system 120, and may record data concerning such events in the buffer activity table 1100 (shown in FIG. 11). As shown in FIG. 11, the buffer activity engine 808 may record, in the buffer activity table 1100, a session identifier 1102, a copy application 1104 identifying which application the data is copied in (which application received a copy command), and a timestamp 1106 indicating when the data is copied (or when the copy command was received at the application). The buffer activity engine 808 may also determine which applications are open during the user session (using the open application table 1000 shown in FIG. 10), and may send the copied data to one or more of the open applications. In some implementations, the copied data received by the buffer activity engine 808 may be encrypted, and the buffer activity engine 808 may decrypt the received copied data. The buffer activity engine 808 may decrypt the copied data using commonly known/industry available techniques.

The policy engine 810 (shown in FIGS. 8A and 8B) may evaluate the copied data and/or an encrypted version of the copied data received from one system 702 in view of one or more policies related to allowed/approved copy/cut-and-paste functionalities for the systems 702 and/or the applications 703, and may approve the copied data/encrypted data for sending to another system 702 if one or more of the policies are satisfied. In some implementations, even where the backend computing system 120 is not provided with the capability to decrypt data received from a system 702, the policy engine 810 may nonetheless be configured to recognize certain characteristic of encrypted data, such as small transfers of encrypted data, e.g., representing twelve or fewer characters, as potentially corresponding to sensitive information, such as copied passwords, copied credit card numbers, or the like, and may determine to not approve the encrypted data for transfer in at least certain circumstances when the encrypted data is determined to have such characteristics.

The malware engine 812 (shown in FIGS. 8A and 8B) may evaluate the copied data received from the system 702 to determine whether the copied data includes malicious content (e.g., malware, virus, etc.). The malware engine 812 may use a virus scanning software to scan the copied data for malicious content.

The event recording engine 814 (shown in FIGS. 8A and 8B) may detect inputs and other events occurring at the applications 703 open during the user session at the client device 202, and may record data concerning such events in the event recording table 1200 (shown in FIG. 12). As shown in FIG. 12, the event recording engine 814 may record, in the event recording table 1200, a session identifier 1202, an event type 1204 identifying the type of event that occurred, an application 1206 indicating within which application the event occurred, and a timestamp 1208 indicating when the event occurred.

Each of the systems 702 may implement an instance of the traffic defense engine 816. The traffic defense engine 816 (shown in FIG. 8C) may evaluate data traffic between the respective system 702 and the backend computing system 120 over time, and may perform certain security measures to protect from third parties being able to analyze communications with the backend computing system 120. For example, the traffic defense engine 816 may include "padding" data when communicating copied data to the backend computing system 120. The traffic defense engine 816 may, additionally or alternatively, send random communications (with no content or meaningful data) to the backend computing system 120 on a periodic basis. In some situations, the size of data sent to the backend computing system 120 from the system 702 may provide information to malicious entities. For example, if the user copies a credit card number from the application 703*a* to paste the credit card number at the application 703*b*, a malicious entity can determine how many characters are in the credit card number based on the size of the copied data sent by the system 702*a*, which can be a major security risk. The malicious entity may not be able to determine the credit card number itself since the copied data may be encrypted in some implementations, however, knowing the length of the credit card number may be enough in some situations for a malicious entity to hack a system/account. To defend against traffic analysis, the traffic defense engine 816 may transfer data (noise or no-content data) to the backend computing system 120 on a periodic basis. Such data may be of a random size, and may be associated with a "none" buffer data type, so that the backend computing system 120 may determine that the received data is not actual copied data to be sent to another system 702. In some implementations, the backend computing system 120 may send the random noise data, received from one system 702 (e.g., 702*a*) to one or more of the other systems 702 (e.g., 702*b* and/or 702*n*) to defend against a malicious entity from determining that the system 702*a* is merely sending noise that is not being transferred to another system 702. Using the "none" buffer data type, the systems 702*b*/702*n* may determine that the received data is not actual copied data, and may not write the data in the buffer 706*b*/706*n*.

Figure 13:
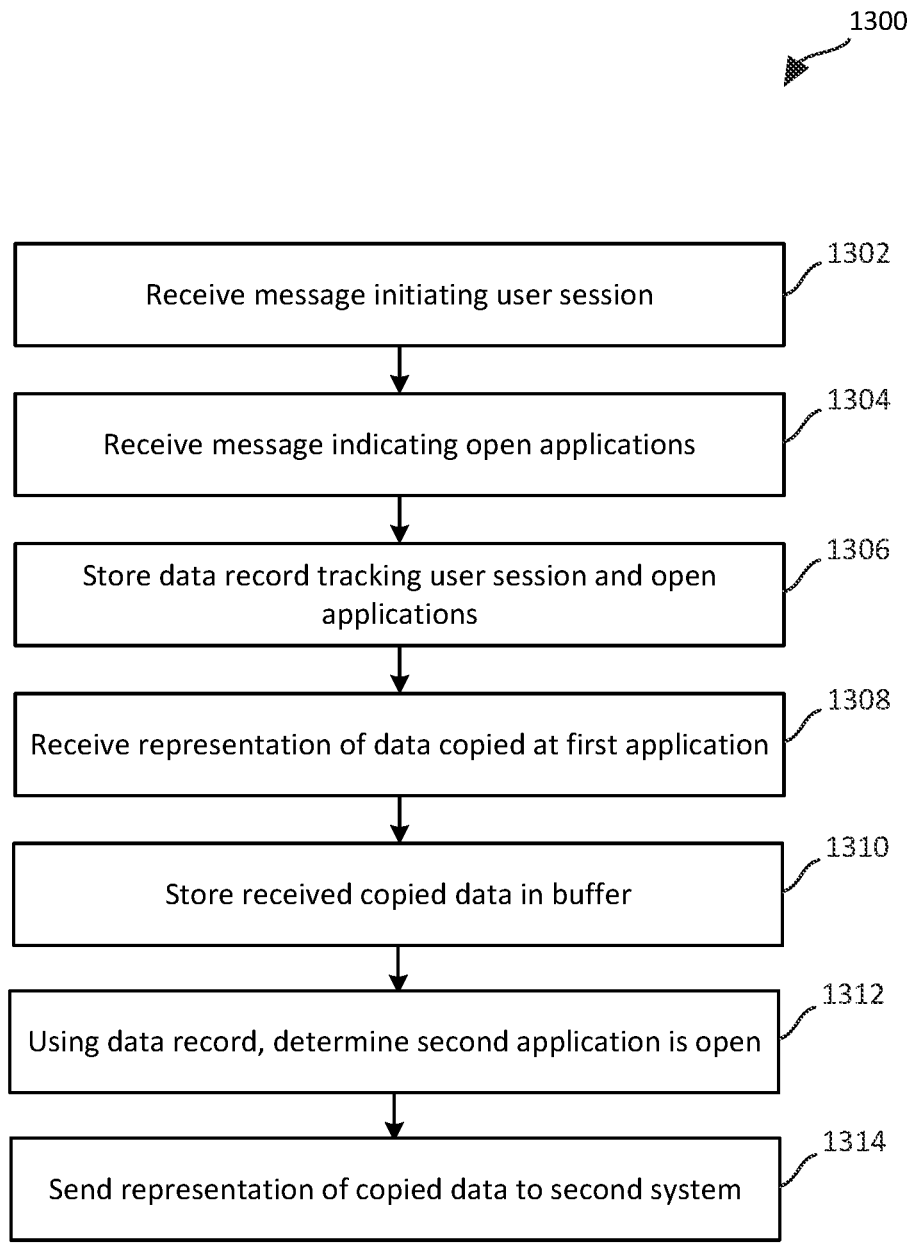
FIG. 13 is a flowchart showing an example routine that may be performed by the system shown in FIGS. 8A and 8B.

At a high-level, referring to FIG. 7, the user of the client device 202 may log in to a platform (like the ones described in Section D and E above) and start a user session to access the virtual/remote applications or desktops. The user of the client device 202 may open the (virtual/remote) application 703*a* and may also open the (virtual/remote) application 703*b* at the client device 202. FIG. 13 is a flowchart showing an example routine 1300 that may be performed by the user session engine 806 and the buffer activity engine 808 (shown in FIGS. 8A and 8B) to track the user session and open applications. As shown in FIG. 13, the user session engine 806 may receive (at a step 1302) a message indicating that the user session at the client device 202 was started. The user session engine 806 may receive (at a step 1304) a message indicating that the application 703*a* is open at the user session, and may receive a separate message indicating that the application 703*b* is open at the user session. In some implementations, when the user opens the applications 703*a* and 703*b* at the client device 202 during the user session, the corresponding systems 702*a* and 702*b* may send messages to the backend computing system 120 indicating that the applications 703*a* and 703*b* have been opened. In some implementations, the messages from the systems 702*a* and 702*b* may include the session identifier for the user session. At a step 1306, the user session engine 806 may record data as shown in the user session table 900 of FIG. 9 to track starting and ending of the user session, and may further record data as shown in the open applications table 1000 of FIG. 10 to track which applications were open during the user session.

In an example implementation, within the application 703*a*, the user may select data (e.g., text, a file, an image, etc.) and provide an input of a copy command (e.g., CTRL+C, click on copy, etc.) at the application 703*a*. The copied data may be stored at the buffer 706*a* by the operating system 704*a*. The system 702*a* may send the copied data to the backend computing system 120. In some implementations, the system 702*a* may encrypt the copied data prior to sending it to the backend computing system 120. The system 702*a* may encrypt the copied data using commonly known/industry available techniques. At a step 1308, the buffer activity engine 808 may receive the data copied at the application 703*a*. In some implementations, in the case the copied data is encrypted, the buffer activity engine 808 may decrypt the copied data using commonly known/industry available techniques.

At a step 1310, the buffer activity engine 808 may store the received copied data in the buffer 710 of the backend computing system 120. In some implementations, the system 702*a* may also send the session identifier for the user session, so that the buffer activity engine 808 can track which user session the representation of the copied data is for. Based on which system 702 sent the representation of the copied data, and using the session identifier, the buffer activity engine 808 may record data in the buffer activity table 1100 shown in FIG. 11. At a step 1312, using the data records of the open applications table 1000, the buffer activity engine 808 may determine that the application 703*b* is open at the user session (as indicated by the blank block 1008 within the table). Based on the application 703*b* being open, the buffer activity engine 808 may send (at a step 1314) the representation of the copied data to the system 702b that hosts the application 703b. Sending of the representation of the copied data, at the step 1314, enables the operating system 704b to write the copied data to the buffer 706b. In implementations in which the copied data is encrypted, the system 702b may decrypt the representation of the copied data (e.g., using a key as described above) to recover the copied data, before writing the copied data to the buffer 706b. Within the application 703b, the user may provide an input (e.g., a paste command such as, CTRL+V, click on paste, etc.) and, in response to such an input, the operating system 704b may cause the data stored in the buffer 706b to be pasted in the application 703b.

In some implementations, the buffer activity engine 808 may perform the step 1314 and send the representation of the copied data to the system 702b in response to the application 703b receiving a command (e.g., a paste or move command). In other implementations, the buffer activity engine 808 may perform the step 1314 prior to the application 703b receiving the paste command, so that the copied data is already available at the buffer 706b for when the command is received at the application 703b.

As noted above, in some implementations, the buffer activity engine 808 may send, at the step 1314, encrypted copied data to the system 702b. In some implementations, the buffer activity engine 808 may send the encrypted copied data as received in the step 1308 and encrypted by the system 702a. In other implementations, the buffer activity engine 808 may encrypt the copied data (e.g., using a key of the backend computing system 120), and send the encrypted copied data to the system 702b. In either implementation, the system 702b may decrypt the encrypted copied data prior to writing it to the buffer 706b. The system 702b may decrypt the data using an encryption key distributed to the system 702b as described above.

Figure 14:
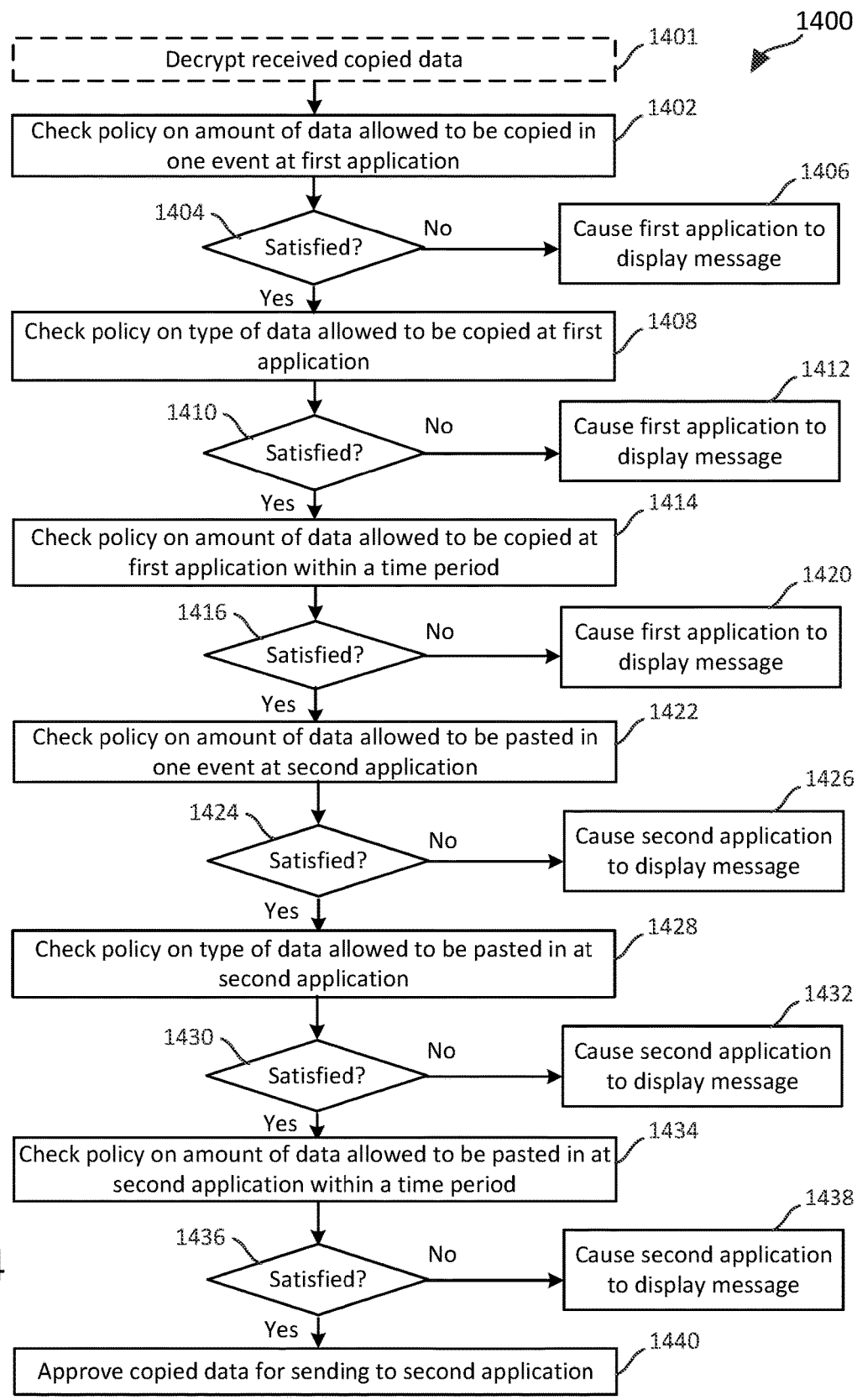
FIG. 14 is a flowchart showing another example routine that may be performed by the system shown in FIGS. 8A and 8B.

In some implementations, the buffer activity engine 808 may send, at the step 1314, the representation of the copied data in response to the policy engine 810 approving the copied data and/or an encrypted version of the copied data for sending to the application 703b. FIG. 14 is a flowchart showing an example routine 1400 that may be performed by the policy engine 810 (shown in FIGS. 8A and 8B). An administrator or other user for an organization may specify one or more policies related to the functionalities (e.g., copy/cut-and-paste functionalities) between systems 702. The policies may be stored in the storage mediums 818 (shown in FIGS. 8A and 8B). The policy engine 810 may evaluate the copied data received at the step 1308 in routine 1300 (shown in FIG. 13) according to the routine 1400. In some implementations, there may be multiple instances of the policy engine 810 implemented at different servers/systems. For example, there may be a first policy engine 810 implemented at the backend computing system 120, which may be configured to enforce general policies with respect to transferring data between the systems 702. There may be a second policy engine 810 implemented at a separate server/computing system that may be configured to enforce organization/entity specific policies with respect to transferring data between the systems 702.

At an optional step 1401, the policy engine 810 (or another engine) may decrypt the representation of the copied data received in the step 1308 shown in FIG. 13, if the received representation of the copied data is encrypted. As noted previously, in some implementations, the system 702a may encrypt the data copied from the application 703a, and send the encrypted data to the backend computing system 120. Before performing the policy checks described below, the policy engine 810 may decrypt the received encrypted copied data. In some implementations, the policy engine 810 may additionally or alternatively perform one or more of the policy checks described below using the encrypted copied data, and may not perform the step 1401. If the received representation of the copied data is not encrypted, then the policy engine 810 may begin the routine at a step 1402.

At the step 1402, the policy engine 810 may check a policy on an amount of data allowed to be copied in one event at the application 703a. There may be a policy limiting the amount/size of data that the user can copy, in a single copy command, at the application 703a, for example, a number of bytes may be specified, or a number of items (e.g., a number of files, a number of images, etc.) may be specified. At a step 1404, the policy engine 810 may determine if such a policy is satisfied. If the amount of data received at the step 1308 by the buffer activity engine exceeds the amount of data specified in the policy, then the policy engine 810 may determine that the policy is not satisfied, and may perform a step 1406. At the step 1406, the policy engine 810 may cause the application 703a to display a message indicating that a copy policy is violated and/or indicating that the amount of data copied exceeds a copy policy. The policy engine 810, in some implementations, may send the message to the system 702a for display (e.g., as a pop-up dialog) within the application 703a. If the amount of data received in the step 1308 does not exceed the amount of data specified in the policy, then the policy engine 810 may determine the policy to be satisfied, and may perform a step 1408. If no such policy is specified or the amount of data is indicated as "unlimited," then at the step 1404, the policy engine 810 may determine the policy is satisfied and perform the step 1408.

In some implementations, the policy on the amount of data allowed to be copied in one event at the application 703a may indicate a minimum amount of data that has to be copied. For example, the policy may be directed to restricting the user from copying sensitive information (e.g., social security numbers, credit card numbers, account numbers, etc.) between systems 702, in which case, the policy may specify that the amount of data has to exceed a certain size (e.g., exceed twenty-five characters) depending on the type of information the administrator wants to restrict the user from copying. In such implementations, at the step 1404, the policy engine 810 may determine that the policy is satisfied when the amount of data received in the step 1308 exceeds the minimum amount of data specified in the policy.

At the step 1408, the policy engine 810 may check a policy on a type of data allowed to be copied at the application 703a. There may be a policy restricting the type of data that the user can copy at the application 703a. The policy may include a list of data types that are restricted from copying, or may include a list of data types that allowed to be copied. For example, if the administrator wants to restrict the user from copying files, then the list may include files as the data type being restricted. At a step 1410, the policy engine 810 may determine if such a policy is satisfied. If the type of data received at the step 1308 by the buffer activity engine 808 is a restricted type or does not match an allowed type specified in the policy, then the policy engine 810 may determine that the policy is not satisfied, and may perform a step 1412. At the step 1412, the policy engine 810 may cause the application 703a to display a message indicating that a policy (e.g., a copy policy) is violated and/or indicating that the type of data is not allowed per a policy. The policy engine 810, in some implementations, may send the message to the system 702a for display (e.g., as a pop-up dialog) within the application 703a. If the type of data received in the step 1308 is not restricted or matches an allowed type specified in the policy, then the policy engine 810 may determine the policy to be satisfied, and may perform a step 1414. If no such policy is specified or the type of data is indicated as "any," then at the step 1410, the policy engine 810 may determine the policy is satisfied and perform the step 1414.

At the step 1414, the policy engine 810 may check a policy on an amount of data allowed to be copied at the application 703a within a time period. There may be a policy restricting an amount of data (e.g., number of bytes) the user can copy or otherwise transfer at the application 703a within a time period of, for example, an hour, twenty-four hours, etc. or within a user session. There may be a policy restricting a number of times the user can copy data at the application 703a, for example, the user can only copy data ten times within an hour or during a user session. The policy may specify an amount of data in terms of bytes and/or a number of times a function (e.g., a copy function) can be performed. The policy may specify the time period in terms of minutes, hours, days, or in terms of a user session (e.g., within two user session, during the instant user session, etc.). At a step 1416, the policy engine 810 may determine if such a policy is satisfied. If the data received (e.g., as at the step 1308 of FIG. 13) by the buffer activity engine 808, in view of any previous data received from the application 703a and/or the system 702a, exceeds the amount of data specified and/or the number of times specified in the policy, then the policy engine 810 may determine that the policy is not satisfied, and may perform a step 1420. At the step 1420, the policy engine 810 may cause the application 703a to display a message indicating that a policy (e.g., a copy policy) is violated and/or indicating that the amount of data transferred or otherwise provided exceeds the policy. The policy engine 810, in some implementations, may send the message to the system 702a for display (e.g., as a pop-up dialog) within the application 703a. If the data received at the step 1308 by the buffer activity engine 808, in view of any previous copied data received from the application 703a and/or the system 702a, does not exceed the amount of data specified and/or the number of times specified in the policy, then the policy engine 810 may determine the policy to be satisfied, and may perform a step 1422. If no such policy is specified, then at the step 1416, the policy engine 810 may determine the policy is satisfied and perform the step 1422.

At the step 1422, the policy engine 810 may check a policy on an amount of data allowed to be transferred or otherwise provided in one event at the application 703b. There may be a policy limiting the amount/size of data that the user can transfer, for example in a single paste command, at the application 703b, for example, a number of bytes may be specified, or a number of items (e.g., a number of files, a number of images, etc.) may be specified. At a step 1424, the policy engine 810 may determine if such a policy is satisfied. If the amount of data received (e.g., at the step 1308 of FIG. 13) by the buffer activity engine 808 exceeds the amount of data specified in the policy, then the policy engine 810 may determine that the policy is not satisfied, and may perform a step 1426. At the step 1426, the policy engine 810 may cause the application 703b to display a message indicating that a policy (e.g., a paste policy) is violated and/or indicating that the amount of data pasted exceeds a policy. The policy engine 810, in some implementations, may send the message to the system 702b for display (e.g., as a pop-up dialog) within the application 703b. In some implementations, the message may be displayed when a command (e.g., a paste command) is received at the application 703b. If the amount of data received in the step 1308 does not exceed the amount of data specified in the policy, then the policy engine 810 may determine the policy to be satisfied, and may perform a step 1428. If no such policy is specified or the amount of data is indicated as "unlimited," then at the step 1424, the policy engine 810 may determine the policy is satisfied and perform the step 1428.

In some implementations, the policy on the amount of data allowed to be transferred or otherwise provided in one event at the application 703b may indicate a minimum amount of data that has to be provided. For example, the policy may be directed to restricting the user from pasting sensitive information (e.g., social security numbers, credit card numbers, account numbers, etc.), in which case, the policy may specify that the amount of data has to exceed a certain size (e.g., exceed twenty-five characters) depending on the type of information the administrator wants to restrict the user from pasting. In such implementations, at the step 1424, the policy engine 810 may determine that the policy is satisfied when the amount of data received in the step 1308 exceeds the minimum amount of data specified in the policy.

At the step 1428, the policy engine 810 may check a policy on a type of data allowed to be transferred or otherwise provided to the application 703b. There may be a policy restricting the type of data that the user can provide to the application 703b. The policy may include a list of data types that are restricted from pasting, or may include a list of data types that allowed to be pasted. For example, if the administrator wants to restrict the user from pasting files, then the list may include files as the data type being restricted. At a step 1430, the policy engine 810 may determine if such a policy is satisfied. If the type of data received (e.g., as at the step 1308 of FIG. 13) by the buffer activity engine 808 is a restricted type or does not match an allowed type specified in the policy, then the policy engine 810 may determine that the policy is not satisfied, and may perform a step 1432. At the step 1432, the policy engine 810 may cause the application 703b to display a message indicating that a policy (e.g., a paste policy) is violated and/or indicating that the type of data provided is not allowed per the policy. The policy engine 810, in some implementations, may send the message to the system 702b for display (e.g., as a pop-up dialog) within the application 703b. In some implementations, the message may be displayed when a paste command is received at the application 703b. If the type of data received (e.g., as in the step 1308 of FIG. 13) is not restricted or matches an allowed type specified in the policy, then the policy engine 810 may determine the policy to be satisfied, and may perform a step 1434. If no such policy is specified or the type of data is indicated as "any," then at the step 1410, the policy engine 810 may determine the policy is satisfied and perform the step 1434.

At the step 1434, the policy engine 810 may check a policy on an amount of data allowed to be pasted at the application 703b within a time period. There may be a policy restricting an amount of data (e.g., number of bytes) the user can paste at the application 703b within a time period of, for example, an hour, twenty-four hours, etc., or within a user session. There may be a policy restricting a number of times the user can paste data at the application 703b, for example, the user can only paste data ten times within an hour or during a user session. The policy may specify an amount of data in terms of bytes and/or a number of times a paste function can be performed. The policy may specify the time period in terms of minutes, hours, days, or in terms of a user session (e.g., within two user sessions, during the current user session, etc.). At a step 1436, the policy engine 810 may determine if such a policy is satisfied. If the data received (e.g., as at the step 1308 of FIG. 13) by the buffer activity engine 808, in view of any previous data sent to the application 703*b* and/or the system 702*b* for providing (e.g., pasting), exceeds the amount of data specified and/or the number of times specified in the policy, then the policy engine 810 may determine that the policy is not satisfied, and may perform a step 1438. At the step 1438, the policy engine 810 may cause the application 703*b* to display a message indicating that a policy (e.g., a paste policy) is violated and/or indicating that the amount of data transferred or otherwise provided exceeds a policy. The policy engine 810, in some implementations, may send the message to the system 702*b* for display (e.g., as a pop-up dialog) within the application 703*b*. In some implementations, the message may be displayed when a command (e.g., a paste command) is received at the application 703*b*. If the data received at the step 1308 by the buffer activity engine 808, in view of any previous data sent to the application 703*b* and/or the system 702*b*, does not exceed the amount of data specified and/or the number of times specified in the policy, then the policy engine 810 may determine the policy to be satisfied, and may perform a step 1440. If no such policy is specified, then at the step 1436, the policy engine 810 may determine the policy is satisfied and perform the step 1440.

At the step 1440, the policy engine 810 may approve the representation of the copied data (received at the step 1308 shown in FIG. 13) for sending to the application 703*b*. In some implementations, the policy engine 810 may communicate the approval to the buffer activity engine 808, and the buffer activity engine 808 may perform the step 1314 shown in FIG. 13.

The policy engine 810, in some implementations, may also perform the steps 1422-1440 with respect to another application, for example, application 703*n*, if the application 703*n* is open at the client device 202 during the user session. Thus, the policy engine 810 may check paste policies for any applications open during the user session, and approve or disapprove, as appropriate, sending of a representation of the copied data to one or more of the opened applications.

Although the policies are described as being related to the applications 703*a* and 703*b*, it should be understood that similar policies may be specified for the systems 702*a* and 702*b* (e.g., system-level policies), where the policies may be applied to one or more applications executing at the system 702.

Although the routine 1400 shows certain steps being performed in a particular order, it should be understood that the policy engine 810 may check the various policies in an order different than illustrated in FIG. 14. In some implementations, the policy engine 810 may perform some of the steps of the routine 1400 in parallel and check the policies in parallel, for example, while the policy engine 810 is checking the policy as described in relation to the step 1402, the policy engine 810 may also check the policy as described in relation to the step 1408.

In some implementations, the systems of FIGS. 1, 7, and 8A-8C, may use certain mechanisms and policies for enabling the user to copy a password(s) from one system 702 to another system 702. In some implementations, the system 702*a* may host a password manager application 703*a* (e.g., a password vault, a password safe, etc.) that may be configured to store one or more passwords, in a secure manner, for the user. The user may want to copy a password from the password manager application 703*a* and paste it at the application 703*b*. Some organizations may allow copying of passwords from the password manager application 703*a* (a trusted source), but may not allow copying of passwords from another type of application (e.g., a spreadsheet, a word document, etc.). To enable such copying and pasting, the backend computing system 120 may determine that whether the password is being copied from the password manager application 703*a*, for example, by determining that the copied data is being received from the system 702*a* and the password manager application 703*a*. If the copied data is received from the password manager application 703*a*, then in some implementations, the backend computing system 120 may associate a "password" type to the copied data to indicate that the copied data includes a password. Based on the copied data being of "password" type, the policy engine 810 may apply one or more policies in approving the copied data for sending to the system 702*b*. For example, the policy engine 810 may approve sending of the password based on the application 703*b* (e.g., preventing copying of passwords to websites or a word document).

In some implementations, an organization may want to prevent copying of passwords from any source application. In such cases, the policy engine 810 may deny transfer of data copied from the password manager application 703*a* based on the backend computing system 120 determining that the data is copied at the password manager application 703*a*. In some implementations, the backend computing system 120 may use one or more mechanisms to determine if the copied data includes a password, in case the password is copied from an application other than a password manager application. In an example embodiment, the backend computing system 120 (e.g., the policy engine 810) may implement an algorithm (e.g., a heuristic algorithm, a machine learning model, or other mechanisms), to evaluate the copied data to determine whether the copied data includes a password. The algorithm may determine whether the copied data includes a password based on the number of characters in the copied data, the number of special characters in the copied data, the randomness of the characters in the copied data, etc. The algorithm may determine whether the copied data includes a password based on general requirements for strong passwords or specific requirements for passwords used by the applications 703/systems 702. As described above, the policy engine 810 may decrypt the received copied data prior to evaluating the copied data.

In some implementations, the policy engine 810 may use one or more mechanisms to determine if the copied data includes sensitive information, to apply appropriate policies relating to transfer of sensitive information. For example, the policy engine 810 may use an algorithm (e.g., a heuristic algorithm, a machine learning model, a rule, or other mechanisms) to determine whether the copied data includes a credit card number, a social security number, or other types of sensitive information.

Figure 15:
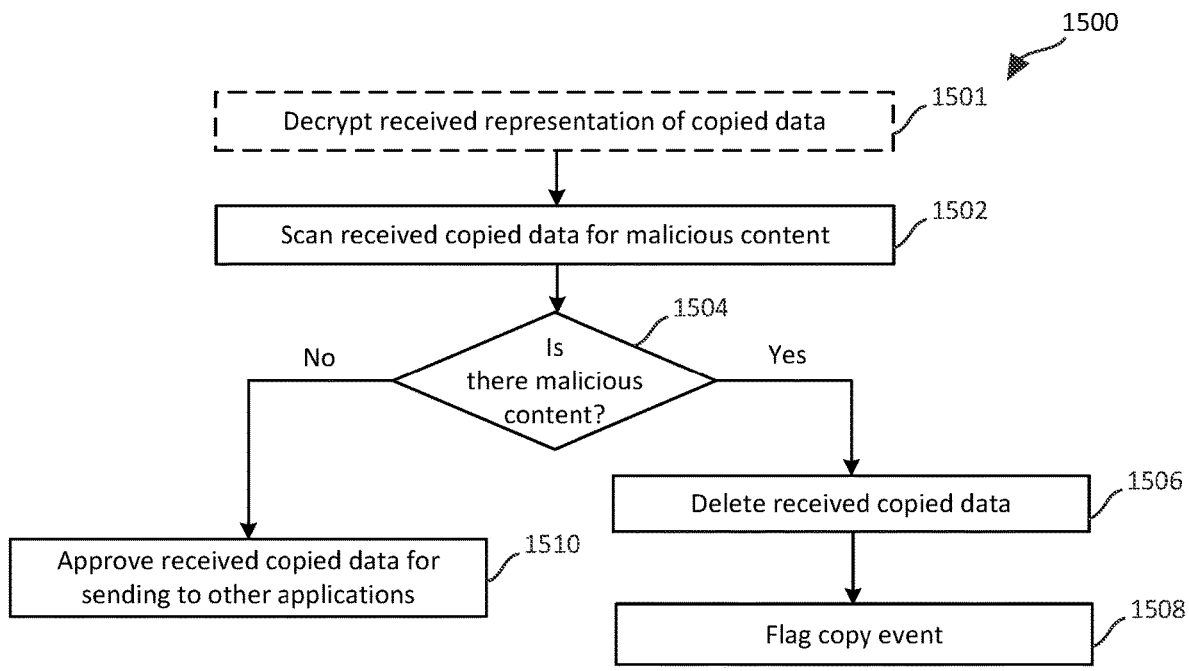
FIG. 15 is a flowchart showing yet another example routine that may be performed by the system shown in FIGS. 8A and 8B.

In some implementations, the buffer activity engine 808 may send, at the step 1314 of FIG. 13, a representation of the copied data after the malware engine 812 scans the copied for malicious content. FIG. 15 is a flowchart showing an example routine 1500 that may be performed by the malware engine 812 (shown in FIGS. 8A and 8B). In some cases, the user may not be aware that the data copied by the user at the application 703*a* has malware, and may inadvertently paste or otherwise provide the data, along with the malware at the application 703*b*. The malware engine 812, in scanning the data (e.g., copied data), may help to prevent transfer of malware to other remotely hosted applications 703 and/or systems 702.

At an optional step 1501, the malware engine 812 (or another engine) may decrypt the representation of the copied data received in the step 1308 shown in FIG. 13, if the received representation of the copied data is encrypted. As described herein, in some implementations, the system 702a may encrypt the data copied at the application 703a, and send the encrypted data to the backend computing system 120. Before performing the malware scan described below, the malware engine 812 may decrypt the received encrypted copied data. In some implementations, the malware engine 812 may perform at least a rudimentary malware scan using the encrypted data, and may not perform the step 1501. If the received copied data is not encrypted, then the malware engine 812 may begin the routine at a step 1502.

At the step 1502, the malware engine 812 may scan the copied data and/or encrypted version of the copied data (from the step 1308 shown in FIG. 13) for malicious content. The malware engine 812 may use software to scan the data (e.g. copied data) and/or encrypted version of the data to determine if the data includes malicious content, such as malware. If the data is determined to include malicious content, then the malware engine 812 may (at a step 1506) delete the received data. In some implementations, the malware engine 812 may delete the received data from a temporary storage of the backend computing system 120. In other implementations, the malware engine 812 may delete the received data so that the backend computing system 120 does not write the received data to the buffer 710 (shown in FIG. 7) or to other portions of the memory. The malware engine may (at a step 1508) flag the event (e.g., a copy event), so that an administrator or other type of user may troubleshoot the event (for example, in real-time or at a later time). In some implementations, the malware engine 812 may store a flag in the event recording table 1200 (shown in FIG. 12). In other implementations, the malware engine 812 may cause a message to be displayed at a device used by an administrator.

If, at the step 1504, the malware engine 812 determines that the received data does not include malicious content, then the malware engine 812, at a step 1510, may approve the received data for sending to other applications, such as, the application 703b. In this case, the buffer activity engine 808 may send the data (e.g., copied data) and/or an encrypted version of the data, per the step 1314 shown in FIG. 13.

Figure 16A:
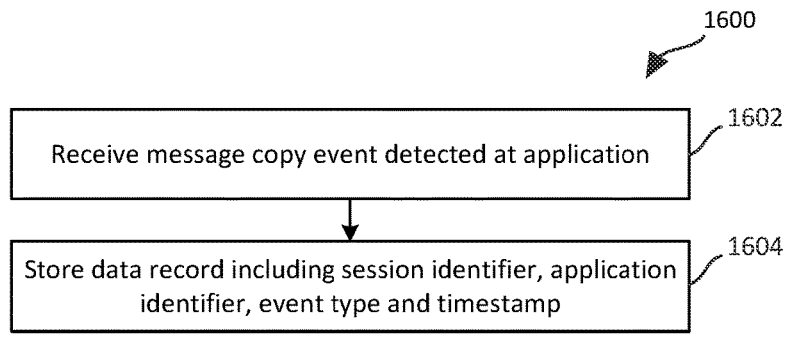
FIGS. 16A and 16B are flowcharts showing other example routines that may be performed by the system shown in FIGS. 8A and 8B.
Figure 16B:
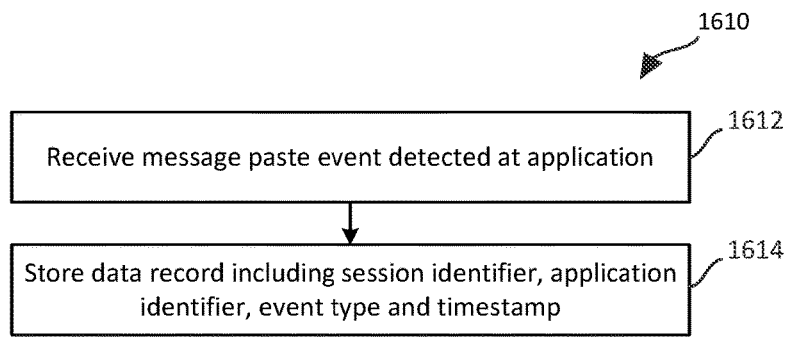

FIGS. 16A and 16B are flowcharts showing example routines 1600 and 1610, respectively, that may be performed by the event recording engine 814 (shown in FIGS. 8A and 8B). Referring first to FIG. 16A, the event recording engine 814 may (at a step 1602) receive a message indicating that an event (e.g., a copy event) is detected at the application 703a. Pertinent events relating to the buffers 706 may be detected and/or monitored in any of numerous ways, and may depend on the operating system(s) executing on the systems 702. For example, the Microsoft Windows operating system includes several "clipboard message" handles, including WM_COPY, WM_CUT, and WM_PASTE. Those message handles are described, for example, at the path "en-us/windows/win32/dataxchg/clipboard-messages" of the Uniform Resource Locator (URL) "docs.microsoft.com." Such messages are typically handled using a WindowProc callback function, which is an application-defined function that processes messages sent to a window. Such callback functions are described, for example, at the path "en-us/windows/win32/winmsg/window-procedures" of the URL "docs.microsoft.com." Accordingly, in some implementations, the occurrence of copy events to the buffers 706 may be detected by monitoring WindowProc callback functions for WM_COPY and/or WM_CUT messages. Similar techniques may likewise be used to detect copy events to buffers 706 in other operating systems. In some implementations, the system 702a may send the message to the backend computing system 120 indicating that an event (e.g. a copy event) is detected at the application 703a, and the message, in some implementations, may also include an identifier for the application 703a. At a step 1604, the event recording engine 814 may store a data record, for example in the event recording table 1200 shown in FIG. 12, including a session identifier (for the user session during which the copy event is detected), an application identifier (for the application 703a), an event type (in this case, a "copy" event), and a timestamp when the event is detected.

Referring to FIG. 16B, the event recording engine 814 may (at a step 1612) receive a message indicating that another or subsequent event (e.g., a paste event) is detected at the application 703b. For example, in a Microsoft Windows environment, the occurrence of a paste event from a buffer 706 may be detected by monitoring WindowProc callback functions for WM_PASTE messages. Similar techniques may likewise be used to detect events from buffers 706 in other operating systems. In some implementations, the system 702b may send the message to the backend computing system 120 indicating that an event (e.g., a paste event) is detected at the application 703b, and the message, in some implementations, may also include an identifier for the application 703b. At a step 1614, the event recording engine 814 may store a data record, for example in the event recording table 1200 shown in FIG. 12, including a session identifier (for the user session during which the paste event is detected), an application identifier (for the application 703b), an event type (in this case, a "paste" event), and a timestamp when the event is detected.

Recording of such events may enable an administrator or other type of user to obtain certain information related to usage of the backend computing system 120. For example, the administrator may evaluate events based on when they are detected (using the stored timestamp), or based on which user session they occurred in (using the stored session identifier). In another example, the administrator may run reports to understand how users are using the copy/cut-and-paste functionalities, and between which applications the functionality is being used. In yet another example, the administrator may match up the recorded events from the event recording table 1200 (shown in FIG. 12) with a certain incident, such as, a user copying data and/or pasting data he/she shouldn't have.

Figure 17A:
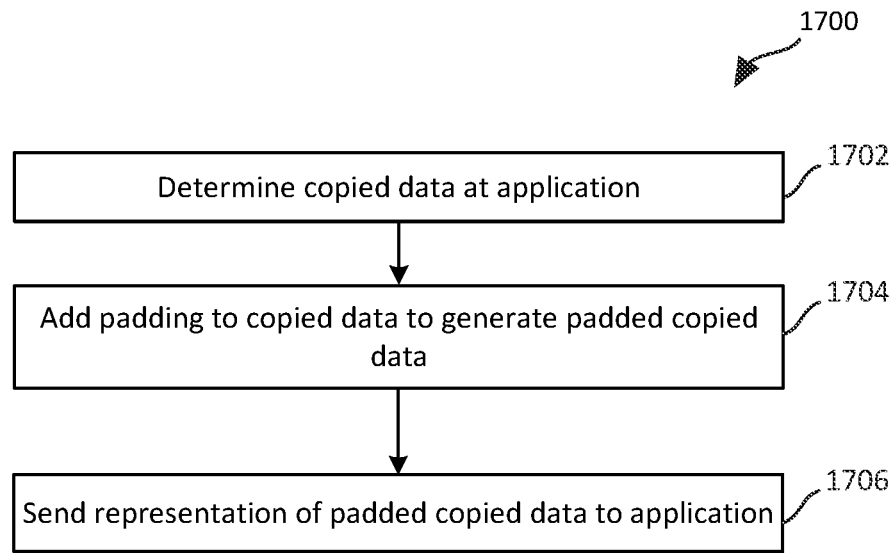
FIGS. 17A and 17B flowcharts showing still other example routines that may be performed by the system shown in FIG. 8C.
Figure 17B:
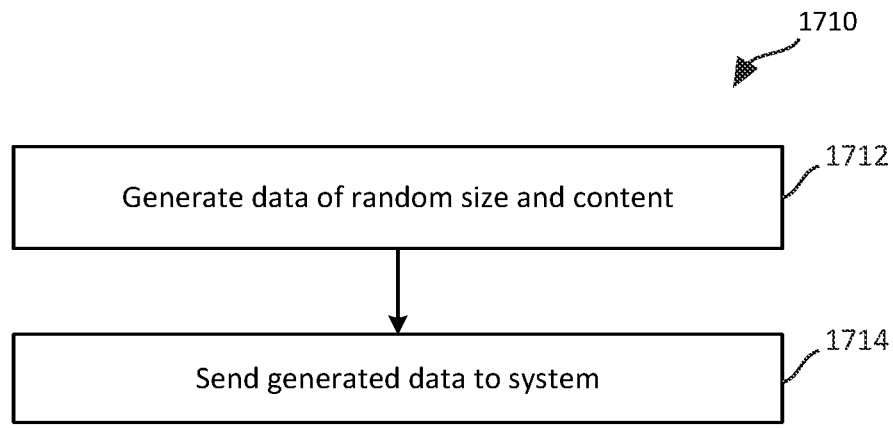

FIGS. 17A and 17B are flowcharts showing example routines 1700 and 1710, respectively, that may be performed by the traffic defense engine 816 (shown in FIG. 8C). The traffic defense engine 816 may be configured to perform certain actions to prevent an external entity (e.g., a malicious entity) from analyzing the data traffic (e.g., data received and data sent) at the backend computing system 120. In some implementations, the traffic defense engine 816 may add "padding" data before sending data from the application 703a to the backend computing system 120. Such adding of padding data may involve any operation in which data is added to the beginning, middle, and/or end of original data, prior to sending the data to its destination. Adding padding data may include adding nonsense or other unrelated data to obfuscate the contents of the data being communicated.

Referring to FIG. 17A, the traffic defense engine 816 (at a step 1702) may determine data from the application 703a (e.g., copied data). For example, the user may input a copy command, via the client device 202, to copy some data within the application 702a, in response to which, the copied data may be written to the buffer 706a by the operating system 704a. The traffic defense engine 816 may determine the data copied at the application 703a based on data being written to the buffer 706a.

At the step 1704, the traffic defense engine 816 may add padding or other data to the copied data to generate padded copied data. In some implementations, the traffic defense engine 816 may randomly determine where to add padding to the copied data. For example, the traffic defense engine 816 may add padding to the beginning of the data (e.g., copied data) determined at a first time, and may add padding to the end of the data (e.g., copied data) determined at a second time. In some implementations, the traffic defense engine 816 may select a random size of padding data to be added. At a step 1706, the traffic defense engine 816 may send a representation of the modified data (e.g., padded copied data) to the backend computing system 120. The backend computing system 120, via the buffer activity engine 808, may store the received padded copied data in the buffer activity table 1100. In some implementations, the traffic defense engine 816 may encrypt the modified data (e.g., padded copied data) prior to performing the step 1706. The backend computing system 120 may send the padded copied data to the system 702b to enable the user to paste the copied data at the application 703b. In some implementations, the system 702b may determine the copied data from the padded copied data (e.g., by removing the padding from the received copied data), and write the determined copied data to the buffer 706b, so that the copied data is available in response to a paste command, received via the client device 202, within the application 703b.

In some implementations, to prevent external entities from analyzing the data traffic at the backend computing system 120, the traffic defense engine 816 may generate and send random data to the backend computing system 120 occasionally and/or on a periodic basis. Referring to FIG. 17B, the traffic defense engine 816 may (at a step 1712) generate data of random size and content. In some implementations, the generated data may comply with one or more policies stored at the storage medium 818 (and as described above in relation to the policy engine 810). In other implementations, the generated data may not comply with one or more policies stored at the storage medium 818, so as to obfuscate detecting by external entities of any policies implemented by an organization. In some implementations, the generated data may be associated with a "none" type to indicate to the backend computing system 120 (and other systems 702 that may receive the data) that the data does not include any actual copied data. Based on the "none" data type, the backend computing system 120 and/or the systems 702 may ignore the data and not write it to a buffer. At a step 1714, the traffic defense engine 816 may send the generated data to the backend computing system 120. The traffic defense engine 816 may perform the routine 1710 occasionally and/or on a periodic basis. In some implementations, the traffic defense engine 816 may perform the routine 1710 at predetermined intervals during particular periods of time. In some implementations, the traffic defense engine 816 may perform the routine 1710 during non-peak traffic times, in other words, when there is minimal or zero data traffic at the backend computing system 120. In doing so, the traffic defense engine 816 may obfuscate peak times of data transfers at the backend computing system 120, and prevent external entities from detecting any data traffic patterns at the backend computing system 120.

Some of the systems described herein, for example, the systems 100, 700, 800, and 850 shown in FIGS. 1, 7, 8A and 8B, respectively, may employ "black cloud" or "zero trust" systems, where access to resources is controlled based on identity. In such systems, no one is trusted by default from inside or outside the network, and verification is required from everyone (e.g., all users/client devices 202, the systems 702, etc.) trying to gain access to resources on the network. In employing such techniques, the systems 100, 700, 800, and 850 in some implementations, may cause security alerts (e.g., at an administrator's client device), may require step-up challenges for authentication (e.g., the user may be required to provide responses to additional questions for authentication, the user may be required to provide additional authentication via other methods such as password, two-device authentication, etc.), may cause a forced disconnect from the networks, and/or may disable the user's login for a period of time or until an administrator re-enables it. In some implementations, the security alerts, the step-up authentication challenges, and/or the forced disconnect may be caused based on a score (e.g., a trust score) for the user and/or based on a change in the score for the user. The score may be determined based on the user's past interactions with the systems 702 and the applications 703. For example, the user session engine 806 may evaluate user session data representing events occurring during past user sessions, such as events stored in the event recording table 1200 (shown in FIG. 12), to determine the score. In another example, the user session engine 806 may, additionally or alternatively, evaluate instances when a command (e.g., a copy command and/or a paste command) was not approved (as described above in relation to the policy engine 810 and/or the malware engine 812) by the system 800, 850 based on non-compliance with one or more policies and/or detecting malicious content, and the score (e.g., a trust score) may be based on those instances, the number of times such instances occurred, the severity of the non-compliance with policies, etc. In a further example, the user session engine 806 may determine the trust score based on the user/client device 202 location when interacting with the systems 702, and/or the time the client device 202 is interacting with the systems 702. The user session engine 806 may additionally or alternatively determine the trust score based on an IP address of the client device 202. The user session engine 806 may additionally or alternatively determine the trust score based on the format of data being copied/pasted and/or the size of data being copied/pasted. The user session engine 806 may additionally or alternatively determine the trust score based on any sensitive information (e.g., birthdate, address, social security number, credit card number, etc.) represented in the data being copied/pasted. The trust score may be determined based on whether one or more of the foregoing factors fall within a normal/expected range for the particular user or indicate a normal/expected value for the particular user. In a non-limiting example, the user may have a higher trust score if the location of the client device 202 is at the user's office and the user is accessing the systems 702 during work hours, while the user may have a lower trust score if the location of the client device 202 is at a non-work location (e.g., a location from which the user typically does not access the systems 702) during work hours.

Figure 18:
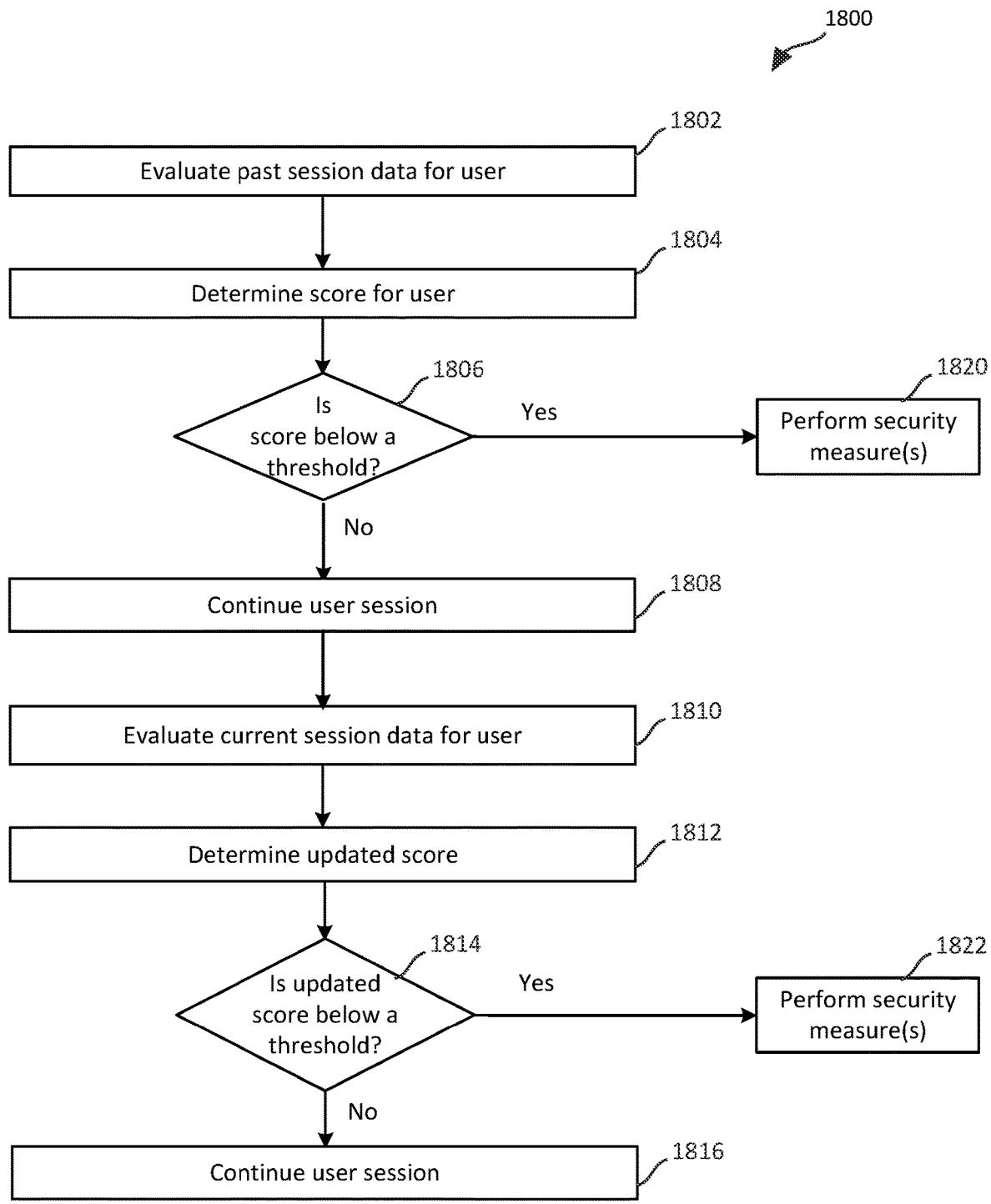
FIG. 18 is a flowchart showing yet another example routine that may be performed by system shown in FIGS. 8A and 8B.

FIG. 18 shows a flowchart for an example routine 1800 that may be performed by the user session engine 806 to determine the score (e.g., a trust score) for the user and perform certain security measures based on the score. As shown in FIG. 18, at a step 1802, the user session engine 806 may evaluate session data (e.g., past session data) for the user. The user session engine 806 may, in some examples, retrieve session data for past user sessions for the user based, for example, on the user identifier and the session identifier stored in the user session table 900 shown in FIG. 9. The session data may include data relating to the events detected during one or more user sessions for the user. Based on the evaluation of the session data, at a step 1804, the user session engine 806 may determine the score for the user. In some implementations, the score may be based on a number of times a command (e.g., a copy command and/or a paste command) was not approved based on non-compliance with one or more policies as described above in relation to FIG. 14. In some implementations, the score may be based on the severity of the non-compliance, for example, if the user makes multiple attempts to copy sensitive information between the systems 702. In some implementations, the score may be based on detection of malicious content in the copied data during one or more user sessions. In some implementations, the user session engine 806 may use a rule-based system, one or more machine learning techniques, one or more statistical methods, and/or other techniques to determine the score based on evaluating the session data. The score determined at the step 1802 may be an initial score, and may be updated periodically and/or whenever the user starts and/or ends a new user session.

At a step 1804, the user session engine 806 may determine whether the score is below a threshold. In some implementations, this determination may be triggered when the user session engine 806 receives the message (at the step 1302 shown in FIG. 13) that the user initiated a user session. In some implementations, the score may be a numerical value within a range (e.g., a pre-defined range of "0" to "100"), where a high number may indicate the user is trustworthy, while a low number may indicate that the user is untrustworthy. The threshold may be a value (e.g., a pre-defined value) and may depend on system configurations. The threshold may depend on the particular user or the type of user. For example, a first user may have to satisfy a first threshold, while a second user may have to satisfy a second different threshold. If the score is not below a threshold value, then at a step 1808, the user session engine 806 may continue the user session (e.g., allow the user to initiate the user session, allow the user to perform copy/cut-and-paste functionalities, etc.).

At a step 1810, the user session engine 806 may evaluate current session data for the user. The current session data may include data relating to events detected during the current user session. Based on evaluation of the current session data, at a step 1812, the user session engine 806 may determine an updated score for the user, in a similar manner as described in relation to the step 1804. At a step 1814, the user session engine 806 may determine if the updated score is below a threshold. This threshold may be the same as the threshold in step 1806, or may be a different threshold. If the updated score is not below the threshold, then the user session engine 806 may continue the user session at a step 1816.

If at the step 1806, the score is below the threshold, then the user session engine 806 may perform one or more security measures at a step 1820. At the step 1820, the user session engine 806, in some implementations, may select one or more security measures to perform. In some implementations, one of the security measures may involve causing a security alert to be sent to an administrator's device, the client device 202 and/or another system. In some implementations, one of the security measures may involve causing a step-up authentication, where the system 800 may ask the user to provide a response to a question in addition to any initial authentication responses provided by the user. For example, during an initial login to initiate the user session, the user may have provided a password, and during the step-up authentication, the user may be asked to provide responses to certain security questions (e.g., what city were you born in, what is your mother's maiden name, etc.) in addition to the providing the password. In another example, the step-up authentication may require the user to provide authentication information using additional methods, such as, dual-device authentication, fingerprint, voice authentication, etc. Another security measure may involve causing a forced disconnect where the system 800, 850 may cause the user's client device 202 to disconnect from the networks, thus, ending the user session and preventing the user from accessing the system. In another security measure, the user's login may be disabled, preventing the user from initiating the user session. The user's login may, for example, be disabled for a period of time and may be re-enabled after the period of time expires. In some implementations, the user's login may be disabled until an administrator re-enables the login.

At the step 1814, if the user session engine 806 determines that the updated score is below the threshold, then the user session engine 806 may perform one or more security measures at a step 1822. The user session engine 806 may, for example, perform one or more security measures described above in relation to the step 1820.

In some implementations, the routine 1800 may be performed by an engine other than the user session engine 806, where the other engine may be implemented at one or more separate servers of the backend computing system 120.

H. Example Implementations of Methods, Systems, and Computer-Readable Media in Accordance with the Present Disclosure The following paragraphs (M1) through (M19) describe examples of methods that may be implemented in accordance with the present disclosure.

(M1) A method may involve receiving, by a backend computing system, first data from a first computing system, the first data having been generated by the first computing system by encrypting second data, and the second data having been determined based on a command at the first computing system, and sending, by the backend computing system, the first data to a second computing system to enable the second computing system to decrypt the first data and perform a function with respect to the second data.

(M2) A method may be performed as described in paragraph (M1), and may further involve determining, by the backend computing system, to send the first data to the second computing system based at least in part on a user session identifier associated with the second computing system and the first computing system, the user session identifier indicating that a user is accessing the first computing system and the second computing system using a client device.

(M3) A method may be performed as described in paragraph (M2), and may further involve determining a score for the user of the client device, the score being based at least in part on data corresponding to past user sessions for the user, and wherein determining to send the first data to the second computing system is further based at least in part on the score.

(M4) A method may be performed as described in any of paragraphs (M1) through (M3), and may further involve decrypting, by at least a first service component of the backend computing system, the first data to determine the second data, determining, by the first service component, that the second data satisfies a policy associated with at least one of the first computing system and the second computing system, and determining, by the backend computing system, to send the first data to the second computing system based at least in part on the second data satisfying the policy.

(M5) A method may be performed as described in any of paragraphs (M1) through (M4), wherein the first computing system is configured to provide a first virtualized application to a client device, and the second computing system is configured to provide a second virtualized application to the client device.

(M6) A method may be performed as described in any of paragraphs (M1) through (M5), wherein the command at the first computing system is a copy command, received from a client device, with respect to the second data.

(M7) A method may be performed as described in any of paragraphs (M1) through (M6), and may further involve determining, by the backend computing system, that the second computing system received a paste command from a client device, and determining, by the backend computing system, to send the first data to the second computing system based at least in part on the second computing system having received the paste command from the client device.

(M8) A method may be performed as described in any of paragraphs (M1) through (M7), and may further involve decrypting, by at least a first service component of the backend computing system, the first data to determine the second data, determining, by the first service component, that the second data does not include malicious content, and determining, by the backend computing system, to send the first data to the second computing system based at least in part on determining that the second data does not include malicious content.

(M9) A method may be performed as described in any of paragraphs (M1) through (M8), wherein the first data is received at a first service component of the backend computing system, and the method may further involve decrypting, at a second service component of the backend computing system that is separate from the first service component, the first data to determine the second data, approving, by the second service component, sending of the first data to the second computing system based at least in part on evaluation of the second data, sending, from the second service component to the first service component, a message authorizing the first service component to send the first data to the second computing system, and determining, by the first service component, to send the first data to the second computing system based at least in part on receiving the message from the second service component.

(M10) A method may be performed as described in any of paragraphs (M1) through (M9), wherein the second data is written to a first buffer of a first operating system of the first computing system, and sending the first data to the second computing system causes the second computing system to write the second data to a second buffer of a second operating system of the second computing system.

(M11) A method may involve receiving, at a first computing system from a client device, a command to copy first data, generating, at the first computing system, padded data by adding second data to the first data, and sending, from the first computing system to a remote server, encrypted data based on the padded data to enable the remote server to send the encrypted data to a second computing system.

(M12) A method may be performed as described in paragraph (M11), wherein the first computing system is configured to provide a first virtualized application to the client device and the command is received in response to the client device interacting with the first virtualized application.

(M13) A method may be performed as described in paragraph (M11) or paragraph (M12), wherein the first computing system is configured to provide a first virtualized application to the client device, and the second computing system is configured to provide a second virtualized application to the client device.

(M14) A method may be performed as described in any of paragraphs (M11) through (M13), and may further involve generating, at the first computing system, third data without having received from the client device a command to copy the third data, and sending, from the first computing system to the remote server, the third data to obfuscate data traffic between the first computing system and the remote server.

(M15) A method may be performed as described in any of paragraphs (M11) through (M14), wherein the encrypted data does not flow through the client device.

(M16) A method may involve receiving, at a first computing system from a client device, a command to copy first data, sending, from the first computing system to a remote server, encrypted data based at least in part on the first data to enable the remote server to send the encrypted data to a second computing system, generating, at the first computing system, second data without having received from the client device a second command to copy the second data, and sending, from the first computing system to the remote server, the second data to obfuscate data traffic between the first computing system and the remote server.

(M17) A method may be performed as described in paragraph (M16), wherein the first computing system is configured to provide a first virtualized application to the client device and the command is received in response to the client device interacting with the first virtualized application.

(M18) A method may be performed as described in paragraph (M16) or paragraph (M17), wherein the first computing system is configured to provide a first virtualized application to the client device, and the second computing system is configured to provide a second virtualized application to the client device.

(M19) A method may be performed as described in any of paragraphs (M16) through (M18), and may further involve generating, at the first computing system, padded data by adding third data to the first data, wherein the encrypted data is based on the padded data.

(M20) A method may be performed as described in any of paragraphs (M16) through (M19), wherein the encrypted data does not flow through the client device.

The following paragraphs (S1) through (S19) describe examples of systems and devices that may be implemented in accordance with the present disclosure.

(S1) A system may comprise at least one processor and at least one computer-readable medium encoded with instructions which, when executed by the at least one processor, cause the system to receive first data from a first computing system, the first data having been generated by the first computing system by encrypting second data, and the second data having been determined based on a command at the first computing system, and send the first data to a second computing system to enable the second computing system to decrypt the first data and perform a function with respect to the second data.

(S2) A system may be configured as described in paragraph (S1), and the at least one computer-readable medium may be encoded with additional instructions which, when executed by the at least one processor, further cause the system to determine to send the first data to the second computing system based at least in part on a user session identifier associated with the second computing system and the first computing system, the user session identifier indicating that a user is accessing the first computing system and the second computing system using a client device.

(S3) A system may be configured as described in paragraph (S2), and the at least one computer-readable medium may be encoded with the additional instructions, which, when executed by the at least one processor, further cause the system to determine a score for the user of the client device, the score being based at least in part on data corresponding to past user sessions for the user, and wherein the determination to send the first data to the second computing system is further based at least in part on the score.

(S4) A system may be configured as described in any of paragraphs (S1) through (S3), and the at least one computer-readable medium may be encoded with the additional instructions, which, when executed by the at least one processor, further cause the system to decrypt, by at least a first service component, the first data to determine the second data, determine, by the first service component, that the second data satisfies a policy associated with at least one of the first computing system and the second computing system, and determine to send the first data to the second computing system based at least in part on the second data satisfying the policy.

(S5) A system may be configured as described in any of paragraphs (S1) through (S4), wherein the first computing system is configured to provide a first virtualized application to a client device, and the second computing system is configured to provide a second virtualized application to the client device.

(S6) A system may be configured as described in any of paragraphs (S1) through (S5), wherein the command at the first computing system is a copy command, received from a client device, with respect to the second data.

(S7) A system may be configured as described in any of paragraphs (S1) through (S6), and the at least one computer-readable medium may be encoded with the additional instructions, which, when executed by the at least one processor, further cause the system to determine that the second computing system received a paste command from a client device, and determine to send the first data to the second computing system based at least in part on the second computing system having received the paste command from the client device.

(S8) A system may be configured as described in any of paragraphs (S1) through (S7), and the at least one computer-readable medium may be encoded with the additional instructions, which, when executed by the at least one processor, further cause the system to decrypt, by at least a first service component, the first data to determine the second data, determine, by the first service component, that the second data does not include malicious content, and determine to send the first data to the second computing system based at least in part on determining that the second data does not include malicious content.

(S9) A system may be configured as described in any of paragraphs (S1) through (S8), wherein the first data is received at a first service component of the backend computing system, and the at least one computer-readable medium may be encoded with additional instructions which, when executed by the at least one processor, further cause the system to decrypt, at a second service component of the backend computing system that is separate from the first service component, the first data to determine the second data, approve, by the second service component, sending of the first data to the second computing system based at least in part on evaluation of the second data, send, from the second service component to the first service component, a message authorizing the first service component to send the first data to the second computing system, and determine, by the first service component, to send the first data to the second computing system based at least in part on receiving the message from the second service component.

(S10) A system may be configured as described in any of paragraphs (S1) through (S9), wherein the second data is written to a first buffer of a first operating system of the first computing system, and wherein sending the first data to the second computing system causes the second computing system to write the second data to a second buffer of a second operating system of the second computing system.

(S11) A first computing system may comprise at least one processor and at least one computer-readable medium encoded with instructions which, when executed by the at least one processor, cause the first computing system to receive, from a client device, a command to copy first data, generate padded data by adding second data to the first data, and send, to a remote server, encrypted data based on the padded data to enable the remote server to send the encrypted data to a second computing system.

(S12) A first computing system may be configured as described in paragraph (S11), wherein the first computing system is configured to provide a first virtualized application to the client device and the command is received in response to the client device interacting with the first virtualized application.

(S13) A first computing system may be configured as described in paragraph (S11) or paragraph (S12), wherein the first computing system is configured to provide a first virtualized application to the client device, and the second computing system is configured to provide a second virtualized application to the client device.

(S14) A first computing system may be configured as described in any of paragraphs (S11) through (S13), and the at least one computer-readable medium may be encoded with additional instructions which, when executed by the at least one processor, further cause the first computing system to generate third data without having received from the client device a command to copy the third data, and send, to the remote server, the third data to obfuscate data traffic between the first computing system and the remote server.

(S15) A first computing system may be configured as described in any of paragraphs (S11) through (S14), wherein the encrypted data does not flow through the client device.

(S16) A first computing system may comprise at least one processor and at least one computer-readable medium encoded with instructions which, when executed by the at least one processor, cause the first computing system to receive, from a client device, a command to copy first data, send, to a remote server, encrypted data based at least in part on the first data to enable the remote server to send the encrypted data to a second computing system, generate second data without having received from the client device a second command to copy the second data, and send, to the remote server, the second data to obfuscate data traffic between the first computing system and the remote server.

(S17) A first computing system may be configured as described in paragraph (S16), wherein the first computing system is configured to provide a first virtualized application to the client device and the command is received in response to the client device interacting with the first virtualized application.

(S18) A first computing system may be configured as described in paragraph (S16) or paragraph (S17), wherein the first computing system is configured to provide a first virtualized application to the client device, and the second computing system is configured to provide a second virtualized application to the client device.

(S19) A first computing system may be configured as described in any of paragraphs (S16) through (S18), and the at least one computer-readable medium may be encoded with additional instructions which, when executed by the at least one processor, further cause the first computing system to generate padded data by adding third data to the first data, wherein the encrypted data is based on the padded data.

(S20) A first computing system may be configured as described in any of paragraphs (S16) through (S19), wherein the encrypted data does not flow through the client device.

The following paragraphs (CRM1) through (CRM19) describe examples of computer-readable media that may be implemented in accordance with the present disclosure.

(CRM1) At least one non-transitory, computer-readable medium may be encoded with instructions which, when executed by at least one processor included in a computing system, cause the computing system to receive first data from a first computing system, the first data having been generated by the first computing system by encrypting second data, and the second data having been determined based on a command at the first computing system, and send the first data to a second computing system to enable the second computing system to decrypt the first data and perform a function with respect to the second data.

(CRM2) At least one computer-readable medium may be configured as described in paragraph (CRM1), and may be encoded with additional instructions which, when executed by the at least one processor, further cause the computing system to determine to send the first data to the second computing system based at least in part on a user session identifier associated with the second computing system and the first computing system, the user session identifier indicating that a user is accessing the first computing system and the second computing system using a client device.

(CRM3) At least one computer-readable medium may be configured as described in paragraph (CRM2), and may be encoded with additional instructions which, when executed by the at least one processor, further cause the computing system to determine a score for the user of the client device, the score being based at least in part on data corresponding to past user sessions for the user, and wherein the determination to send the first data to the second computing system is further based at least in part on the score.

(CRM4) At least one computer-readable medium may be configured as described in any of paragraphs (CRM1) through (CRM3), and may be encoded with additional instructions which, when executed by the at least one processor, further cause the computing system to decrypt, by at least a first service component, the first data to determine the second data, determine, by the first service component, that the second data satisfies a policy associated with at least one of the first computing system and the second computing system, and determine to send the first data to the second computing system based at least in part on the second data satisfying the policy.

(CRM5) At least one computer-readable medium may be configured as described in any of paragraphs (CRM1) through (CRM4), wherein the first computing system is configured to provide a first virtualized application to a client device, and the second computing system is configured to provide a second virtualized application to the client device.

(CRM6) At least one computer-readable medium may be configured as described in paragraph (CRM5), wherein the command at the first computing system is a copy command, received from a client device, with respect to the second data.

(CRM7) At least one computer-readable medium may be configured as described in any of paragraphs (CRM1) through (CRM6), and may be encoded with additional instructions which, when executed by the at least one processor, further cause the computing system to determine that the second computing system received a paste command from a client device, and determine to send the first data to the second computing system based at least in part on the second computing system having received the paste command from the client device.

(CRM8) At least one computer-readable medium may be configured as described in any of paragraphs (CRM1) through (CRM7), and may be encoded with additional instructions which, when executed by the at least one processor, further cause the computing system to decrypt, by at least a first service component, the first data to determine the second data, determine, by the first service component, that the second data does not include malicious content, and determine to send the first data to the second computing system based at least in part on determining that the second data does not include malicious content.

(CRM9) At least one computer-readable medium may be configured as described in any of paragraphs (CRM1) through (CRM8), wherein the first data is received at a first service component of the backend computing system, and may be encoded with additional instructions which, when executed by the at least one processor, further cause the computing system to decrypt, at a second service component of the backend computing system that is separate from the first service component, the first data to determine the second data, approve, by the second service component, sending of the first data to the second computing system based at least in part on evaluation of the second data, send, from the second service component to the first service component, a message authorizing the first service component to send the first data to the second computing system, and determine, by the first service component, to send the first data to the second computing system based at least in part on receiving the message from the second service component.

(CRM10) At least one computer-readable medium may be configured as described in any of paragraphs (CRM1) through (CRM9), wherein the second data is written to a first buffer of a first operating system of the first computing system, and wherein sending the first data to the second computing system causes the second computing system to write the second data to a second buffer of a second operating system of the second computing system.

(CRM11) At least one non-transitory, computer-readable medium may be encoded with instructions which, when executed by at least one processor included in a first computing system, cause the first computing system to receive, from a client device, a command to copy first data, generate padded data by adding second data to the first data, and send, to a remote server, encrypted data based on the padded data to enable the remote server to send the encrypted data to a second computing system.

(CRM12) At least one computer-readable medium may be configured as described in paragraph (CRM11), wherein the first computing system is configured to provide a first virtualized application to the client device and the command is received in response to the client device interacting with the first virtualized application.

(CRM13) At least one computer-readable medium may be configured as described in paragraph (CRM11) or paragraph (CRM12), wherein the first computing system is configured to provide a first virtualized application to the client device, and the second computing system is configured to provide a second virtualized application to the client device.

(CRM14) At least one computer-readable medium may be configured as described in any of paragraphs (CRM11) through (CRM13), and may be encoded with additional instructions which, when executed by the at least one processor, further cause the first computing system to generate third data without having received from the client device a command to copy the third data, and send, to the remote server, the third data to obfuscate data traffic between the first computing system and the remote server.

(CRM15) At least one computer-readable medium may be configured as described in any of paragraphs (CRM11) or paragraph (CRM14), wherein the encrypted data does not flow through the client device.

(CRM16) At least one non-transitory, computer-readable medium may be encoded with instructions which, when executed by at least one processor included in a first computing system, cause the first computing system to receive, from a client device, a command to copy first data, send, to a remote server, encrypted data based at least in part on the first data to enable the remote server to send the encrypted data to a second computing system, generate second data without having received from the client device a second command to copy the second data, and send, to the remote server, the second data to obfuscate data traffic between the first computing system and the remote server.

(CRM17) At least one computer-readable medium may be configured as described in paragraph (CRM16), wherein the first computing system is configured to provide a first virtualized application to the client device and the command is received in response to the client device interacting with the first virtualized application.

(CRM18) At least one computer-readable medium may be configured as described in paragraph (CRM16) or paragraph (CRM17), wherein the first computing system is configured to provide a first virtualized application to the client device, and the second computing system is configured to provide a second virtualized application to the client device.

(CRM19) At least one computer-readable medium may be configured as described in any of paragraphs (CRM16) through (CRM18), may be encoded with additional instructions which, when executed by the at least one processor, further cause the first computing system to generate padded data by adding third data to the first data, wherein the encrypted data is based on the padded data.

(CRM20) At least one computer-readable medium may be configured as described in any of paragraphs (CRM16) through (CRM19), wherein the encrypted data does not flow through the client device.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   receiving, by a backend computing system, first data from a first computing system, the first data having been generated by the first computing system by encrypting second data, and the second data having been determined based on a command at the first computing system;
   identifying, by the backend computing system, a user session identifier associated with the first computing system and a second computing system, the user session identifier indicating that a user is accessing the first computing system and the second computing system using a client device; and
   based at least in part on identifying the user session identifier, sending, by the backend computing system, the first data to the second computing system to enable the second computing system to decrypt the first data and perform a function with respect to the second data.

2. The method of claim 1, further comprising:
   determining a score for the user of the client device, the score being based at least in part on data corresponding to past user sessions for the user, and
   wherein determining to send the first data to the second computing system is further based at least in part on the score.

3. The method of claim 1, further comprising:
decrypting, by at least a first service component of the backend computing system, the first data to determine the second data;
determining, by the first service component, that the second data satisfies a policy associated with at least one of the first computing system and the second computing system; and
determining, by the backend computing system, to send the first data to the second computing system based at least in part on the second data satisfying the policy.

4. The method of claim 1, wherein the first computing system is configured to provide a first virtualized application to a client device, and the second computing system is configured to provide a second virtualized application to the client device.

5. The method of claim 1, wherein the command at the first computing system is a copy command, received from the client device, with respect to the second data.

6. The method of claim 1, further comprising:
determining, by the backend computing system, that the second computing system received a paste command from the client device; and
determining, by the backend computing system, to send the first data to the second computing system based at least in part on the second computing system having received the paste command from the client device.

7. The method of claim 1, further comprising:
decrypting, by at least a first service component of the backend computing system, the first data to determine the second data;
determining, by the first service component, that the second data does not include malicious content; and
determining, by the backend computing system, to send the first data to the second computing system based at least in part on determining that the second data does not include malicious content.

8. The method of claim 1, wherein the first data is received at a first service component of the backend computing system, and the method further comprises:
decrypting, at a second service component of the backend computing system that is separate from the first service component, the first data to determine the second data;
approving, by the second service component, sending of the first data to the second computing system based at least in part on evaluation of the second data;
sending, from the second service component to the first service component, a message authorizing the first service component to send the first data to the second computing system; and
determining, by the first service component, to send the first data to the second computing system based at least in part on receiving the message from the second service component.

9. The method of claim 1, wherein:
the second data is written to a first buffer of a first operating system of the first computing system, and
sending the first data to the second computing system causes the second computing system to write the second data to a second buffer of a second operating system of the second computing system.

10. A method, comprising:
receiving, at a remote server from a first computing system, padded data including first data and second data determined based on a copy command received at the first computing system from a client device;
identifying, by the remote server, a user session identifier associated with the first computing system and a second computing system, the user session identifier indicating that a user is accessing the first computing system and the second computing system using the client device; and
based at least in part on identifying the user session identifier, sending, from the remote server, encrypted data based on the padded data to the second computing system.

11. The method of claim 10, wherein the first computing system is configured to provide a first virtualized application to the client device and the command is received in response to the client device interacting with the first virtualized application.

12. The method of claim 10, wherein the first computing system is configured to provide a first virtualized application to the client device, and the second computing system is configured to provide a second virtualized application to the client device.

13. The method of claim 10, further comprising:
generating, at the first computing system, third data without having received from the client device a command to copy the third data; and
sending, from the first computing system to the remote server, the third data to obfuscate data traffic between the first computing system and the remote server.

14. The method of claim 10, wherein the encrypted data does not flow through the client device.

15. A method, comprising:
receiving, at a first computing system from a client device, a command to copy first data;
sending, from the first computing system to a remote server, encrypted data based at least in part on the first data to enable the remote server to send the encrypted data to a second computing system;
generating, at the first computing system, second data without having received from the client device a second command to copy the second data; and
sending, from the first computing system to the remote server, the second data to obfuscate data traffic between the first computing system and the remote server.

16. The method of claim 15, wherein the first computing system is configured to provide a first virtualized application to the client device and the command is received in response to the client device interacting with the first virtualized application.

17. The method of claim 15, wherein the first computing system is configured to provide a first virtualized application to the client device, and the second computing system is configured to provide a second virtualized application to the client device.

18. The method of claim 15, further comprising:
generating, at the first computing system, padded data by adding third data to the first data;
wherein the encrypted data is based on the padded data.

19. The method of claim 15, wherein the encrypted data does not flow through the client device.

* * * * *